United States Patent
Shimizu

(10) Patent No.: US 6,633,537 B1
(45) Date of Patent: Oct. 14, 2003

(54) HITLESS PATH SWITCHING RING NETWORK, HITLESS PATH SWITCHING TRANSMISSION SYSTEM, NODE DEVICE FOR A HITLESS PATH SWITCHING RING NETWORK, AND FAILURE OCCURRENCE-TIME HITLESS PATH SWITCHING TRANSMISSION METHOD IN A RING NETWORK

(75) Inventor: Yoshihiro Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/439,305

(22) Filed: Nov. 12, 1999

(30) Foreign Application Priority Data

Nov. 19, 1998 (JP) .......................................... 10-329899

(51) Int. Cl.⁷ .............................................. G01R 31/08
(52) U.S. Cl. ........................................ 370/216; 370/242
(58) Field of Search ............................... 370/242, 248, 370/351, 404, 405, 424, 428, 452, 455, 460, 216; 359/119

(56) References Cited

U.S. PATENT DOCUMENTS 5,475,676 A * 12/1995 Takatori et al. ............ 370/16.1
6,233,704 B1 * 5/2001 Scott et al. ................. 714/717
6,426,941 B1 * 7/2002 Vaman et al. ............... 370/228

* cited by examiner

*Primary Examiner*—Wellington Chin
*Assistant Examiner*—Brenda Pham
(74) *Attorney, Agent, or Firm*—Katten Muchin Zavis Rosenman

(57) ABSTRACT

A hitless path switching ring network capable of switching from a work transmission line to a protection transmission line without instantaneous hitting of a signal when a failure occurs in the work transmission line. In the hitless path switching ring network, a node device includes a first memory section storing a signal being transmitted onto the work transmission line during normal operation, and a first read control section, at the time of failure occurrence, reading out the transmitted signal, held before failure occurrence, from the first memory section and sending out the transmitted signal through the protection transmission line in the opposite direction from the transmission direction employed before failure occurrence. Another node device includes a second memory section for storing the signal received through the work transmission line during normal operation, a third memory section for storing the signal received through the protection transmission line during failure occurrence, and a phase adjusting section for matching the time phase of the received signal in the second memory section with the time phase of the received signal in the third memory section and outputting the received signal held before failure occurrence.

34 Claims, 36 Drawing Sheets

FIG. 5

|  | REQUEST | BRIDGE NODE ID | SWITCHING NODE ID | STATUS |
|---|---|---|---|---|
| SECTION | K1 | | K2 | |
| PATH 1 | K1 | | K2 | |
| PATH 2 | K3 | | K4 | |
| ... | | | | |
| PATH N | K(2N-1) | | K(2N) | |

1. REQUEST
   - SWITCHING REQUEST (RING) SE : 0001
   - SWITCHING REQUEST (SPAN) SE : 0011
   - SWITCHING REQUEST (RING) NB : 0100
   - SWITCHING REQUEST (SPAN) NB : 1100
   - NO REQUEST NR : 0000

2. BRIDGE STATION ID
   ID(0~15) FOR A NODE THAT PERFORMS A SWITCHING OPERATION DEFAULT = "0"

3. SWITCHING STATION ID
   ID(0~15) FOR A NODE THAT PERFORMS A SWITCHING OPERATION DEFAULT = "0"

4. STATUS
   - BRIDGE STATUS (RING) BR : 0001
   - BRIDGE STATUS (SPAN) BR : 0010
   - BRIDGE & SWITCH STATUS (RING) BR & SW : 0100
   - BRIDGE & SWITCH STATUS (SPAN) BR & SW : 1100
   - NON-SWITCH STATUS IDL : 0000

FIG. 6

| CH | EAST SIDE | | WEST SIDE | | |
|---|---|---|---|---|---|
| | ADD | DROP | ADD | DROP | EAST→WEST DIRECTION |
| | DROP | ADD | DROP | ADD | WEST→EAST DIRECTION |

| | NODE A | | | | |
|---|---|---|---|---|---|
| CH1 | D | A | A | C | EAST→WEST DIRECTION |
| | D | A | A | C | WEST→EAST DIRECTION |
| CH2 | — | — | — | — | EAST→WEST DIRECTION |
| | — | — | — | — | WEST→EAST DIRECTION |

| | NODE B | | | | |
|---|---|---|---|---|---|
| CH1 | A | C | A | C | EAST→WEST DIRECTION |
| | A | C | A | C | WEST→EAST DIRECTION |
| CH2 | — | — | B | C | EAST→WEST DIRECTION |
| | — | — | B | C | WEST→EAST DIRECTION |

| | NODE C | | | | |
|---|---|---|---|---|---|
| CH1 | A | C | — | — | EAST→WEST DIRECTION |
| | A | C | — | — | WEST→EAST DIRECTION |
| CH2 | B | C | — | — | EAST→WEST DIRECTION |
| | B | C | — | — | WEST→EAST DIRECTION |

| | NODE D | | | | |
|---|---|---|---|---|---|
| CH1 | — | — | A | D | EAST→WEST DIRECTION |
| | — | — | A | D | WEST→EAST DIRECTION |
| CH2 | — | — | — | — | EAST→WEST DIRECTION |
| | — | — | — | — | WEST→EAST DIRECTION |

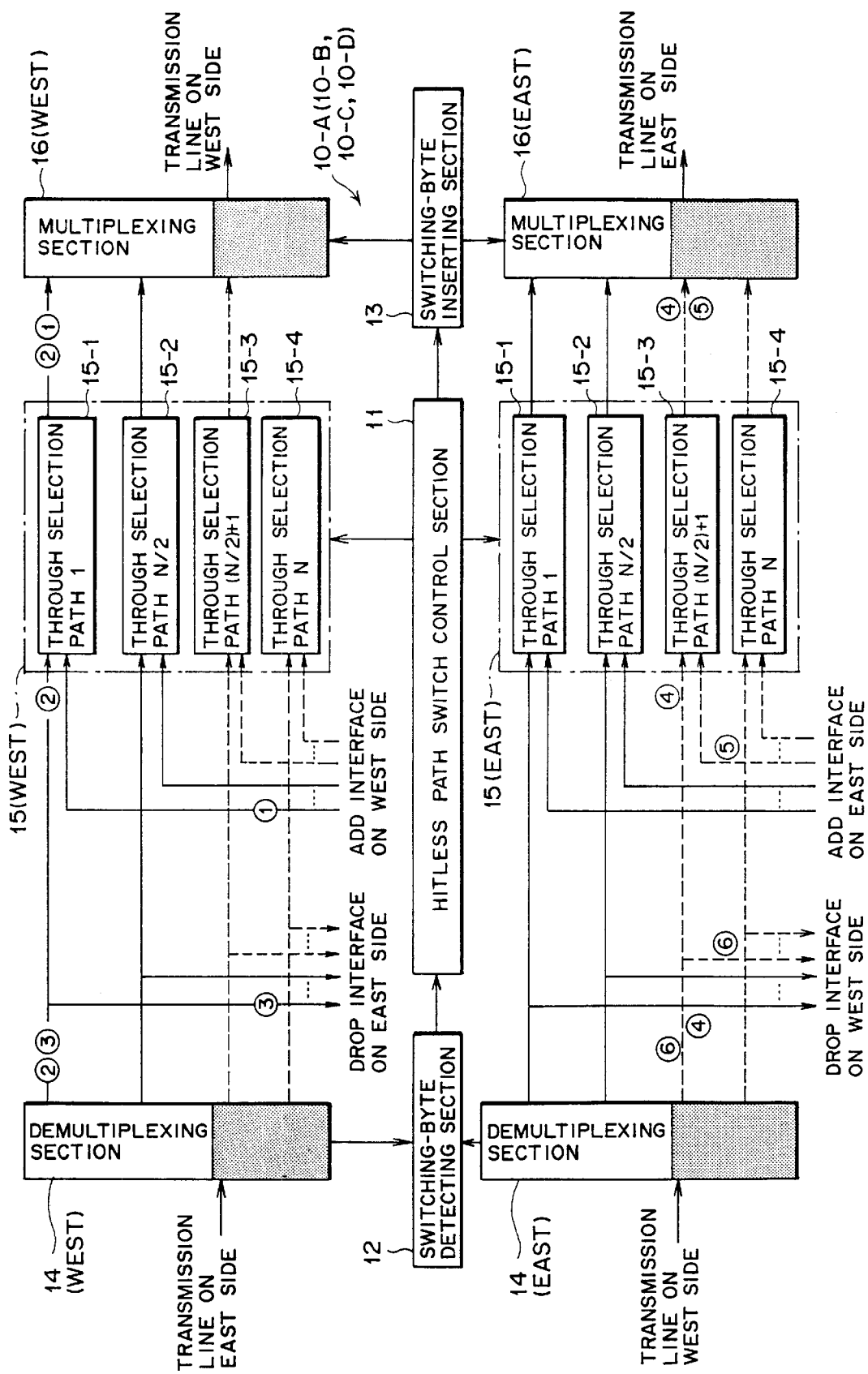

FIG. 20

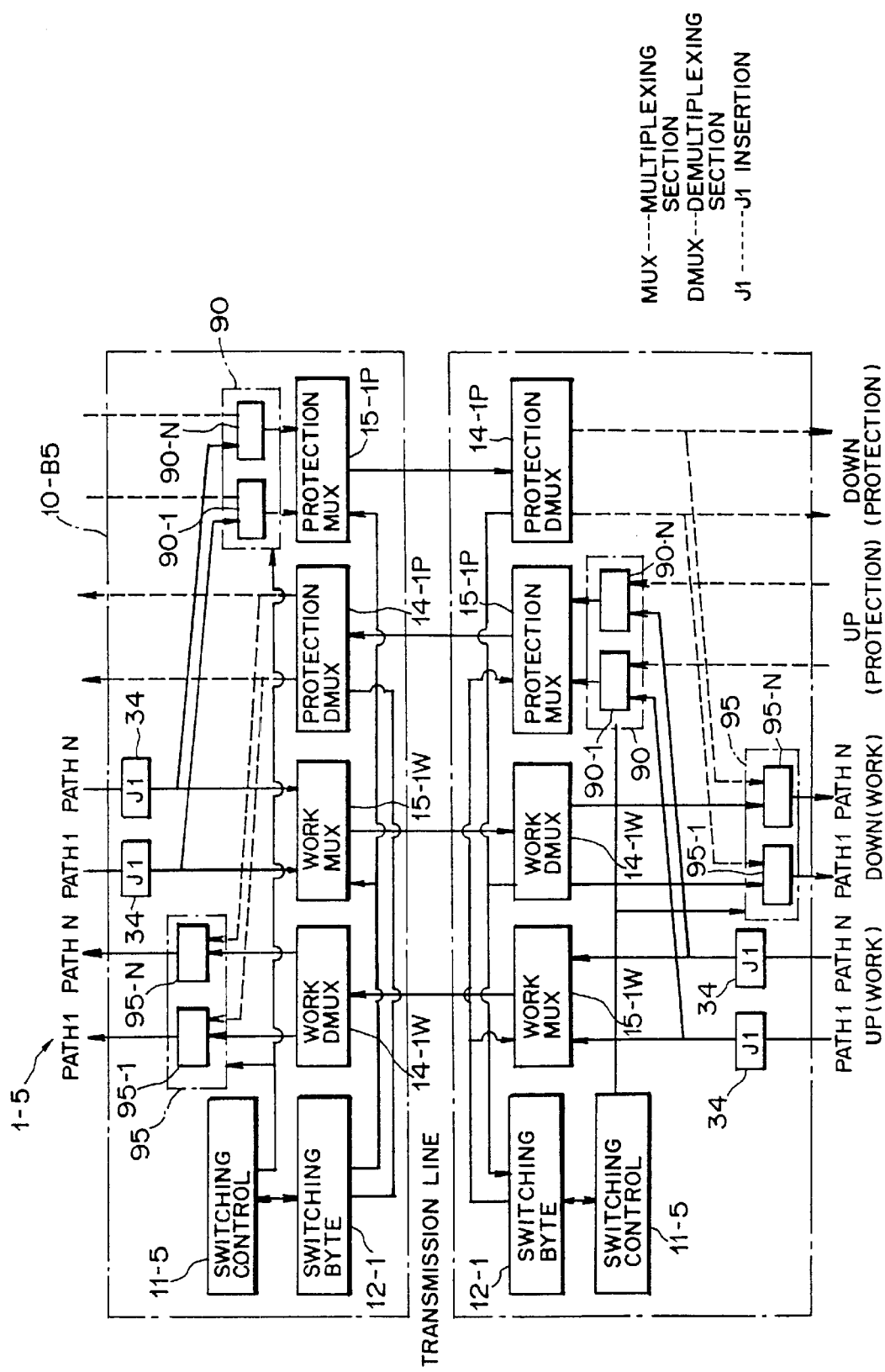

HITLESS PATH SWITCHING RING NETWORK, HITLESS PATH SWITCHING TRANSMISSION SYSTEM, NODE DEVICE FOR A HITLESS PATH SWITCHING RING NETWORK, AND FAILURE OCCURRENCE-TIME HITLESS PATH SWITCHING TRANSMISSION METHOD IN A RING NETWORK

BACKGROUND OF THE INVENTION (1) Field of the Invention

The present invention relates to a hitless path switching ring network, a hitless path switching transmission system, a node device for a hitless path switching ring network, and a failure occurrence-time hitless path switching transmission method in a ring network, which are capable of transmitting a signal without instantaneous hitting of the signal in a ring network where a plurality of node devices are interconnected in ring form through a work transmission line and a protection transmission line, even when switching of the transmission line is performed at the time of failure occurrence.

(2) Description of the Related Art

The ring network is constructed by a plurality of node devices interconnected through high-speed transmission lines (work and protection transmission lines).

Each node device in this ring network receives a signal sent from another network that is in a lower hierarchy, through a low-speed transmission line an d outputs the received signal onto the high-speed transmission line (work transmission line) toward another node.

Note that as an example, consider the case where a synchronous digital hierarchy (SDH) frame is transmitted along the high-speed transmission line within the ring network and each signal in each node device sent from a lower hierarchy is added to the payload of this SDH frame (high-group frame).

As a typical example of this ring network, a uni-directional protection switched ring (UPSR) has been proposed. If there is a failure in a transmission line along which a signal sent out from a certain node device is transmitted, the transmission line can be switched with no means so that the signal is transmitted to another node device, as if there were no failure.

FIG. 35 is a diagram showing a ring network 1-x1 of this UPSR type. The ring network 1-x1 shown in this diagram is constituted by node devices 10A-x~10D-x. In the node device 10A-x on the side of transmitting a signal (path 1), the signal is sent out onto a work transmission line (arrow x1 in FIG. 35) and is also previously sent out onto a protection transmission n line (arrow a x2 in FIG. 35) In the node device 10C-x on the receiving side, the signals received through the work and protection transmission lines are held in a work memory 20-x and a protection memory 30-x, respectively.

At the time of normal operation, for the signals read out from the work and protection memories 20-x and 30-x, the signal with better quality is selected and output by a path selecting section 40-x. Also, when a failure occurs in the work transmission line, the signal from the protection transmission line (i.e., the signal output from the protection memory 30-x) is automatically selected.

Thus, in the UPSR, the same signal is sent out onto the work transmission line and the protection transmission line, so when a failure occurs in the work transmission line, the output signal can be switched without instantaneous hitting by the path selecting section 40-x. However, the line (transmission line) capacity within the network is employed more than 1.5 times the case where a signal is sent out on either the work-transmission line or the protection transmission line (three or more nodes are employed).

On the other hand, compared with the aforementioned UPSR, another technique (bi-directional line switched ring (BLSR)) of effectively utilizing transmission lines has been proposed.

FIG. 36 is a schematic diagram showing a ring network of this BLSR type. In this ring network (hereinafter also referred to as simply a "ring") 1-x2 shown in the diagram, 4 node devices 10A-x2~10D-x2 respectively connected to other networks are connected and constructed in ring form through transmission lines.

In this ring network 1-x2, one-half its transmission line capacity within in the ring 1-x2 is employed in the work transmission line and the remaining half is employed in the protection transmission line. The ring network 1-x2 performs communication in the form of sending out a SDH frame in the east and west directions by the node devices (node devices on the transmitting side) 10A-x2~10D-x2. Also, if the node devices 10A-x2~10D-x2 detect a signal, which is output to another network, from the signals (added to the SDH frame) received through the trunk transmission line (between node devices), the node devices 10A-x2~10D-x2 will drop the detected signal to the other network. On the other hand, if a signal is received from another network, the node devices 10A-x2~10D-x2 will add the received signal to the SDH frame and send out the SDH frame onto the transmission line between the node devices.

Incidentally, if a section failure occurs in the work transmission line between the node devices 10B-x2 and 10C-x2, the ring network 1-x2 will loop back the signal, which is sent onto the work transmission line, at the node device, 10B-2 and send out the signal onto the protection transmission line on the side of the node device 10A-x2, after failure occurrence, as shown in FIG. 37. The signal, looped back and sent out onto the protection transmission line, is sent through the node devices 10A-x2 and 10D-x2 to the node device 10C-x2.

Note that the process of looping back a signal onto the protection transmission line at the time of section failure occurrence is controlled by the bytes K1 and K2 added to the section overhead (SOH) of a SDH frame.

Also, when the node device 10C-x2 detects a failure in the work transmission line, it instructs a loop back instruction to the node device 10B-x2 through a long path (i.e., via the node devices 10D-x2 and 10A-x2) with the bytes K1 and K2.

As mentioned above, in the ring network 1-x2, the node device 10B-x2 outputs a signal toward the node device 10A-x2, after receiving the bytes K1 and K2.

For instance, in the node device 10B-x2, a signal (path 3) coming in along a low-speed transmission line is sent out toward the node device 10C-x2 with the work transmission line at the time of normal operation. However, when a section failure occurs, the signal (path 3) coming in along the low-speed transmission line after failure occurrence is sent out toward the node device 10A-x2 with the protection transmission line. And in the node device 10C-x2, the signal (path 1) is output onto a low-speed transmission line.

Thus, in the BLSR, after failure occurrence, a section signal is sent out onto the protection transmission line in the opposite direction from the direction in which a signal is transmitted before failure occurrence, so that there is a possibility that the signal received at the node device 10C-x2 on the receiving side will be partially chopped. As a result, it becomes difficult to switch a transmission line without causing instantaneous hitting of a signal.

SUMMARY OF THE INVENTION

The present invention has been made in view of the aforementioned problems. Accordingly, it is the object of the present invention to enable switching from work transmission line to the protection transmission line without causing the occurrence of instantaneous hitting of a signal, when a failure occurs in the work transmission line in a ring network such as the aforementioned BLSR.

To achieve the aforementioned object of the present invention, there is provided a hitless path switching ring network comprising at least two node devices connected in ring form through a work-transmission line and a protection transmission line, wherein at the time of normal operation a signal, is transmitted with the work transmission line and at the time of failure occurrence in the work transmission line the signal can be transmitted with the protection transmission line in the opposite direction from the direction in which the signal was transmitted before failure occurrence. In order to cause the signal to be received from one of the node devices to the other of the node devices without instantaneous hitting of the signal at the time of failure occurrence, the one node device includes a first memory section for storing the signal being transmitted onto the work transmission line at the time of normal operation, and a first read control section for reading out the transmitted signal held before failure occurrence from the first memory section and sending out the transmitted signal through the protection transmission line in the opposite direction from the transmission direction employed before failure occurrence, at the time of failure occurrence in the work transmission line. Also, the other node device includes a second memory section for storing the signal received through the work transmission line at the time of normal operation, a third memory section for storing the signal received through the protection transmission line from the first read control section of the one node device at the time of failure occurrence, and a first phase adjusting section for matching a time phase of the received signal stored in the second memory section after failure occurrence with a time phase of the received signal stored in the third memory section before failure occurrence and outputting the received signal to the outside.

According to the hitless path switching ring network of the present invention, the first read control section of the one node device reads out the transmitted signal held before failure occurrence from the first memory section and sends out the transmitted signal through the protection transmission line in the opposite direction from the transmission direction employed before failure occurrence, at the time of failure occurrence in the work transmission line. Also, the first phase adjusting section of the other node device matches a time phase of the received signal stored in the second memory section after failure occurrence with a time phase of the received signal stored in the third memory section before failure occurrence and outputs the received signal to the outside. Therefore, switching of the transmission line can be performed without reducing transmission quality. In addition, the number of node devices can be increased and line utilities can be replaced.

To achieve the aforementioned object of the present invention, there is also provided a hitless path switching ring network comprising at least two node devices connected in ring form through a work transmission line and a protection transmission line, wherein at the time of normal operation a signal is transmitted with the work transmission line and at the time of failure occurrence in the work transmission line the signal can be transmitted with the protection transmission line in the same direction as the direction in which the signal was transmitted before failure occurrence. In order to cause the signal to be received from one of the two node devices to the other of the two node devices without instantaneous hitting of the signal at the time of failure occurrence, the one node device includes a fourth memory section for storing the signal being transmitted onto the work transmission line at the time of normal operation, and a second read control section for reading out the transmit ted signal held before failure occurrence from the fourth memory section and sending out the transmitted signal through the protection transmission line in the same direction opposite as the transmission di reaction employed be fore failure occurrence, at the time of failure occurrence in the work transmission line. Also, the other node device includes a fifth memory section for storing the signal received through the work transmission line at the time of normal operation, a sixth memory section for storing the signal received through the protection trans-mission line from the second read control section of the one node device at the time of failure occurrence, and a second phase adjusting section for matching a time phase of the received signal stored in the fifth memory section after failure occurrence with a time phase of the received signal stored in the sixth memory section before failure occurrence and outputting the received signal to the outside.

According to the hitless path switching ring network of the present invention, the second read control section of the one node device reads out the transmitted signal held before failure occurrence from the fourth memory section and sends out the transmitted signal through the protection transmission line in the same direction opposite as the transmission direction employed before failure occurrence, at the time of failure occurrence in the work transmission line. Also, the second phase adjusting section of the other node device matches the time phase of the received signal stored in the fifth memory section after failure occurrence with the time phase of the received signal stored in the sixth memory section before failure occurrence and outputs the received signal to the outside. Therefore, switching of the transmission line can be performed without reducing transmission quality. In addition, the number of node devices can be increased and line utilities can be replaced.

To achieve the aforementioned object of the present invention, there is also provided a hitless path switching transmission system comprising at least two node devices connected in opposition to each other through a work transmission line and a protection transmission line, wherein at the time of normal operation a signal is transmitted with the work transmission line and at the time of a failure occurrence in the work transmission line the signal is transmitted with the protection transmission line. In order to cause the signal to be received from one of the node devices to the other of the node devices without instantaneous hitting of the signal, the one node device includes a thirteenth memory section for storing the signal being transmitted onto the work transmission line at the time of normal operation, and a fifth read control section for reading out the transmitted signal held before failure occurrence from the thirteenth memory section and sending out the transmitted signal through the protection transmission line at the time of failure occurrence in the work transmission line, and the other node device includes a fourteenth memory section for storing the signal received through the work transmission line at the time of normal operation, a fifteenth memory section for storing the signal received through the protection transmission line from the fifth read control section of the one node device at the time of failure occurrence, and a fifth phase adjusting section for matching a time phase of the received signal stored in the fourteenth memory section after failure occurrence with a time phase of the received signal stored in the fifteenth memory section before failure occurrence and outputting the received signal to the outside.

According to the hitless path switching transmission system of the present invention, the fifth read control section of the one node device reads out the transmitted signal held before failure occurrence from the thirteenth memory section and sends out the transmitted signal through the protection transmission line at the time of failure occurrence in the work transmission line. Also, the fifth phase adjusting section of the other node device matches the time phase of the received signal stored in the fourteenth memory section after failure occurrence with the time phase of the received signal stored in the fifteenth memory-section before failure occurrence and outputs the received signal to the outside. Therefore, switching of the transmission line can be performed without reducing transmission quality. In addition, the number of node devices can be increased and line utilities can be replaced.

To solve the aforementioned problems, there is also provided a hitless path switching ring network node device connected in ring form with another node device through a work transmission line and a protection transmission line wherein at the time of normal operation a signal is transmitted with the work transmission line and at the time of a failure occurrence in the work transmission line the signal can be transmitted with the protection transmission line in the opposite direction from the direction in which the signal was transmitted before failure occurrence. In order to cause the signal to be received at the other node device without instantaneous hitting of the signal at the time of failure occurrence, the node device comprises: a first memory section for storing the transmitted signal at the time of normal operation; and a first read control section for, reading out, the transmitted signal held before failure occurrence from the first memory section and sending out the transmitted signal through the protection transmission line in the opposite direction from the transmission direction employed before failure occurrence, at the time of failure occurrence in the work transmission line.

According to the hitless path switching ring network node device of the present invention, the first memory section stores the transmitted signal at the time of normal operation, and the first read control section reads out the transmitted signal held before failure occurrence from the first memory section and sending out the transmitted signal through the protection transmission line in the opposite direction from the transmission direction employed before failure occurrence, at the time of failure occurrence in the work transmission line. Therefore, by making a phase adjustment at the other node device, switching of the transmission line can be performed without instantaneous hitting.

To solve the aforementioned problems, there is also provided a hitless path switching ring network node device connected in ring form with other node devices through a work transmission line and a protection transmission line wherein at the time of normal operation a signal is transmitted with the work transmission line and at the time of failure occurrence in the work transmission line the signal can be transmitted with the protection transmission line in the same direction as the direction in which the, signal was transmitted before failure occurrence. In order to cause the signal to be received at the other node devices without instantaneous hitting of the signal at the time of failure occurrence, the node device comprises: a fourth memory section for storing the signal being transmitted onto the work transmission line at the time of normal operation; and a second read control section for reading out the transmitted signal held before failure occurrence from the fourth memory section and sending out the transmitted signal through the protection transmission line in the same direction as the transmission direction employed before failure occurrence, at the time of failure occurrence in the work transmission line.

According to the hitless path switching ring network node device of the present invention, the fourth memory section for storing the signal being transmitted onto the work transmission line at the time of normal operation, and the second read control section for reading out the transmitted signal held before failure occurrence from the fourth memory section and sending out the transmitted signal through the protection transmission line in the same direction as the transmission direction employed before failure occurrence, at the time of failure occurrence in the work transmission line. Therefore, by making a phase adjustment at the other node device on the receiving side, switching of the transmission line can be performed without instantaneous hitting.

To solve the aforementioned problems, there is also provided a hitless path switching ring network node device. connected in ring form with another node device through a work transmission line and a protection transmission line wherein at the time of normal operation a signal is transmitted with the work transmission line and at the time of failure occurrence in the work transmission line the signal can be transmitted with the protection transmission line in the opposite direction from the direction in which the signal was transmitted before failure occurrence. In order to receive the signal from the other node device without instantaneous hitting of the signal at the time of failure occurrence, the node device comprises: a second memory section for storing the signal received through the work transmission line at the time of normal operation; a third memory section for storing the signal received through the protection transmission line from the other node device at the time of failure occurrence; and a first phase adjusting section for matching a time phase of the received signal stored in the second memory section after failure occurrence with a time phase of the received signal stored in the third memory section before failure occurrence and outputting the received signal to the outside.

According to the hitless path switching ring network node device of the present invention, the second memory section stores the signal received through the work transmission line at the time of normal operation, and the first phase adjusting section matches the time phase of the received signal stored in the second memory section after failure occurrence with the time phase of the received signal stored in the third memory section before failure occurrence and outputs the received signal to the outside. Therefore, by adjusting the phase of the transmitted signal sent out onto the protection transmission line at the other node, the signal can be output to the outside without instantaneous hitting.

To solve the aforementioned problems, in a hitless path switching ring network comprising at least two node devices connected in ring form through a work transmission line and a protection transmission line wherein at the time of normal operation a signal is transmitted with the work transmission line and at the time of failure occurrence in the work transmission line the signal can be transmitted with the protection transmission line in the opposite direction from the direction in which the signal was transmitted before failure occurrence, in order to cause the signal to be received at the other of the two node devices without instantaneous hitting of the signal at the time of failure occurrence, there is provided a failure occurrence time hitless path switching transmission method in the ring network wherein at the time of failure occurrence in the work transmission line, one node device of the node devices, which is transmitting the signal in a direction in which the failure occurred, retransmits the signal held before failure occurrence through the protection transmission line in the opposite direction; and the other node device matches a time phase of the signal received through the work transmission line after failure occurrence with a time phase of the received signal before failure occurrence retransmitted through the protection transmission line from the one node device and outputs the received signal to the outside.

According to the failure occurrence-time hitless path switching transmission method in the ring network of the present invention, at the time of failure occurrence in the work transmission line the one node device of the two node devices, which is transmitting the signal in a direction in which the failure occurred, retransmits the signal held before failure occurrence through the protection transmission line in the opposite direction. Also, the other node device matches a time phase of the signal received through the work transmission line after failure occurrence with a time phase of the received signal before failure occurrence retransmitted through the protection transmission line from the one node device and outputs the received signal to the outside. Therefore, switching of the transmission line can be performed without reducing transmission quality. In addition, the number of node devices can be increased and line utilities can be replaced.

BRIEF DESCRIPTION OF THE DRAWINGS

The above and other objects and advantages will become apparent from the following detailed description when read in conjunction with the accompanying drawings wherein:

FIG. 5 is a diagram showing the data construction example of the switching bytes according to the first embodiment of the present invention;

FIG. 6 is a diagram showing a path connection table that shows the start point and end point of a path signal from a low-speed transmission line to a high-speed transmission line and from the low-speed transmission line to the high-speed transmission line in each node device of the ring network according to the first embodiment of the present invention;

FIG. 7 is a block diagram showing the node device according to the first embodiment of the present invention;

FIG. 20 is a block diagram showing the node device according to the third embodiment of the present invention;

FIG. 34 is a diagram showing a ring network according to a sixth embodiment of the present invention;

DESCRIPTION OF THE PREFERRED EMBODIMENTS

The preferred embodiments of the present invention will hereinafter be described in reference to the drawings.

(a) Description of a First Embodiment

Figure 1:
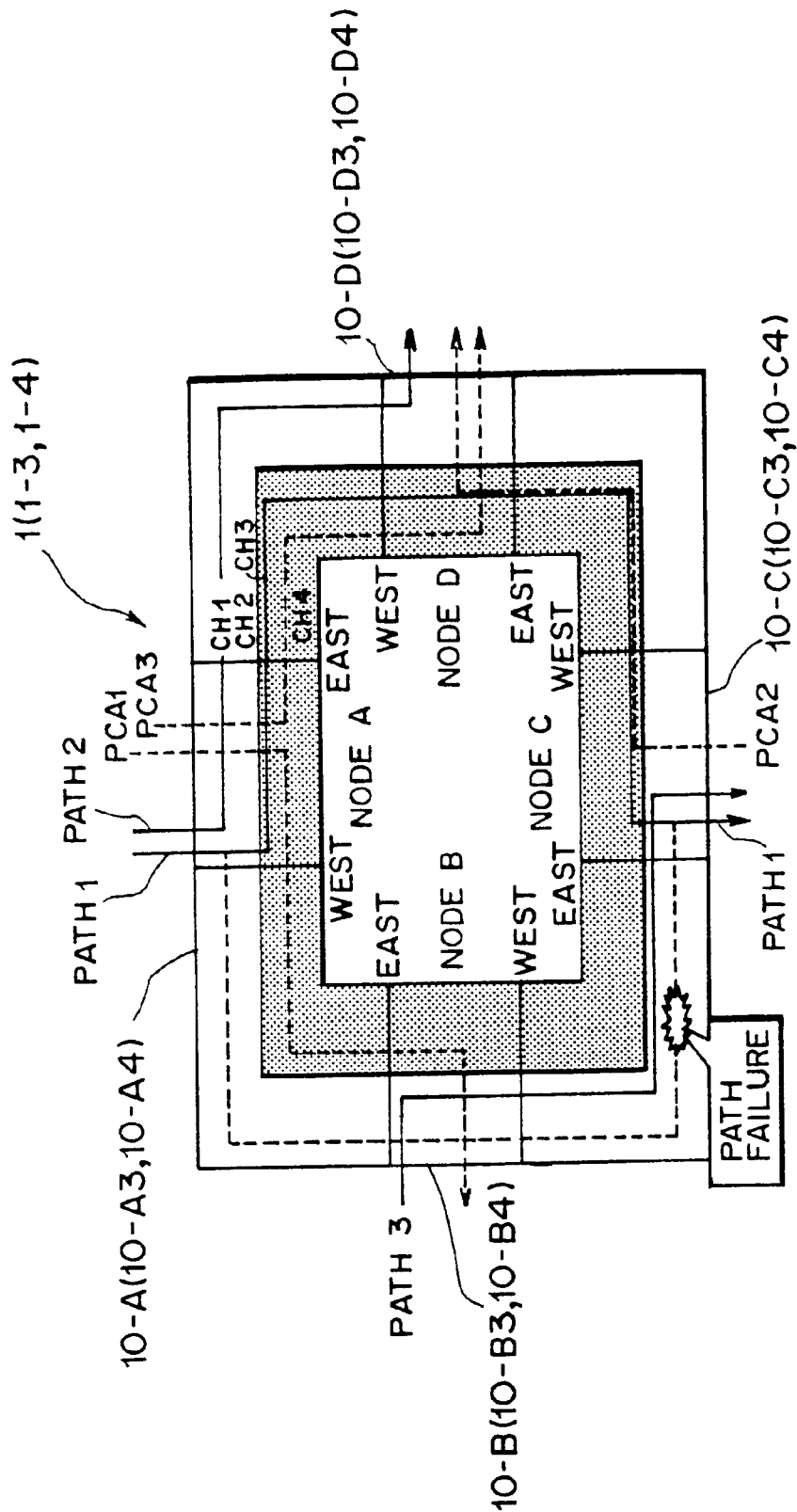
FIG. 1 is a diagram showing a ring network according to a first embodiment of the present invention.

FIG. 1 is a diagram showing a ring network 1 according to the first embodiment of the present invention. As shown in the diagram, the hitless path switching ring network (BLSR) 1 of this embodiment transmits a path signal received through a low-speed transmission line, into a high-speed transmission line (optical fiber between node devices) and outputs a path signal being transmitted along the high-speed transmission line onto a desired low-speed transmission line, at the time of normal operation, while it can switch the transmission line for each path at the time of failure occurrence.

Here, the switching of the transmission line in the ring network 1 is performed for each path. An add node on the transmitting side transmits a path signal held before failure occurrence, in the direction opposite from the direction in which the path signal before failure occurrence was transmitted (bridging process). After failure occurrence, in the node device on the receiving node side (drop node), if the path signal before failure occurrence in the work transmission line where the failure occurred, sent out again from the add node, is received, the received path signal will be adjusted in phase and sent out onto the low-speed transmission line (switching process).

Note that the ring network 1 is constructed so that node devices 10-A~10-D (node A, node B, node C, and node D) are connected in ring form by two optical fibers (transmission lines). Within each optical fiber, signals are transmitted in the directions opposite from each other. In FIG. 1, these two optical fibers are not separately expressed.

Also, the optical fibers each employ one-half their transmission capacity in the work channel and the remaining half in the protection channel. At the time of normal operation, path signals are transmitted with previously set work channels, respectively. Note that a protection channel access (PCA) signal, for example, can also be transmitted onto a protection channel empty at the time of normal operation.

For instance, when 1~N channels (N=an integer) can be set in a single optical fiber, at the time of normal operation 1~(N/2) channels are employed for transmission of path signals as work channels, while the remaining [(N/2) +1]~N channels can be employed for transmission of PCA signals as protection channels.

And this ring network 1 employs the work channel to transmit a path signal at the time of normal operation, as described above, but if a path failure occurs in the work channel, the ring network 1 will employ the protection channel to transmit the path signal where the failure occurred.

For example, when a path failure occurs in the work channel J [which is any one of 1~(N/2) work channels], the path signal before failure occurrence is transmitted with the channel [J+(N/2)] onto the transmission line opposite from the transmission line direction in which the failure occurred.

Note that the ring network 1 shown in FIG. 1 premises the case of handling 4 channels (N=4) in the transmission directions, respectively. Channels 1 and 2 (CH1 and CH2) are employed as work channels, while channels 3 and 4 (CH3 and CH4) are employed as protection channels.

Here, for the hitless path switching process sequence of performing transmission with the protection channel when a failure occurs in a path signal transmitted with the work channel in this ring network 1, a description will be made, for example, with respect to the case where between the node devices 10-B and 10-C a path failure occurs in the transmission line of transmitting a signal toward the node device 10-C with the work channel (CH1).

Figure 2:
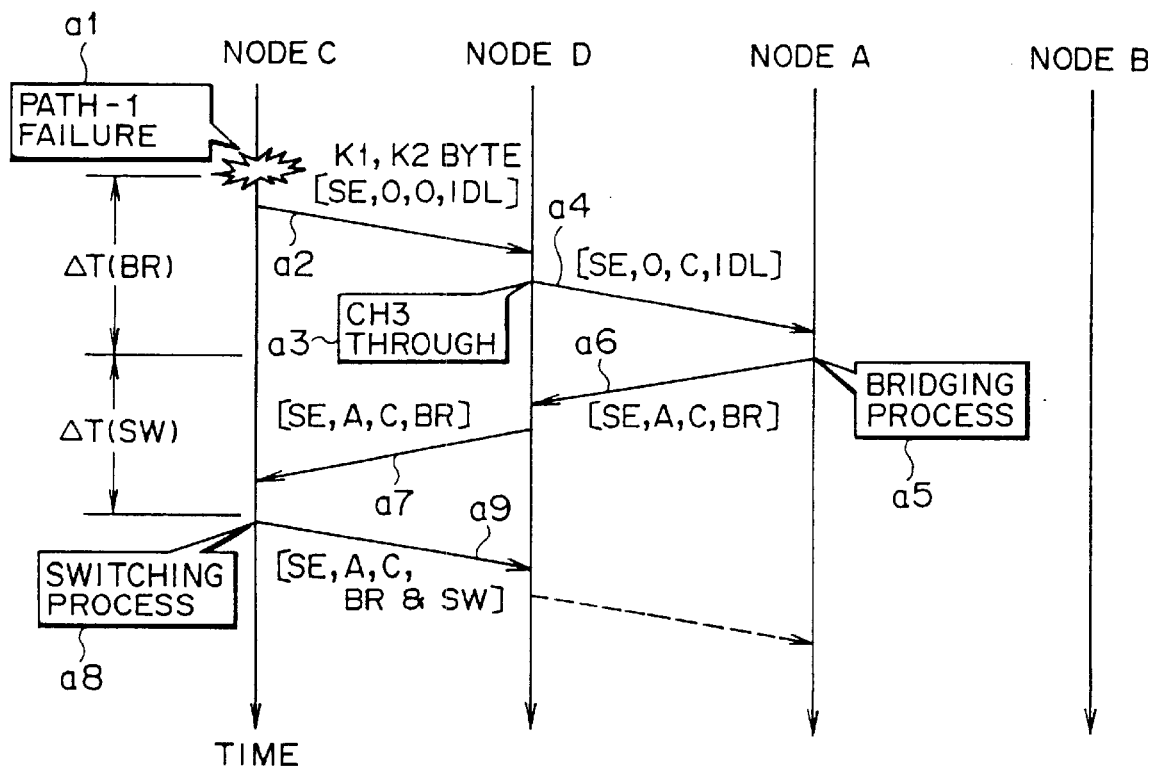
FIG. 2 is a sequence diagram for explaining the switching process in the ring network according to the first embodiment of the present invention.

As shown in FIG. 2, if the node device 10-C (C node) detects, for example, a path-1 failure in the work channel (step a1), the node C will send out a switching request (request of the bridging process) toward the node device 10-D by the switching bytes K1 and K2 (step a2).

If the node device 10-D (D node) detects the switching request (switching bytes) from the SOH of the SDH frame, the node D will set itself so that the path signal coming in with the protection channel (CH3) is passed therethrough (e.g., a path signal coming in with the protection channel from the node A is passed through toward the node C) (step a3), and will transmit the switching bytes toward the node device 10-A (step a4).

If the node device 10-A receives the switching request sent from the node device 10-C, the node device 10-A will judge that the bridging process is performed at its own node and output with the protection channel the path signal held before path failure occurrence onto the transmission line opposite from the transmission line direction in which the path failure occurred (step a5).

On the other hand, the node device 10-A inserts information, indicating that the node device 10-A is in a bridge status (status after the bridging process has been performed), in the switching bytes and outputs the processed switching bytes toward the node device 10-C (steps a6 and a7).

The drop node device 10-C detects the switching bytes sent from the add node device 10-A, then judges that the switching bytes is a request to make a switch at its own node, and performs the switching process (step a8).

Here, the drop node device 10-C matches the phase of the path signal coming in with the work channel with the phase of the path signal coming in after failure occurrence with the protection channel (path signal output from the node device 10-A before path failure occurrence), and outputs the path signal coming in with the protection channel received after failure occurrence onto the low-speed transmission line.

On the other hand, the drop node device 10-C adds its present status to the SOH as a switching byte and outputs it to the node devices 10-D and 10-A (step a9). Note that the above-mentioned switching byte is transmitted with the work channel.

Figure 3:
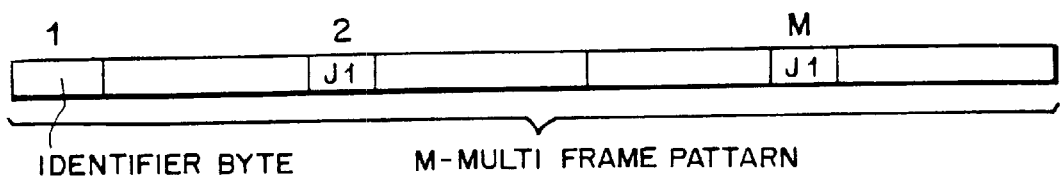
FIG. 3 is a diagram for explaining the data construction example of a path signal transmitted in the ring network according to the first embodiment of the present invention.
Figure 4:
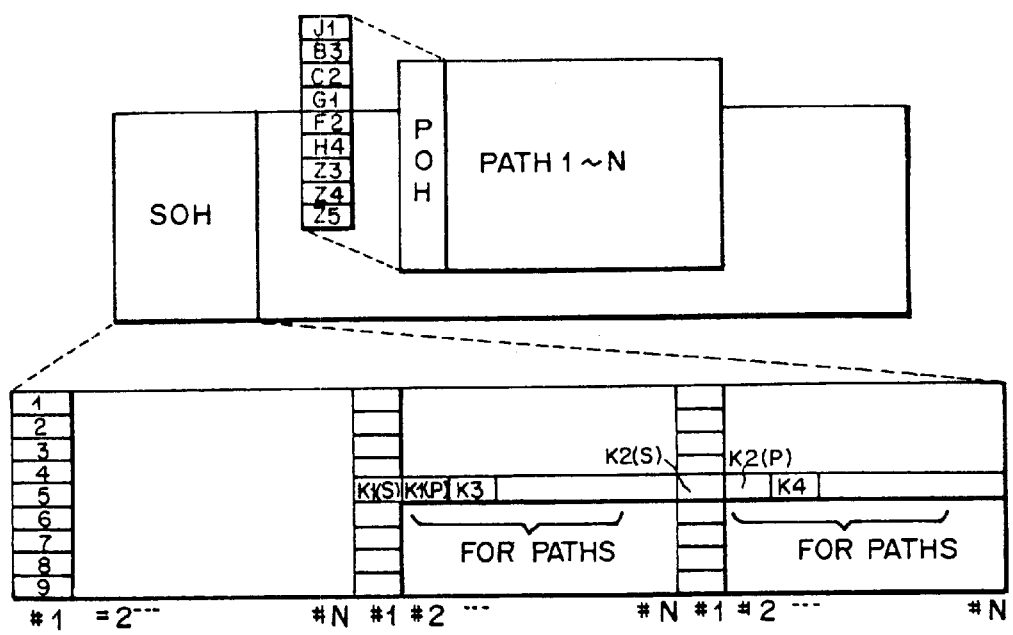
FIG. 4 is a diagram for explaining how the switching bytes are added to the SOH in the ring network according to the first embodiment of the present invention.

Incidentally, each path signal is equipped with a path over head (POH), as shown in FIG. 4. The byte J1 indicates the head position of each path signal. Also, as shown in FIG. 3, each path signal constitutes an M-multi frame (where M is an integer and which is also referred to as simply a path signal) in consideration of the delay difference in a transmission line and the switching time and is given an identifier for judging the head of each multi-frame.

Also, in FIG. 4, [K1 (S: Section) and K2(S)], added within the SOH, are the switching bytes that are used when a section failure occurs. [K1 (P: Path) and K2 (P)], [K3 and K4], [K4 and K5], etc. are the switching bytes corresponding to path 1, path 2, path 3, etc., which are used when a path failure occurs. The data structure example of these switching bytes is shown in FIG. 5.

As shown in FIG. 5, the switching bytes for a section and each path are constituted by (1) request information indicating the contents of a switch, (2) a bridge node ID information indicating a node device that performs a bridging process, (3) a switching node ID information indicating a node device that receives a path signal coming in with the protection channel by the bridging process, and (4) status information indicating a status.

Note that in this embodiment, a description will be made with respect to the case where the request information uses a switching request [(ring) SE: 0001].

The node devices 10-A~10-D each terminate the SOH from the SDH frame to detect these information, thereby judging whether or not a switch is made from the work channel to the protection channel at its own node. For this judgment, each node device is provided with a path connection table for holding information about a drop node and an add node for each channel, such as that shown in FIG. 6.

In reference to these connection tables, the node, devices 10-A~10-D each judge whether either the bridging process, the dropping process, or through control (described later) is performed on a path signal.

Incidentally, in this ring network 1, in transmitting a path signal coming in along a low-speed transmission line onto the high-speed transmission line, the node devices 10-A~10-D each hold the transmitted path signal. If a path failure occurs in the transmitted path signal, each node device will transmit the path signal held before failure occurrence, in the opposite direction from the direction in which the path failure occurred.

For instance, as shown in FIG. 1, if a path failure occurs in the path signal sent out with the work channel (CH1) onto the transmission line on the west side at the time of normal operation, the node device 10-A will send out the path signal held before failure occurrence onto the transmission line on the east side with the protection channel (CH3) (bridging process).

Note that if the node device 10-C receives a switching request (status BR) from the node device 10-A that performed the bridging process, the node device 10-C will perform the channel switching process of receiving with the protection channel (CH3) the path signal (path 1) being received with the work channel (CH1).

Also, the node devices 10-A~10-D each process both a signal going from the east side to the west side and a signal going from the west side to the east side. For example, the node devices 10-A~10-D each process signals that are transmitted on the east and west sides with the work channels (CH1 and CH2) and the protection channels (CH3 and CH4).

For this reason, the node devices 10-A~10-D are equipped with a hitless path switch control section 11, a switching-byte detecting section 12, and a switching-byte inserting section 13, as shown in FIG. 7. Also, the node devices 10-A~10-D are equipped with a demultiplexing section 14, a through processing section 15, and a multiplexing section 16 for each direction of transmission (east and west sides). Furthermore, the node devices 10-A~10-D are equipped with an add interface 30 shown in FIG. 9 and a drop interface 20 shown in FIG. 8.

A description will hereinafter be made with (west) or (east) added after each reference numeral. The (west) indicates that it is associated with a signal transmitted from the transmission line on the east side onto the transmission line on the west side, while the (east) means that it is associated with a signal transmitted from the transmission line on the west side onto the transmission line on the east side.

Here, the hitless path switch control section 11 monitors the switching-byte detecting section 12, the switching-byte inserting section 13, and a hitless path switching bridge processing section 33 to be described later (see FIG. 9). Based on the switching bytes detected by the switching-byte detecting section 12, the hitless path switch control section 11 judges whether or not a switch is made at its own node from the work channel to the protection channel to transmit a transmitted signal. Also, this hitless path switch control section 11 controls the switching-byte inserting section 13 and maps predetermined information within the SOH of the SDH frame at either the multiplexing section 16 (west) or the multiplexing section 16 (east).

Furthermore, the through processing sections 15 (west, east) each pass or do not pass a path signal therethrough in the unit of a path under control of the hitless path switch control section 11. For this reason, the through processing sections 15 (west, east) are equipped with through selecting sections (hereinafter referred to as selecting sections) 15-1~15-4 (west, east), which correspond channels, respectively. For instance, the selecting section 15-1 (west) selects and outputs a signal (CH1) coming in from either the demultiplexing section 14 (west) or the add interface 30, by control of the hitless path switch control section 11.

Also, the demultiplexing sections 14 (west, east) each terminate the SOH of the SDH frame received through the transmission line, and also demultiplexer signals from the SDH frame in accordance with channels, respectively. The switching-byte detecting section 12 detects the switching bytes from the SOH terminated by each of the demultiplexing sections 14 (west, east) and outputs the detected switching-byte information to the non-break switch control section 11.

Furthermore, the switching-byte inserting section 13 sends out the switching bytes to either the multiplexing section 16 (west) or the multiplexing section 16 (east) and inserts the switching bytes in the SOH, in making a switch from the work channel to the protection channel at the time of path failure occurrence.

Figure 9:
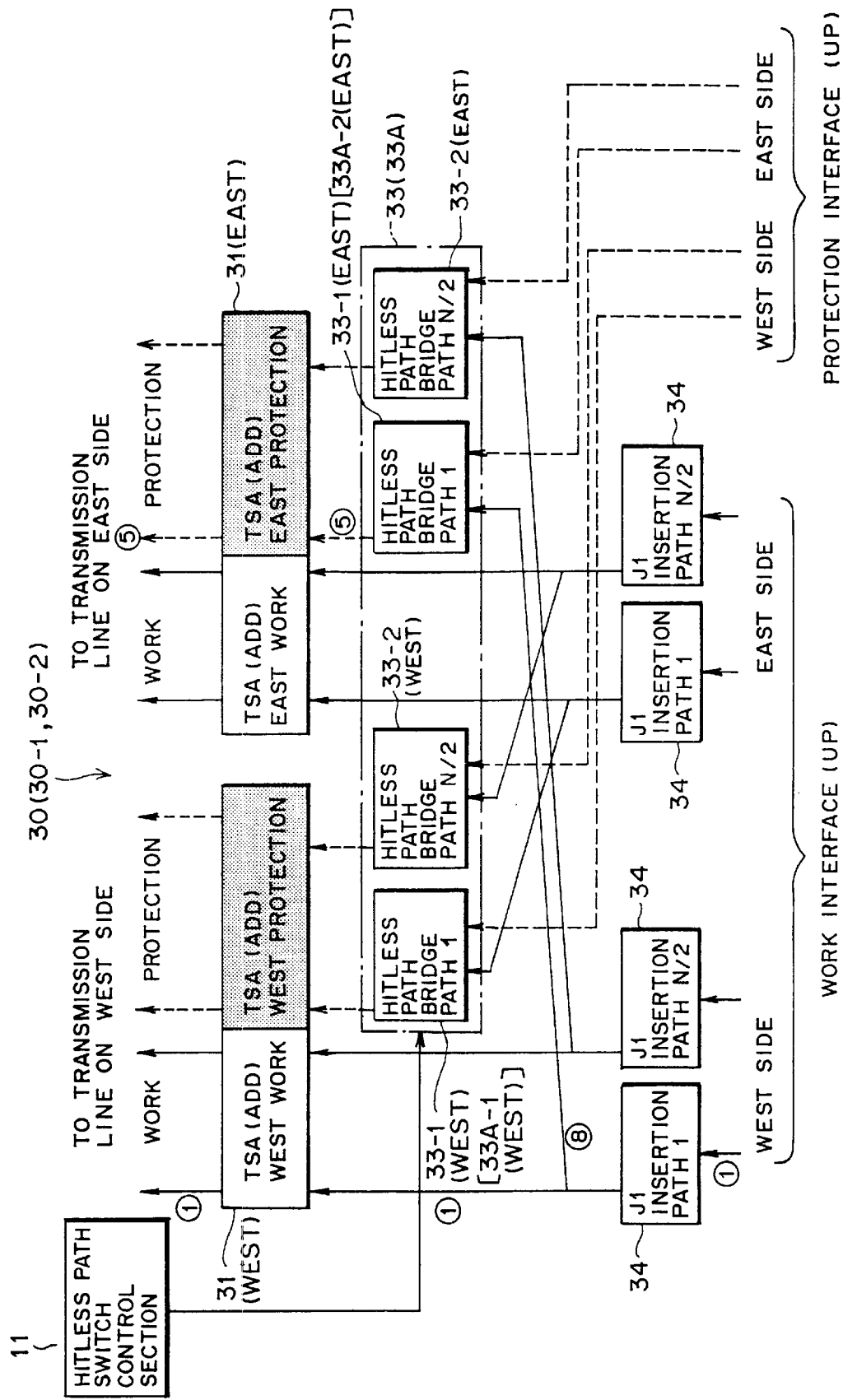
FIG. 9 is a block diagram showing a drop interface according to the first embodiment of the present invention.

Next, the add interface 30 shown in FIG. 9 is an interface for adding a path signal received from another network or the like (low-speed transmission line) onto the high-speed transmission line.

For this reason, the add interface 30 is equipped with time slot assignment (TSA) sections 31 (west, east), a hitless path switch bridge processing section 33, and a plurality of byte J1 inserting sections 34. Note that in FIG. 9, the byte J1 inserting section 34 is expressed as J1 insertion.

Here, the TSA sections 31 (west, east) are provided in the directions (east, west) of transmitting a signal, respectively, and each TSA section 31 assigns a time slot. For example, the TSA section 31 assigns the work channel (CH1), the protection channel (CH4), or the like to a signal coming in along a low-speed transmission line. Note that the assignment of the time slot has previously been set.

Also, each byte J1 inserting section 34 is provided for each signal that is transmitted with the work channel. the byte J1 inserting section 34 inserts an identifier by a freerunning counter in the byte J1 of the POH of a path signal received through a low-speed transmission line, the byte J1 indicating the head of the M-multi frame.

The hitless path switch bridge processing section 33 holds a path signal transmitted to the high-speed transmission line side. If a failure occurs in a path signal being transmitted with the work channel, the hitless path switch bridge processing section 33 will read out and output the path signal held before failure occurrence. Here, after path failure occurrence, the hitless path switch bridge processing section 33 outputs with the protection channel the path signal held before path failure occurrence onto the transmission line in the opposite direction from the transmission line direction in which the path failure occurred.

For instance, when a path failure occurs in the path signal sent out onto the transmission line on the west side with the work channel, the hitless path switch bridge processing section 33 transmits the path signal held before failure occurrence toward the transmission line on the east side.

For this reason, the hitless path switch bridge processing section 33 is equipped with bridge sections 33-1 and 33-2 (west, east), which correspond to path signals that are transmitted onto the transmission lines on the west and east sides at the time of path failure occurrence, respectively. Note that in FIG. 9, each of the bridge sections 33-1 and 33-2 (west, east) is expressed as a hitless path switching bridge.

The bridge sections 33-1 and 33-2 (west, east) each hold the path signal output by the byte J1 inserting section 34 and adjust the write and read phases in holding the path signal. Note that the bridge sections 33-1 and 33-2 are provided so as to correspond to path signals, respectively. After a signal has been sent out with the work channel, if a path failure is detected, the bridge sections 33-1 and 33-2 each will output a path signal in the opposite direction from the direction of transmission in which the path failure occurred.

For example, in the node device 10-A, the path signal (path 1), transmitted onto the transmission line on the west side with the work channel (CH1), is held by the bridge section 33-1 (east) on the east side. If a path failure occurs, the held path signal will be read out from the bridge section 33-1 (east) and sent out toward the transmission line on the east side. Note that the path signal (path 1) read out from the bridge section 33-1 (west) is assigned the previously set protection channel (CH3) by the TSA section 31 (east) and is sent out onto the transmission line on the east side.

Figure 10:
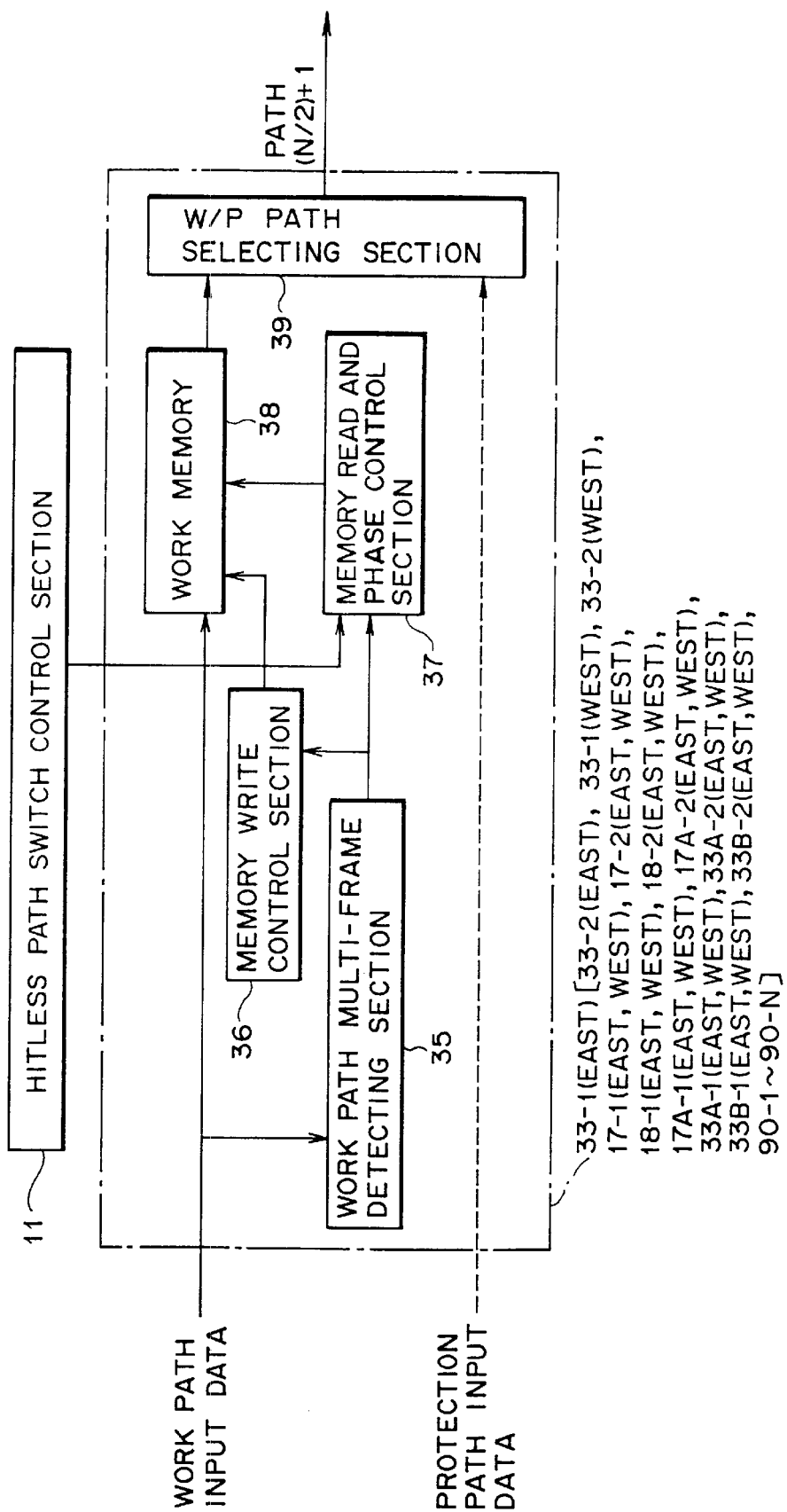
FIG. 10 is a block diagram showing a bridge section according to the first embodiment of the present invention.

For this reason, the bridge sections 33-1 and 33-2 (west, east) are each equipped with a work multi-frame detecting section 35, a memory write control section 36, a memory read phase control section 37, a work memory 38, and a work/protection path selecting section 39, as shown in FIG. 10.

Here, the work multi-frame detecting section 35 detects the identifier of the M-multi frame of a path signal sent out from the byte J1 inserting section 34. When the work multi-frame detecting section 35 detects the head of the M-multi frame, it outputs the frame pulse to the memory write control section 36 and the memory read phase control section 37 as the write phase and the read phase.

The memory write control section 36 performs the control of writing the M-multi frame data to the work memory 38, in response to reception of the frame pulse indicating the head of the M-multi frame, sent from the work multi-frame detecting section 35.

The work memory (first memory section) 38 stores a signal being transmitted with the work channel at the time of normal operation and holds the M-multi frame data output from the byte J1 inserting section 34.

If there is a switching request (request of the switching process), the work/protection path selecting section 39 will select the data output from the work memory 38 and output it to the TSA section 31 (east), by control from the hitless path switch control section 11. At the time of normal operation, the work/protection path selecting section 39 selects a protection signal.

When a failure occurs in the path signal transmitted with the work channel, the memory read phase control section (first read control section) 37 reads out the path signal held before failure occurrence, from the work memory 38 and sends out the read path signal in a direction differing from the direction of transmission used before failure occurrence. Based on the frame pulse from the work multi-frame detecting section 35, in addition to reading out the M-multi frame data held in the work memory 38, the memory read phase control section 37 also performs a control of reading out the M-multi frame data held in the work memory 38, when receiving the switching request sent from the hitless path switch control section 11.

Figure 11:
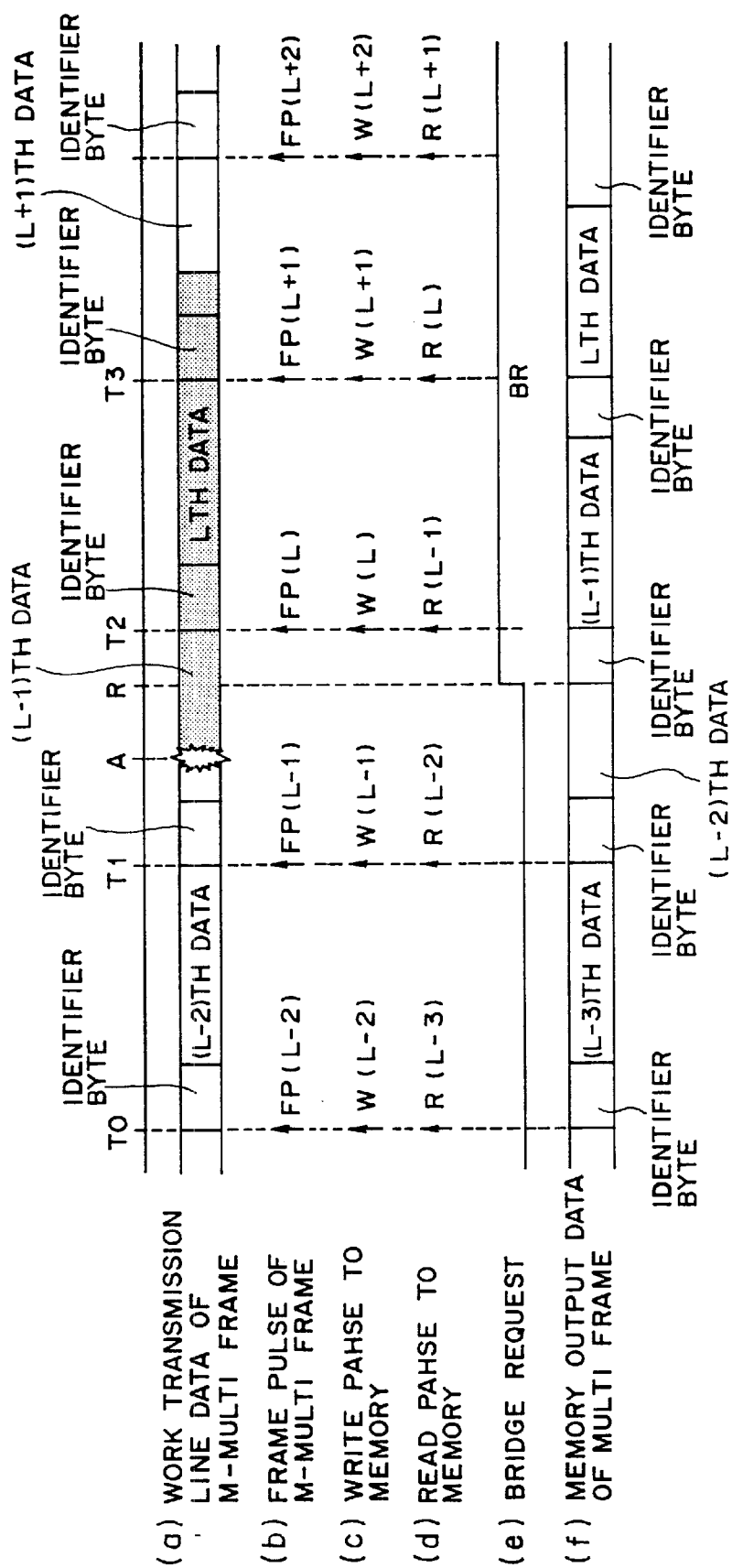
FIGS. 11(a)~11(f) are timing charts for explaining the phase relation between the writing and reading of the bridge section according to the first embodiment of the present invention, respectively.

Here, FIGS. 11(*a*)~(*f*) are timing charts for explaining the phase relation between the write and read operations of the bridge sections 33-1 and 33-2 (east, west) The L (integer) in FIG. 11 means that a number has been added to the M-multi frame in the order that the M-multi frame comes in.

As shown in FIGS. 11(*a*)~(*f*), at timing T0, if the work multi-frame detecting section 35 detects the identifier of the (L-2)th M-multi frame transmitted on the work channel (in FIG. 11(*b*) the frame is expressed as FP(L-2)), the memory write control section 36 will begin to write the (L-2)th M-multi frame data to the work memory 38 (in FIG. 11(*c*) the frame data is expressed as W(L-2).

On the other hand, the memory read phase control section 37 will begin to read the (L-3)th M-multi frame data from the work memory 38 (in FIG. 11(*d*) the frame data is expressed as R(L-3)), as shown in FIG. 11(*f*). Similarly, at timing T1, the (L-1)th M-multi frame data is written to the work memory 38, while the (L-2)th M-multi frame data is read out from the work memory 38.

Incidentally, for instance, at timing A, when a path failure occurs in the path signal transmitted with the work channel, the hitless path switch control section 11 will output a bridging request to the memory read phase control section 37 at timing R, if it receives a switching request (request of the bridging process) sent out by another node device. The memory read phase control section 37 likewise reads out the (L-1)th M-multi frame data from the work memory 38. The (L-1)th M-multi frame data read out is selected and output at the work/protection path selecting section 39 by control of the hitless path switch control section 11.

Figure 8:
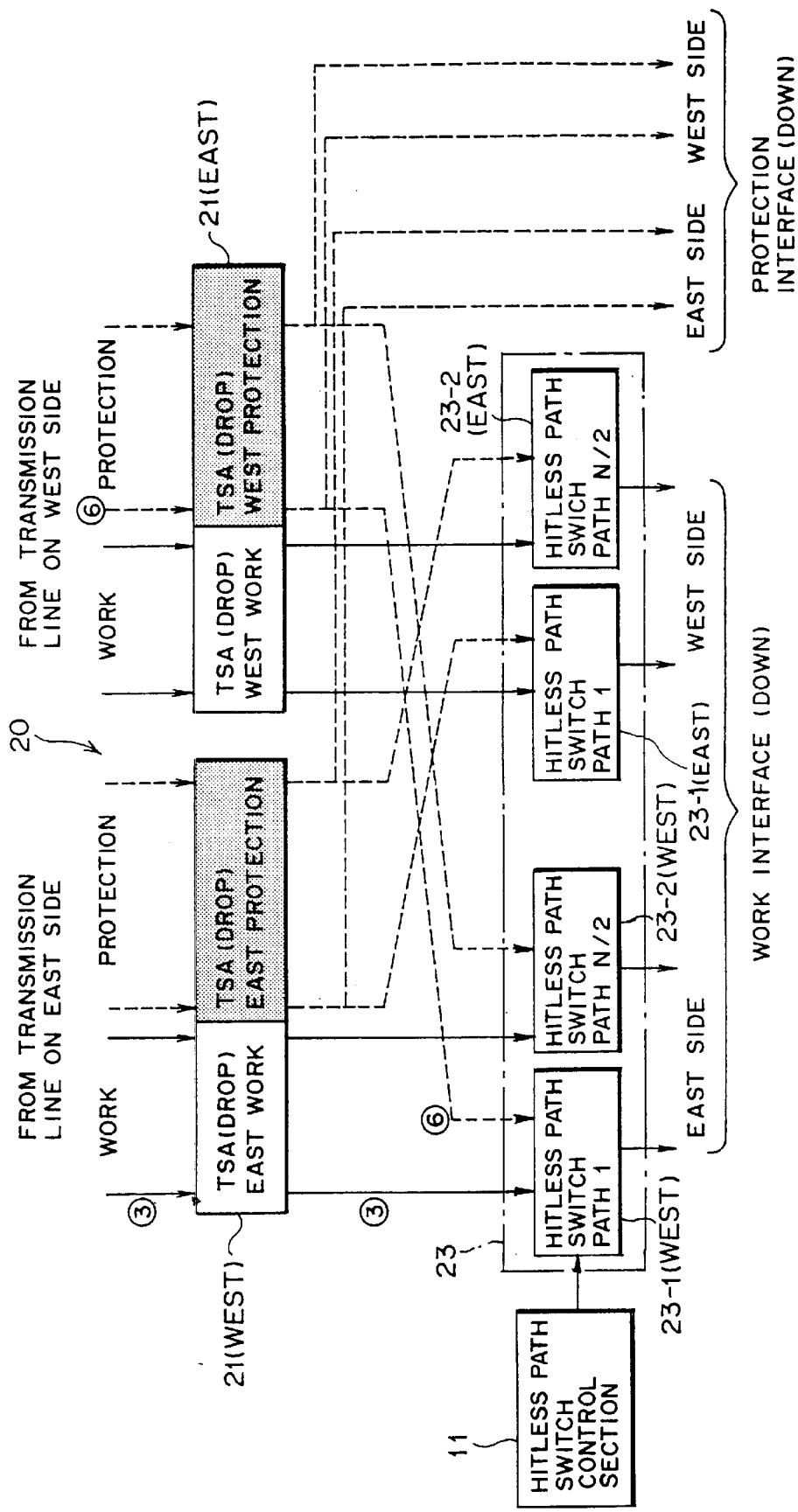
FIG. 8 is a block diagram showing an add interface according to the first embodiment of the present invention.

The drop interface 20, shown in FIG. 8, is an interface for dropping a path signal and a PCA signal coming in along the high-speed transmission line to another network (low-speed transmission line) For this reason, the drop interface 20 is equipped with TSA sections 21 (west, east) and a hitless path switch processing section 23, as shown in FIG. 8.

Note that the TSA sections 21 (west, east) each send out a path signal coming in along each transmission line to a place set previously for each channel.

Here, if a path failure occurs in a path signal coming in with the work channel, the hitless path switch processing section 23 will receive the path signal coming in with the protection channel and output the received path signal onto the low-speed transmission line without instantaneous hitting of the signal.

That is, at the time of normal operation, if the hitless path switch processing section 23 receives a path signal coming in along the transmission line on the east side with the work channel, it will hold the path signal temporarily and will output the path signal onto the low-speed transmission line after making a phase adjustment (after a predetermined time has been delayed). However, when a path failure occurs in the path signal coming in along the transmission line on the east side with the work channel, the hitless path switch processing section 23 temporarily holds the path signal before path failure occurrence which is coming in along the transmission line on the west side with the protection channel (i.e., path signal read out from the work memory 38). After making a phase adjustment (after a predetermined time has been delayed), the hitless path switch processing section 23 outputs the path signal onto the low-speed transmission line.

Note that at the time of normal operation, in the case where a path failure occurs in a path signal coming in along the transmission line on the west side with the work channel, the hitless path switch processing section 23 likewise holds a path signal coming in along the transmission line on the east side with the protection channel (path signal before path failure occurrence) and makes a phase adjustment.

For this reason, the hitless path switch processing section 23 is equipped with switching sections 23 1and 23-2 (west, east) for handling path signals coming in along the transmission lines on the east and west sides, respectively. Note that in FIG. 8, the switching sections 23-1 and 23-2 (west, east) are expressed as hitless path switches.

Here, the switching sections 23-1 and 23-2 (west, east) are provided so as to correspond to path signals, respectively. Each switching section adjusts the phase of a received signal and outputs the adjusted signal onto the low-speed transmission line.

At this time, at the time of normal operation, in addition to adjusting the phase of the path signal coming in with the work channel and outputting the adjusted signal onto the low-speed transmission line, at the time of path failure occurrence the switching sections 23-1 and 23-2 (west, east) each receive a path signal before failure occurrence which comes in from the direction opposite from the direction of transmission coming in with the work channel, then make a phase adjustment, and output the adjusted signal onto the low-speed transmission line. For instance, the path signal, received through the transmission line on the west side at the time of normal operation, is received through the transmission line on the east side at the time of path failure occurrence.

Figure 12:
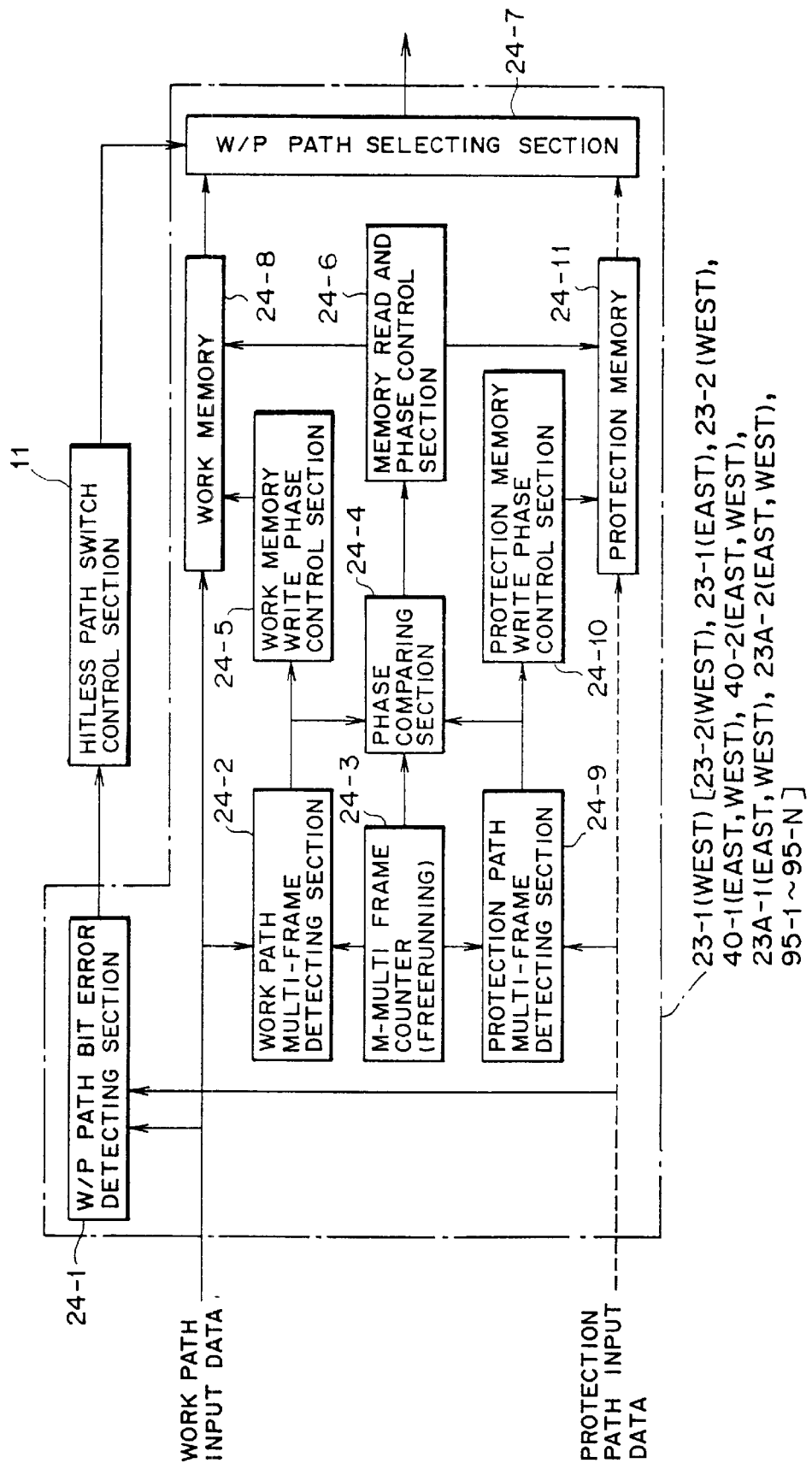
FIG. 12 is a block diagram showing a switching section according to the first embodiment of the present invention.
Figure 13:
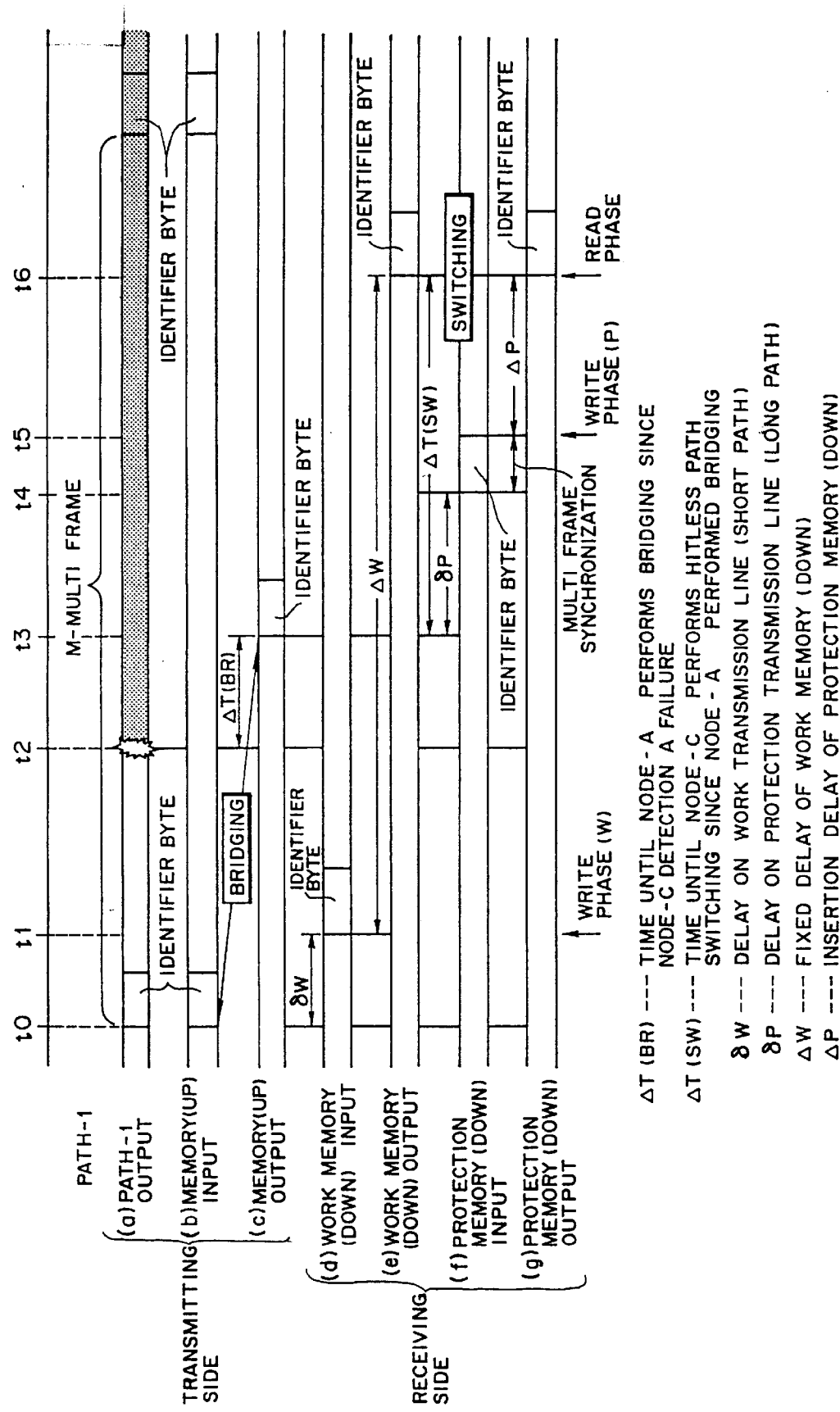
FIGS. 13(a)~13(g) are timing charts for explaining the operation of hitless path switching in the ring network according to the first embodiment of the present invention, respectively.

For this reason, the switching sections 23-1 and 23-2 (west, east) are equipped with a work/protection path bit error detecting section 24-1, a work path multi-frame detecting section 24-2, an M-multi frame counter 24-3, a phase comparing section 24-4, a work memory write phase control section 24-5, a memory read phase control section 24-6, a work/protection path selecting section 24-7, a work memory 24-8, a protection path multi-frame detecting section 24-9, a protection memory write phase control section 24-10, and a protection memory 24-11, as shown in FIG. 12.

Here, the work/protection path bit error detecting section 24-1 counts the number of the bit errors in work and protection path signals and informs the hitless path switch control section 11 of the count information.

The work path multi-frame detecting 21 section 24-2 detects an identifier indicating the head of the M-multi frame from the work path input data and writes the frame pulse at this time. The protection path multi-frame detecting section 24-9 also detects the identifier indicating the head of the M-multi frame. At the time of normal operation, for the protection path input data (signal coming in with the protection channel), the protection path multi-frame detecting section 24-9 does not perform multi-frame synchronization because the path data on the PCA channel is input.

The work memory write phase control section 24-5 writes the M-multi frame data to the work memory 24-8, based on the identifier (frame pulse) indicating the head of the M-multi frame detected by the work path multi-frame detecting section 24-2. The protection memory write phase control section 24-10 writes the M-multi frame data to the protection memory 24-11, based on the identifier (frame pulse) indicating the head of the M-multi frame detected by the protection path multi-frame detecting section 24-9 at the time of path failure occurrence.

The work memory (second memory section) 24-8 stores a path signal coming in with the work channel at the time of normal operation and holds the work path input data (path signal), while the protection memory (third memory section) 24-11 stores a path signal coming in along the transmission line with the protection channel by the memory read phase control section 37 of an add node at the time of path failure occurrence and holds the protection path input data.

The M-multi frame counter 24-3 is a freerunning counter. When there is a switching request (request of the switching process) from the hitless path switch control section 11), the M-multi frame counter 24-3 regards its count value as a write phase.

Also, the phase comparing section 24-4 judges the relative phase difference between a path signal coming in with the work channel and a path signal coming in with the protection channel and inserts a delay of AP in the slower write phase, thereby regarding it as a read phase.

The memory read phase control section (first phase adjusting section) 24-6 matches the time phase of the path signal (after path failure occurrence) stored in the work memory 24-8 with the time phase of the path signal (before path failure occurrence) stored in the protection memory 24-11, at the time of path failure occurrence and outputs the path signal held in the protection memory 24-11 toward the low-speed transmission line.

Note that the memory read phase control section 24-6 performs the control of reading out the M-multi frame data held in either the work memory 24-8 or the protection memory 24-11, based on the phase comparison result (read phase) at the phase comparing section 24-4.

The work/protection path selecting section 24-7 selects either the work path input data or the protection path input data. Under control of the hitless path switch control section 11, the work/protection path selecting section 24-7 selects the work path input data (signal coming in with the work channel) at the time of normal operation and the protection path input data at the time of path failure occurrence.

Here, FIGS. 13(a)~(g) are timing charts for explaining the hitless path switching operation. For example, with respect to the case where a path-1 failure occurs between the node device 10. Band the node device 10-C, a description will hereinafter be made. At timing t0, the node device 10-A on the transmitting side outputs a path signal toward the west side with the work channel (FIG. 13(a)) and also writes the output M-multi frame data to the work memory 38 (FIG. 13(b)).

On the other hand, the node device 10-C on the receiving side receives the M-multi frame data output at timing to, at timing delayed since timing to by time. W (delay time on the channel), and writes the M-multi frame data received at timing t1 to the work memory 24-8 (FIG. 13(d)). The M-multi frame data written to the work memory 24-8 is read out from the work memory 24-8 at timing delayed by a fixed time $\Delta W$ (FIG. 13(e)).

And at the time of normal operation, the work/protection path selecting section 24-7 selects the output of the work memory 24-8 under control of the hitless path switch control section 11, so the work/protection path selecting section 24-7 outputs the M-multi frame data read out from the work memory 24-8 at timing delayed by the fixed time $\Delta W$, onto the low-speed transmission line.

Incidentally, if the node device 10-C detects a path failure occurring at timing t2, it will output a switching request. If the add node device 10-A receives the switching request output from the node device 10-C, under control of the hitless path switch control section 11 the node device 10-A will read out the data held in the work memory 38 (FIG. 13(c)) and will transmit the path signal with the protection channel in the opposite direction from the direction in which the path failure occurred (e.g., when a path signal is sent out onto the transmission line on the west side with the work channel, the path signal is sent out onto the transmission line on the west side). Here, until the node device 10-A (A node) performs the switching process since the node device 10-C (C node) detected the failure, the time requires about $\Delta T$ (BR).

On the other hand, the node device 10-C receives the transmitted signal before failure occurrence which the node device 10-A output with the protection channel by the bridging process, at timing delayed since timing t3 by $\delta P$ (which is a delay time on the protection channel) and writes the received signal to the protection memory 24-1, after multi-frame synchronization has been detected by the protection path multi-frame detecting section 24-9 (FIG. 13(f)).

The M-multi frame data, written to the protection memory 24-11, is read out after phase adjustment with the data being held in the work memory 24-8 has been performed (i.e., after read timing has been delayed by $\Delta P$) (FIG. 13(g)). For the M-multi frame data read out from the protection memory 24-11, the protection path input data is selected and output onto the low-speed transmission line under control of the hitless path switch control section 11. Here, until the node device 10-C (C node) performs the switching process since the node device 10-A performed the bridging process, the time requires about $\Delta T$ (SW).

The operation-inside and outside the node devices 10-A~10-D of the ring network 1 according to the first embodiment, constructed as described above, will be described.

At the time of normal operation, between the node devices 10-A and 10-D a path signal is transmitted with the work channel.

Here, in the node device 10-A, a path signal coming in along a low-speed transmission line is output onto the high-speed transmission line via the add interface 30. For example, consider a path 1 signal that is output onto the transmission line-on the west side. The path signal is sent onto the multiplexing section 16 (west) via the J1 byte inserting section 34 and the TSA section 31 (west) in accordance with route ① shown in FIG. 9.

In the multiplexing section 16 (west), a plurality of signals corresponding to channels are added to the high-group SDH frame, and the SDH frame is output onto the transmission line on the west side.

The node device 10-A holds the path signal in the bridge section 33-1 (east) of the add interface 30, while outputting the path signal from the low-speed transmission line onto the high-speed transmission line.

That is, the bridge section 33-1 (west) shown in FIG. 10 writes the path signal to the work memory 38 under control of the memory write control section 36. On the other hand, if the node device 10-B receives with the work channel the high-group SDH frame added with the path signal, the demultiplexing section 14 (west) will demultiplex signals from the SDH frame in accordance with channels.

The path signals, demultiplexed in accordance with channels, are output on either the transmission line (high-speed transmission line) on the west side or the low-speed transmission line.

Here, the node device 10-B sets itself so that the path signal on the path 1 is passed therethrough, and sends the path signal to the multiplexing section 16 (west) via the selecting section 15-1 (west) in accordance with route ② shown in FIG. 7.

The multiplexing section 16 (west) adds the plurality of signals corresponding to channels to the high-group SDH frame and outputs the SDH frame onto the transmission line on the west side.

On the other hand, in the node device 10-C, if the high-group SDH frame added with the path signal (path 1) coming in along the transmission line on the east side is received, the signals added to the SDH frame will be demultiplexed by the demultiplexing section 14 (west) in accordance with channels.

The path signal (path 1) is sent to the drop interface 20 in accordance with route ③ shown in FIG. 7.

In the drop, interface 20, the path signal is sent to the switching section 23-1 (west) in accordance with route ③ shown in FIG. 8.

The switching section 23-1 (west) temporarily holds the incoming path signal, then adjusts the phase, and outputs the adjusted signal onto the low-speed transmission channel.

That is, the switching section 23-1 (west) shown in FIG. 12 holds the path-1 signal coming in with the work channel in the work memory 24-8, and reads out the path signal from the work memory 24-8 under control of the memory read phase control section 24-6 after phase adjustment. At the time of normal operation, the work/protection path selecting section 24-7 selects the path signal readout from the work memory 24-8 under control of the hitless path switch control section 11. The selected path 1 signal is sent out onto the low-speed transmission line.

Incidentally, the-operation of the node devices 10-A~10-D in the case where, as with the aforementioned, a path (path 1) failure occurs between the node devices 10-B and 10-C will be described with a flowchart shown in FIG. 14. If the path (path 1) failure occurs in the transmission line between the node devices 10-B and 10-C, the node device 10-C will detect the path failure from the received signal. That is, the work/protection path input bit error detecting section 24 (see FIG. 12) sends the error information about the counted input data to the hitless path switch control section 11-1, which in turn detects the occurrence of the path failure (step S1).

After detecting the path error, in performing the process of inserting information in the switching bytes (see FIG. 5), the hitless path switch control section 11 detects, based on the path connection table (see FIG. 6), the ID of the node device that switches the path signal where the path failure occurred (step S2). The detected switching node ID is inserted in the switching node ID (4 bits) information provided in the switching bytes. Also, SE (switching request (ring)) is inserted in the request information provided in the switching bytes (step S3).

Thereafter, the hitless path switch control section 11 controls the switching-byte inserting section 13 (see FIG. 7), thereby inserting the switching bytes in the SOH of the SDH frame (step S4).

The SDH frame, added with the switching bytes, is output from the node device 10-C onto the transmission line on the west side (the opposite transmission line from the transmission line where the path failure occurred).

On the other hand, in the node device 10-D, if the SDH frame with the switching bytes transmitted from the node device 10-C is received through the transmission line on the east side and if the switching-byte detecting section (see FIG. 7) detects the switching bytes within the SOH terminated by the demultiplexing section 14 (west) (step S5), information about the detected switching bytes will be output to the hitless path switch control section 11.

The hitless path switch control section 11 judges whether or not the switching request in the switching bytes is SE(0001) (step S6)

Here, when the switching request in the switching bytes is SE(0001), the hitless path switch control section 11 further judges whether or not the status information in the switching bytes of the switching request is BR(0001) or IDL(0001) (YES route in step S6 to step S7).

When the status information in the switching bytes is BR(0001) or IDL(0000), the hitless path switch control section 11 further judges whether or not it corresponds to R(0001) (YES route in step S7 to step SB).

Here, when the status information in the'switching bytes corresponds to the non-switch status IDL (0000), the hitless path switch control section 11 judges in reference to the path connection table (FIG. 6) whether or not its own node is an add node (NO route in step S8 to step S9).

Here, the node device 10-D performs the through control, because it does not correspond to an add node (NO route in step S9 to step S16).

And the node device 10-D further adds the switching bytes received from the node device 10-C to the SOH and outputs the switching bytes to the node device 10-A.

Next, if the node device 10-A detects the switching bytes received from the node device 10-D (step S5), the node device 10-A will judge the request information, etc. in the switching bytes of the switching request in the same way as the above-mentioned node device 10-D (steps S6~S9).

Here, if the hitless path switch control section 11 of the node device 10-A judges in reference to the path connection table that its own node is an add node, the hitless path switch control section 11 will output the M-multi frame data held before path-1 failure occurrence in the work memory 38 (see FIG. 10) onto the transmission line on the east side (in the opposite direction from the direction of the transmission line (west) where the path failure occurred) (bridging control; YES route in step S9 to step S11).

That is, in the add interface 30 of the node device 10-A, the path signal held in the bridge section 33-1 (east) is output toward the high-speed transmission line on the east side in accordance with route ⑤ shown in FIG. 9.

The path (path. 1) signal before path failure occurrence, output from the add interface 30, is passed through the selecting section 15-3 ((N/2)+1) (east) and sent to the multiplexing section 16 (east), in accordance with route ⑤ shown in FIG. 7. In the multiplexing section 16. (east), the path signal is multiplexed to the SDH frame along with other path signals. This SDH frame is output. onto the opposite transmission line on the east side from the transmission line on the west side which sent the path signal before the path failure occurs (see FIG. 1).

In performing the bridging control, the hitless path switch control section 11 inserts the bridge ID and status BR(0001) in the switching bytes (step S12) and adds the switching bytes to the SOH of the SDH frame (step S4). Thereafter, the SDH frame added with the switching bytes (added with status BR(0001)) is sent to other node devices 10-D and 10-C.

In the node device 10-D, judgments of the status, etc. are made in the same way as the control of the switching bytes received from the preceding node device 10-C (steps S5~S8).

Here, since the status information in the switching bytes is BR(0001), the hitless path switch control section 11 of the node device 10-D further judges with the path connection table (see FIG. 6) whether or not its own node corresponds to a switching node (YES route in step S8 to step S13). Because it does not correspond to a switching node, the through control of path-1 signal coming in with the protection channel (CH3) by the bridging process is performed the same as the above-mentioned way (NO route in step S13 to step S16). Thereafter, the node device 10-D adds the switching bytes received from the node device 10-A to the SOH of the SDH frame and outputs the switching bytes to the node device 10-C.

More specifically, if the node device 10-D receives the path signal before path failure- occurrence which was sent by the bridging control at the node device 10-A (path signal coming in with the protection channel), the node device 10-D will pass the path signal therethrough in accordance with route ④ shown in FIG. 7. If there are other path signals at the multiplexing section 16 (east), the path signal before path failure occurrence will be multiplexed to the SDH frame along with the other path signals. The SDH frame is output toward the node device 10-C.

Similarly, the node device 10-C detects the switching bytes received from the node device 10-D and makes judgments of the status and the like (steps S5~S8 and step S13). Since its own node corresponds to a switching node ID, the node device 10-C receives the M-multi frame data before path failure occurrence which was sent with the protection channel by the node device 10-A. After adjusting the phase of the frame data (see FIG. 13), the node device 10-C outputs the adjusted data onto the low-speed transmission line (,switching control; YES route in step S13 to step S14).

More specifically, the node device 10-C receives the SDH frame coming in with the protection channel and performs the demultiplexing process at the demultiplexing section. 14 (east). The node device 10-C sends the demultiplexed path signal (path 1) to the drop interface 20 in accordance with route ⑥ shown in FIG. 7.

The drop interface 20 sends the path signal (path 1) coming in with the protection channel to the switching section 23-1 (west) in accordance with route ⑥ shown in FIG. 8. This switching section 23-1 (west) holds this path signal (path 1) in the protection memory 24-11. After delaying the path signal by ΔP, the switching section 23-1 (west) outputs the signal onto the low-speed transmission line (see FIG. 13(f)).

Therefore, when a path failure occurs, the node device 10-A outputs the path signal being sent with the work channel onto the protection channel in the opposite direction, while the node device 10-C on the receiving side makes a phase adjustment and then outputs the adjusted path signal onto the low-speed transmission line.

Note that in performing the switching control, the hitless path switch control section 1W of the node device 10-C adds status BR&SW (0100) to the switching bytes (step S15) and inserts the switching bytes in the SOH of the SDH frame (step S4). Thereafter, the SDH frame added with status BR&SW(0100) is sent to the node devices 10-A and 10-D.

In the node devices 10-A and 10-D, if the switching bytes including the SDH frame (added with status BR&SW(0100) sent from the node device 10-C are received, judgements of the status, etc. are made in the same way as the above-mentioned case (steps S5~S7). Since the status is BR&SW (0100), the preceding status is held (NO route in step S7 to step S10).

As described above, when a failure occurs in the path signal (path 1) transmitted with the work channel (CH1), the node device. 10-A performs the bridging process and transmits the path signal held before path failure occurrence, and the node device 10-C performs the switching process. However, the present invention is not limited to this. For example, with a changeback request (i.e., a request that the path signal transmitted with the protection channel be retransmitted with the original work channel) sent by the node device 10-C, the path signal transmitted with the protection channel by the bridging process can be transmitted with the work channel employed before failure occurrence.

Figure 14:
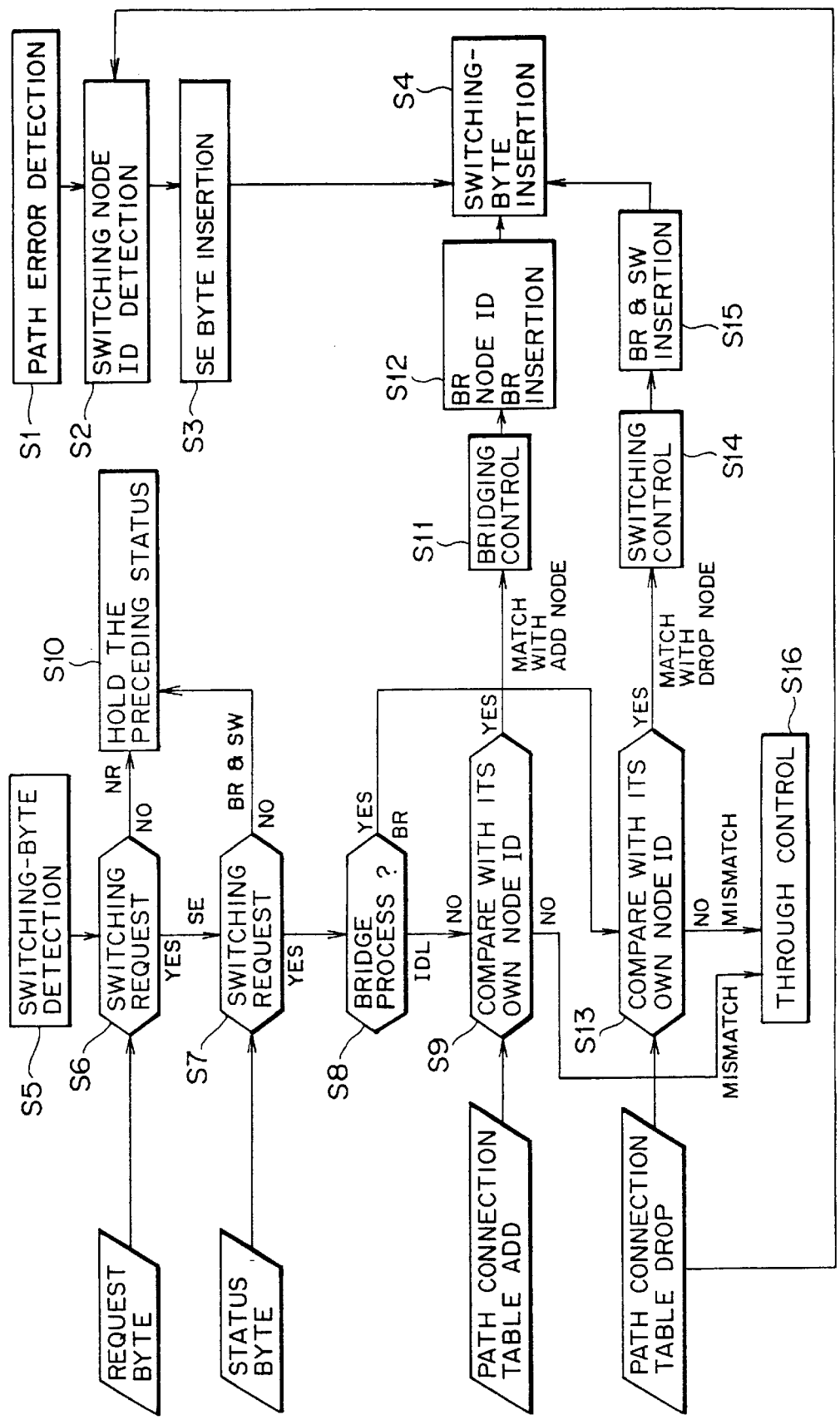
FIG. 14 is a flowchart for explaining the operation of each node device in the ring network according to the first embodiment of the present invention, when a path failure occurs.

Note that the process, in which the node devices 10-A~10-D detect the changeback request NB(0000) in the switching bytes and return to a non-switch status, is not shown in FIG. 14.

Also, for the changeback process sequence, as with that shown in FIG. 2; for example, the changeback request is transmitted from the node device 10-C through the node device 10-D to the node device 10-A and then the bridging process is released at the node device 10-A.

In addition, the changeback request is transmitted from the node device 10-A through the node device 10-D to the node device 10-C and then the switching process is also released at the node device 10-C.

Thus, according to the ring network 1 of the first, embodiment of the present invention, in the case where a path failure occurs, one node device 10-A stores the path signal being transmitted with the work channel in the work memory 38 of the bridge section 33-1 (east), at the time of normal operation. When a failure occurs in the path transmitted with the work channel, the memory read phase control section 37 reads out the path signal held before failure occurrence, from the work memory 38 and sends out the read path signal with the protection channel in the opposite direction from the direction of transmission employed before failure occurrence.

In the other node device 10-C, at the time of normal operation the path signal coming in with the work channel is received and stored in the work memory 24-8 of the, switching section 23-1 (west). When a failure occurs, the path signal that is received through the protection channel by the memory read phase control section 37 of one node device 10-A is stored in the protection memory 24-11. And the memory read phase control section 24-6 matches the time phase of the received signal stored in the work memory 24-8 after path failure occurrence with the time phase of the received signal stored in the protection memory 24-11 before path failure occurrence and outputs the received signal held in the protection memory 24-11 to the outside. Therefore, by performing the bridging process at one node device 10-A and performing the switching process at the other node device 10-C, the ring network 1 can transmit a signal from one node device 10-A to the other node device 10-C without instantaneous hitting of the signal, thereby being able to prevent transmission quality reduction.

In addition, the memory read phase control section 37 of the add node device 10-A sends out a transmitted signal in a direction differing from the direction of inserting the signal held before failure occurrence. Therefore, since the signal before failure occurrence is transmitted toward the node device 10-D without being passed through the protection channel between the node devices 10-A and 10-B where a failure occurred, another signal can be transmitted with the protection channel between the node devices 10-A and 10-B. As a result, the transmission capacity can be ensured.

(b) Description of a Second Embodiment

Figure 15:
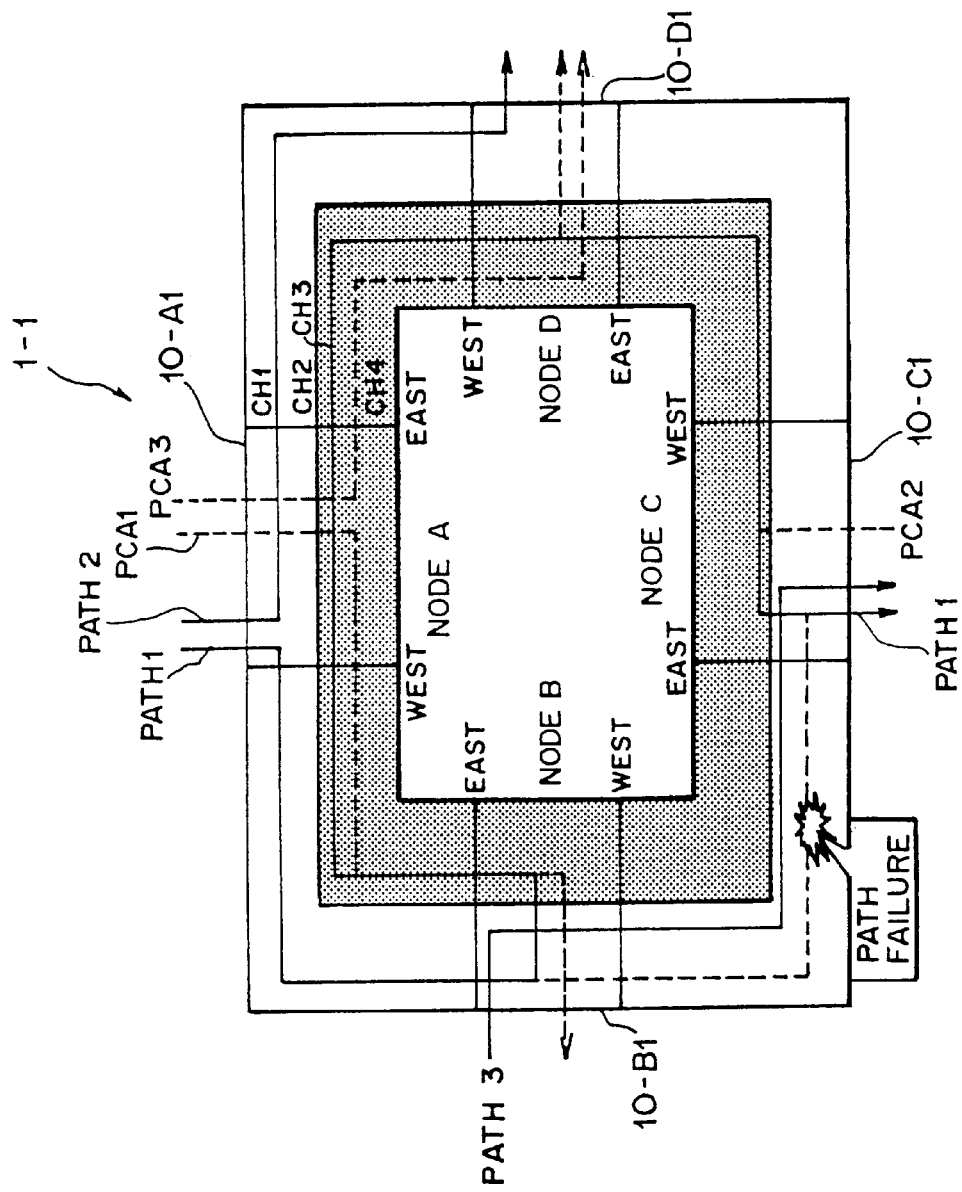
FIG. 15 is a diagram showing a ring network according to a second embodiment of the present invention.

FIG. 15 is a diagram showing a ring network 1-1 according to the second embodiment of the present invention. The node devices 10-A1~10-D1 (A node, B node, C node, and D node) shown in the diagram are practically identical in function with those described in the first embodiment, but the ring network 1-1 according to this second embodiment differs from the ring network 1 according to the first embodiment in that the node devices which perform the bridging process at the time of path failure occurrence are the node devices 10-A1~10-D1 that relay a path signal, and not the aforementioned add node devices 10-A~10-D that send out a path signal, where a path failure occurred, from the low-speed transmission line onto the high-speed transmission line.

Here, the switching of the channel in the ring network 1-1 along which a signal is transmitted is performed for each path, the same as the aforementioned ring network 1.

The node devices 10-A1~10-D1, which relay a signal on the high-speed transmission line, transmit a path signal held before failure occurrence, in the direction opposite from the direction in which the path signal before failure occurrence is transmitted (bridging process). After failure occurrence, in the node device on the receiving node side, if the path signal before failure occurrence in the work channel where the failure occurred, sent out again from the relay node device (which is one of the node devices 10-A1~10-D1), is received, the received path signal will be adjusted in phase and sent out onto the low-speed transmission line (switching process).

Note that in the description of the second embodiment, the same reference numeral as that stated in the aforementioned first embodiment denotes the same part or practically the same part.

Here, as shown in FIG. 15, a description will be made with respect to the case where between the node devices 10-B1 and 10-C1 a failure occurs in a path signal (path 1) that is transmitted with the work channel (CH1) onto the high-speed transmission line at the node 10-A1 through a low-speed transmission line.

Incidentally, for the hitless path switching process sequence of performing transmission or reception with the protection channel when a failure occurs in a path signal transmitted or received with the work channel in the ring network 1-1, a description thereof will be made, for example, with reference to the case where between the node devices 10-B1 and 10-C1 a path failure occurs in a path signal (path 1) that is output with the work channel (CH1) onto the high-speed transmission line at the node 10-A1 and output onto a low-speed transmission line at the node device 10-C1 via the node device 10-B1.

Figure 16:
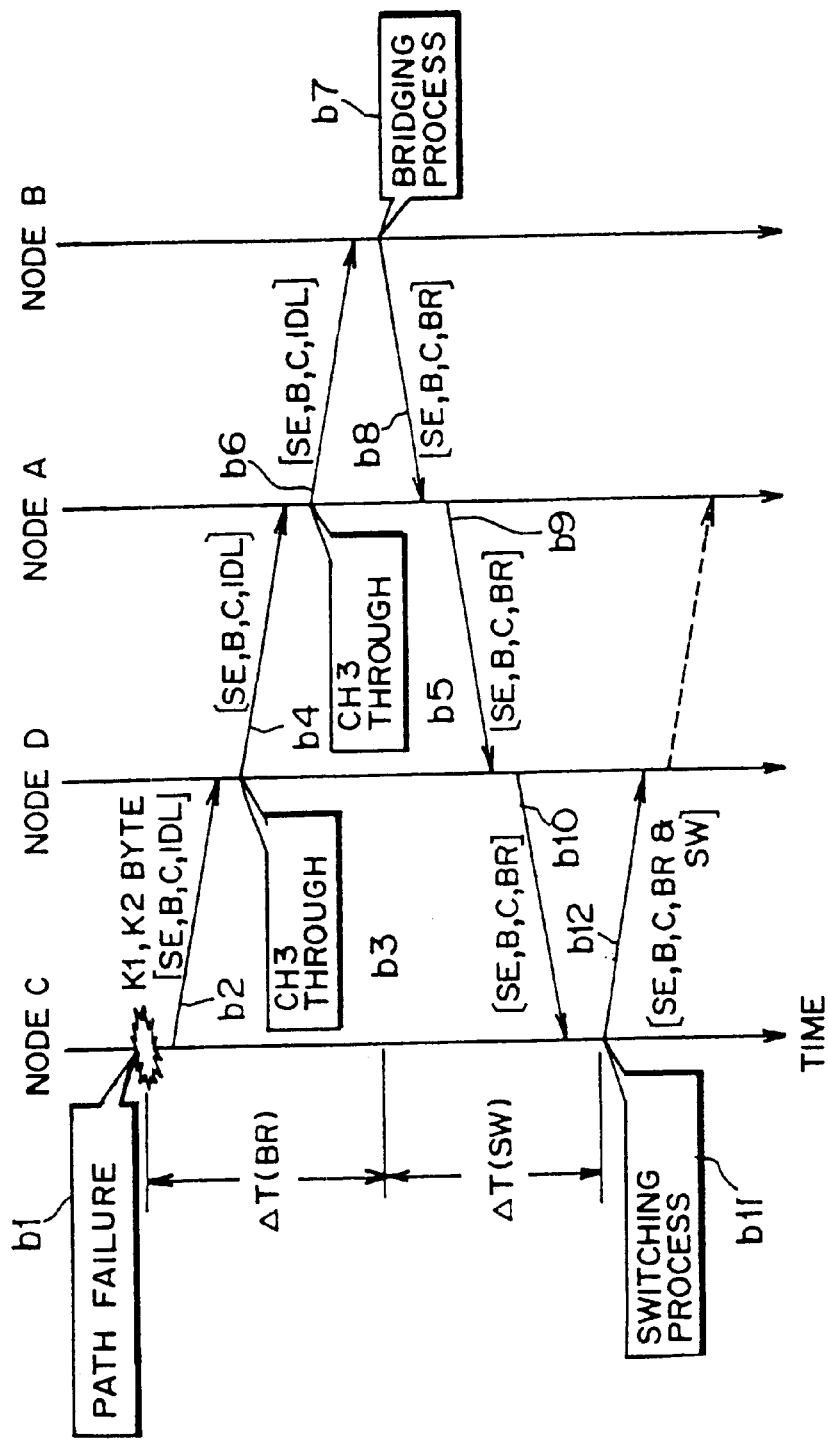
FIG. 16 is a sequence diagram for explaining the switching process, in the ring network according to the second embodiment of the present invention.

Here, FIG. 16 is a diagram for explaining the hitless path switching process sequence in the ring network 1-1 that is performed at the time of path failure occurrence. As shown in the diagram, if a path (path 1) failure occurs between the node device 10-B1 (B node) and the node device 10-C1 (C node), the node device 10-C1 will detect the path failure (step b1) and send out the SDH frame added with a switching request (request of the bridging process) with the work channel toward the node device. 10-B1 that relayed the path signal in which the path failure occurred (step b2).

Also, in sending the switching request from the node device 10-C1 to the node device 10-B1, if the node device 10-D1 (D node) and the node device 10-A1 (A node), which do-not perform the bridging process, detect the switching request in the SOH of the SDH frame, the D and A nodes each will set itself so that-the path signal coming in with the protection channel (CH3) is passed therethrough (steps b3 and b5), and will insert the switching bytes in the SOH and transmit the switching bytes toward the node device 10-B1 (steps b4 and b6).

The node device 10-B1 receives the switching request sent from the node device 10-C1, judges that the bridging process is performed at its own node, and loops back and outputs with the protection channel (CH3) the M-multi frame data held before path failure occurrence, in the opposite direction from the direction in which the M-multi frame data frame was transmitted onto the transmission line where the path failure occurred (step b7; bridging process).

Also, the node device 10-B1 inserts information, indicating that the node device 10-B1 is in a bridge status (status after the bridging process has been performed), in the switching bytes and outputs the processed switching bytes toward the node device 10-C1 (steps b8, b9, and b10)

The drop node device 10-C1 detects the switching bytes sent from the node device 10-B1, judges that the switching bytes is a request to make a switch at its own node, and performs the switching process (step b11).

Here, the drop node device 10-C1 matches the phase of the path signal coming in with the work channel (CH1) with the phase of the path signal coming in after failure occurrence with the protection channel (CH3) (path signal before path failure occurrence, output from the node device 10-B1), and outputs the path signal coming in with the protection channel (CH3) received after failure occurrence onto the low-speed transmission line.

On the other hand, the drop node device 10-C1 adds its present status to the SOH as a switching byte and outputs it to the node device 10-D (step b12).

Note that even in this ring network 1-1, the above-mentioned switching byte is transmitted with the work. channel.

Also, if each of the node devices 10-A1~10-D1 detects a path signal sent out by another node device at the time of normal operation, each node device passes the path signal therethrough when it does not correspond to a signal that terminates at its own node. Each node device holds the transmitted path signal (relayed path signal) in the unit of a path, while relaying the path signal to another node device.

That is, in the ring network 1-1, in relaying a path signal coming in along the low-speed transmission line onto the high-speed transmission line, the node devices 10-A1~10-D1 each hold the transmitted path signal. If a path failure occurs in the transmitted path signal, each node device will loop back and transmit the path signal held before failure occurrence, in the opposite direction from the direction in which the path failure occurred.

For instance, as shown in FIG. 15, if the node device 10-B1 relays the path (path 1) signal coming in along the transmission line on the east side with the work channel (CH1) onto the transmission line on the west side at the time of normal operation and if a path failure occurs in the relayed path signal, the node device 10-B1 will loop back and send out the path signal held when relayed (i.e., path signal before failure occurrence), onto the transmission line on the east side with the protection channel (CH3) (bridging process).

Also, if each of the node devices 10-A1~10-D1 receives a path signal that terminates at its own device at the time of normal operation, the node device will adjust the phase of the path signal and output it onto the low-speed transmission line. At the time of path failure occurrence, if each of the node devices 10-A1~10-D1 receives the path signal before failure occurrence that is coming in with the protection channel, the node device will hold the path signal temporarily, and will adjust the phase of the received path signal and output it onto the low-speed transmission line.

For example, as shown in FIG. 15, if a path failure occurs in the path signal coming in along the transmission line on the east side with the work channel (CH1) at the time of normal operation, the node device 10-C1 will receive and hold the path signal before failure occurrence that is coming in with the protection channel (CH3), through the transmission line on the west side and will output the path signal coming in after a predetermined time with the protection channel (CH3) onto the low-speed transmission line (switching process).

Note that if the node device 10-C1 receives a switching request (status BR) from the node device 10-A1 that performed the bridging process, the node device 10-C will perform the channel switching process of receiving with the protection channel (CH3) the signal (path 1) being received with the work channel (CH1).

Figure 17:
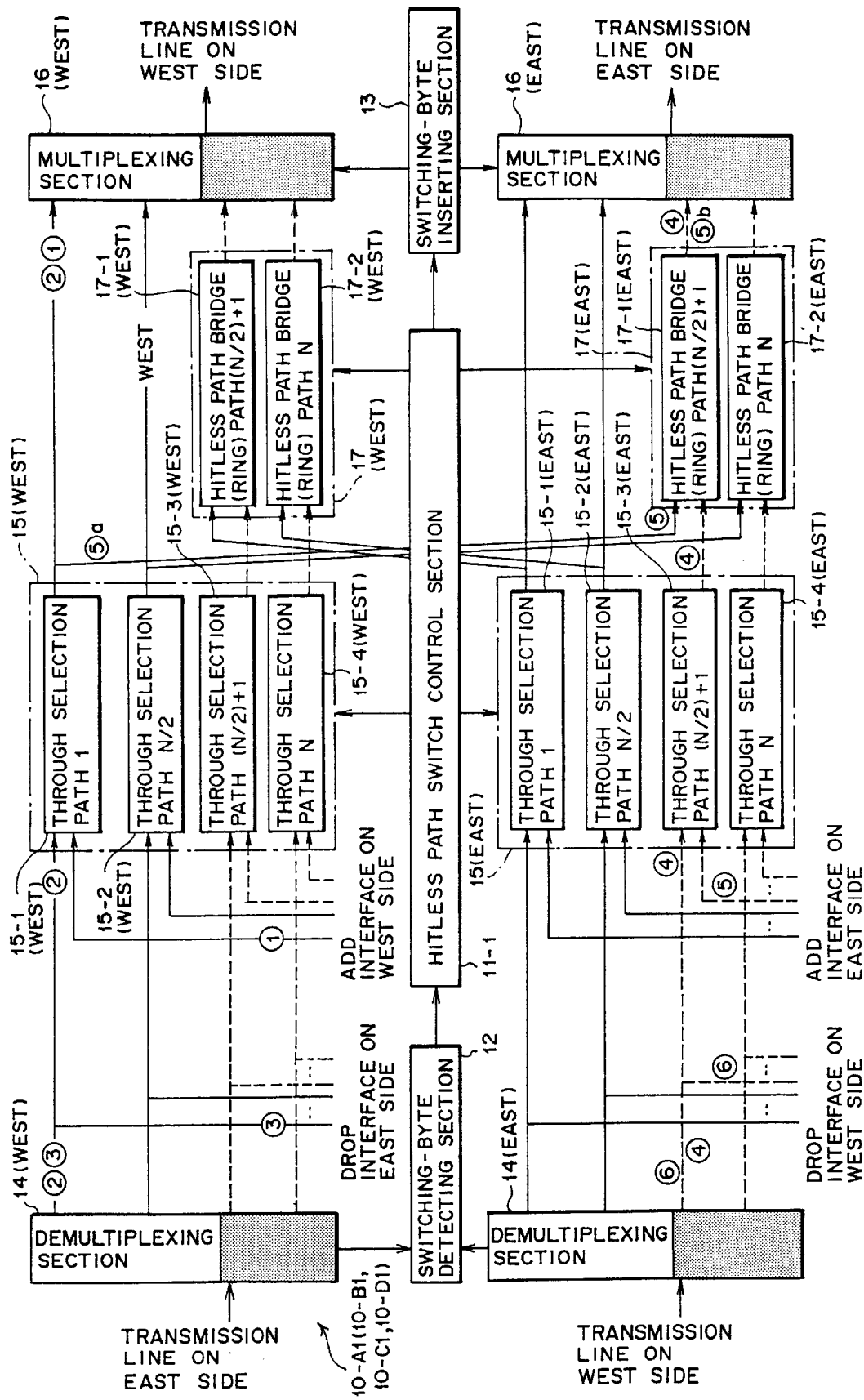
FIG. 17 is a block diagram showing the node device according to the second embodiment of the present invention.

For this reason, the node devices 10-A1~10-D1 are equipped with a hitless path switch control section 11-10 1, a switching-byte; detecting section 12-1, and a switching-byte inserting section 13-1, as shown in FIG. 17. Also, the node devices 10-A1~10-D1 are equipped with demultiplexing sections 14 (west, east), through processing sections 15 (west, east), multiplexing sections 16 (west, east), and ring bridge processing sections 17 (west, east) in the directions of transmitting a signal, respectively. Furthermore, the node devices 10-A1~10-D1 are equipped with an add interface 30-1 shown in FIG. 9 and a drop interface 20 (see FIG. 8).

Note that the node devices 10-A1~10-D1 differ from the node devices 10-A~10-D according to the first embodiment in that they are equipped with the ring bridge processing sections 17 (west, east) instead of the hitless path switch bridge processing section 33 (see FIG. 9).

Here, the hitless path switch control section 11-1 functions the same as the hitless path switch control section 11 according to the first embodiment, but it differs from the hitless path switch control section 11 according to the first embodiment in that it controls the ring bridge processing sections 17 (west, east) but does not control the hitless path switch bridge processing sections 33.

The ring bridge processing sections 17 (west, east) each pass a path signal coming in from another node device therethrough and hold the path signal transmitted on the high-speed transmission line. If a failure occurs in a path signal transmitted with the work channel, the ring bridge processing section 17 will read out and output the path signal held before failure occurrence.

Here, the ring bridge processing section 17 (west) holds a signal that is transmitted for each channel with the work channel (CH1, CH2) in the east direction. If a failure occurs in a path signal sent out onto the *transmission line on the east side, the ring bridge processing section 17 (west) will sent out the held path signal onto the transmission line on the west side via the multiplexing section 16 (west). On the other hand, a signal that is transmitted with the work channel (CH1, CH2) in the west direction is transmitted onto the transmission line on the west side and is also held for each channel by the ring bridge processing section 17 (east). If a failure occurs in a path signal (CH1, CH2) sent out onto the transmission line on the west side, the ring bridge processing section 17 (east) will sent out the held path signal onto the transmission line on the east side via the multiplexing section 16 (east).

Note that at the time of normal operation, the ring bridge processing section 17 (west) selects a protection channel access (PCA) signal coming in from the through processing section 15 (west) and outputs the PCA signal to the multiplexing section 16 (west). Also, the ring bridge processing section 17 (east) selects a PCA signal coming in from the through processing section 15 (east) and outputs the PCA signal to the multiplexing section 16 (east).

For this reason, the ring bridge processing sections 17 (east, west) are equipped with ring bridge sections 17-1 and 17-2 (east, west), as shown in FIG. 17. In the figure, each of the ring bridge sections 17-1 and 17-2 (east, west) is expressed as a hitless path switching ring bridge.

Note that the bridge sections 17-1 and 17-2 (east, west) are provided for each path. When a path failure occurs in a path signal sent out with the work channel, the bridge sections 17-1 and 17-2 (east, west) each output the path signal in the opposite direction from the direction that sent out the path signal where the path failure occurred.

For example, the path signal that is transmitted onto the transmission line on the west side with the work channel (CH1) is held by the ring bridge section 17-1 (east) on the east side via the selecting section 15-1 (east). If a path failure occurs, the held path signal will be read out from the ring bridge section 17-1 (east) and sent out onto the transmission line on the east side with the protection channel (CH3).

For this reason, the ring bridge sections 17-1 and 17-2 (west, east), as with the aforementioned bridge sections 33-1 and 33-2 (west, east) shown in FIG. 10, are each equipped with a work multi-frame detecting section 35, a memory write control section 36, a memory read phase control section (first read control section) 37, a work memory (first memory section) 38, and a work/protection path selecting section 39.

When the ring bridge sections 17-1 and 17-2 (east, west), as with the aforementioned bridge sections 33-1 and 33-2 (east, west), detect a switching request from another node device, the hitless path switch control section 11-1 outputs the information about the switching request to the memory read phase control section 37, which in turn controls the work memory 38 at the time of path failure occurrence. With this, the path signal read out from the work memory 38 is looped back and sent out.

Note that if there is a switching request (request of the switching process), the work/protection path selecting section 39 will select the data output from the work memory 38 and output the data to the TSA section 31 (east), by control from the hitless path switch control section 11-1. At the time of normal operation, the work/protection path selecting section 39 selects a protection channel access (PCA) signal.

The add interface 30-1 shown in FIG. 9 is an interface for adding a path signal received from another network or the like (low-speed transmission line) onto the high-speed transmission line. The add interface 30-1 differs from the add interface 30 according to the first embodiment in that it is not equipped with the bridge processing section 33.

On the other hand, the drop interface 20 is the same as that of the first embodiment. The hitless path switch processing section 23 of the drop interface 20 receives a path signal coming in with the protection channel by the bridging process performed at a relay node device, at the time of path failure occurrence and adjusts the phase of the received signal and sends out the adjusted signal onto the low-speed transmission line.

The operation inside and outside the node devices 10-A1~10-D1 of the ring network 1-1 according to the second embodiment, constructed as described above, will be described.

Note that the transmission of a path signal (path 1) between the node devices 10-A1 and 10-C1 at the time of normal operation is performed the same as the node devices 10-A10-D of the ring network 1 according to the first embodiment. However, in the node device 10-B1, a path signal coming in with the work channel (CH1) from the node device 10-A1 is added to a SDH frame at the multiplexing section 16 (west) along with other signals and is relayed on the transmission line on the west side toward the node device 10-C1, while the path signal is held in the ring bridge section 17-1 (east) in accordance with route ⑤ a shown in FIG. 17.

Incidentally, the operation of the node devices 10-A1~10-D1 in the case where, as with the aforementioned, a path, (path 1) failure occurs between the node devices 10-B1 and 10-C1 will be described-with a flowchart shown in FIG. 18.

If the path (path 1) failure occurs, the node device 10-C1 will detect the path failure from the received signal. That is, the work/protection path input bit error detecting section 24-1 (see FIG. 12) sends the error information about the counted input data to the hitless path switch control section 11-1, which in turn detects the occurrence of the path failure (step U1).

After detecting the path error, in performing the process of inserting information in the switching bytes (see FIG. 5), the hitless path switch control section 11 detects, based on the path connection table (see FIG. 6), the ID of the node device that switches the path signal where the path failure occurred (step U2), and further detects the ID of the node device that performs the bridging process (step U3).

The hitless path switch control section 11-1 inserts the detected switching node ID and bridge node ID in the switching node ID (4 bits) and bridge node ID information provided in the switching bytes. Also, the hitless path switch control section 11-1 inserts SE (switching request (ring)) in the request information provided in the switching bytes (step U4.)

Thereafter, the hitless path switch control section 11-1 controls the switching-byte inserting section 13 (see FIG. 7), thereby inserting the switching bytes in the SOH of the SDH frame (step U5).

The SDH frame, added with the switching bytes, is output from the node device 10-C1 onto the transmission line on the west side (the opposite transmission line from the transmission line where the path failure occurred).

On the other hand, in the node device 10-D1, if the SDH frame with the switching bytes transmitted from the node device 10-C is received through the transmission line on the east side and if the switching-byte detecting section 12 (see FIG. 7) detects the switching bytes within the SOH terminated by the demultiplexing section 14 (west) (step U6), information about the detected switching bytes will be output to the hitless path switch control section 11.

The hitless path switch control section 11-1 judges whether or not the request information in the switching bytes of the switching request is SE(0001) (step U7).

Here, when the request information in the switching bytes of the switching request is SE(0001), the hitless path switch control section 11 further judges whether or not the status information in the switching bytes of the switching request is BR(0001) or IDL(0000) (YES route in step U7 to step U8).

When the status information in the switching bytes is BR(0001) or IDL(0000), the hitless path switch control section 11-1 further judges whether or not it corresponds to BR(0001) (YES route in step U8 to step U9).

Here, when it corresponds to IDL(0000), the hitless path switch control section 11-1 judges whether or not the bridge node ID requesting the switching request corresponds to its own node ID (NO route in step U9 to step U10).

Here, since the bridge node ID does not correspond to its own node ID, the node device 10-D1 performs the through control (in which the path signal coming in with the protection channel (CH3) is passed through by the, bridging process performed by the node device 10-B1) (NO route in step U10 to step U16).

And the node device 10-D1 further adds the switching bytes received from the node device 10-C1 to the SOH and outputs the switching bytes to the node device 10-A1.

The node device 10-A1, as with the aforementioned node device 10-D1, also performs the through control (steps U6~U10 and step U16).

Next, if the node device 10-B1 detects the switching bytes received from the node device 10-A1 (step U6), the node device 10-B1 will judge the request information, etc. in the switching bytes of the switching request in the same way as the above-mentioned node devices 10-A1 and 10-D1 (steps U6 U10).

Here, if the hitless path switch control section 11-1 of the node device 10-B1 judges that its own node ID corresponds to the bridge node ID, the hitless path switch control section 11-1 will output the M-multi frame data held before path failure occurrence in the work memory 38 (see FIG. 10) of the ring bridge section 17-1 (east) shown in FIG. 17 onto the transmission line on the east side (in the opposite direction from the direction of the transmission line (west-where the path failure occurred) (bridging control; YES route in step U10 to step U12).

That is, in the ring bridge processing section 17 (east) of the node device 10-B1, the path signal held in the ring bridge section 17-1. (east) is sent to the multiplexing section 16 (east) in accordance with route b shown in FIG. 17 and is added to the SDH frame along with other path signals. This SDH frame is sent to the node device 10-A1 through the transmission line on the east side.

In performing the bridging control, the hitless path switch control section 11-1 of the node device 10-B1 inserts the status BR(0001) in the switching bytes. Thereafter, the SDH frame added with the switching bytes (added with the status BR(0001) is sent to the other node devices 10-A1~10-D1 and 10-C1.

In the node devices 10-A and 10-D1, judgments of the status, etc. are made in the same way as the aforementioned case (steps U6~U9).

Here, since the status information in the switching bytes is BR(0001), the hitless path switch control section 11-1 of the node devices 10-A1 and 10-D1 further judges with the path connection table (see. FIG. 6) whether or not its own node corresponds to a switching node (YES route in step U9 to step U13.) Because the node devices 10-A1 and 10-DI do not correspond to a switching node, the hitless path switch control section 11-1 of the node devices 10-A1 and 10-D1 performs the through control, the same as the above-mentioned way (NO route in step U13 to step U16).

Thereafter, the-node device 10-A1 adds the switching bytes received from the node device 10-B1 to the SOH of the SDH frame and outputs the switching bytes to the node device 10-D1. The node device 10-D1 adds the switching bytes received from the node device 10-A1 to the SOH and outputs the switching bytes to the node device 10-C1.

More specifically, if the node device 10-A1 receives the path signal before path failure occurrence which was sent by the bridging control at the node device 10-B1 (path signal coming in with the protection channel (CH3), the node device 10-A1 will pass the path signal therethrough in accordance with route ④ shown in FIG. 17. If there are other path signals at the multiplexing section 16 (east), the path signal before path failure occurrence will be multiplexed to the SDH frame along with the other path signals and will be output toward the node device 10-D1 with the protection channel (CH3).

Note that the node device 10-D1 also performs the through control of the path signal coming in with the protection channel (CH3) (path signal readout from the ring bridge section 17-1 (east) by the bridging process of the node device 10-B1).

Next, the node device 10-C1 detects the switching bytes-received from the node device 10-D1 and makes judgements of the status and the like (steps U6~U9 and step U13). Since its own node ID corresponds to a switching node ID, the node device 10-C1 receives the M-multi frame data before path failure occurrence which was sent with the protection channel (CH3) by the node device 10-B1. After adjusting the phase of the frame data (see FIG. 13), the node device 10-C1 outputs the adjusted data onto the low-speed transmission line (switching control; YES route in step U13 to step U14).

More specifically, the node device 10-C1 receives the SDH frame coming in with the protection channel (CH3) and performs the demultiplexing process at the demultiplexing section 14 (east). The node device 10-C1 sends the demultiplexed path signal (path 1) to the drop interface 20 in accordance with route ⑥ shown in FIG. 17.

The drop interface 20 sends the path signal (path 1) coming in with the protection channel (CH3) to the switching section 23-1 (west) in accordance with route ⑥ shown in FIG. 8. This switching section 23-1 (west) holds this path signal (path 1) in the protection memory 24-11. After delaying the path signal by a predetermined time, the switching section 23-1 (west) outputs the signal onto the low-speed transmission line.

Note that in performing the switching control, the hitless path switch control section 11-1 of the node device 10-C1 adds status BR&SW(0100) to the switching bytes (step U15) and the switching-byte inserting section 13 inserts the switching bytes in the SOH of the SDH frame (step U5) Thereafter, the SDH frame added with status BR&SW (0100) is sent to the node devices 10-D1 and 10-A1.

In the node devices 10-D1 and 10-A1, if the switching bytes including the SDH frame (added with status BR&SW (0100) that were sent from the node device 10-C1 are received, judgements of the status, etc. are made in the same way as the above-mentioned case (steps U6~U8). Since the status is BR&SW(0100), the preceding status is held (NO route in step U8 to step U11).

Incidentally, as described above, when a failure occurs in the path signal (path 1) transmitted with the work channel (CH1), the node device 10-B1 performs the bridging process and transmits the path signal held before path failure occurrence, and the node device 10-C1 performs the switching process. However, the present invention is not limited to this. For example, with a changeback request NB(0000) (i.e., a request that the path signal transmitted with the protection channel be retransmitted with the original work channel) sent by the node device 10-C1, the path signal transmitted with the protection channel (CH3) by the bridging process can be transmitted with the work channel (CH1) employed before failure occurrence.

Figure 18:
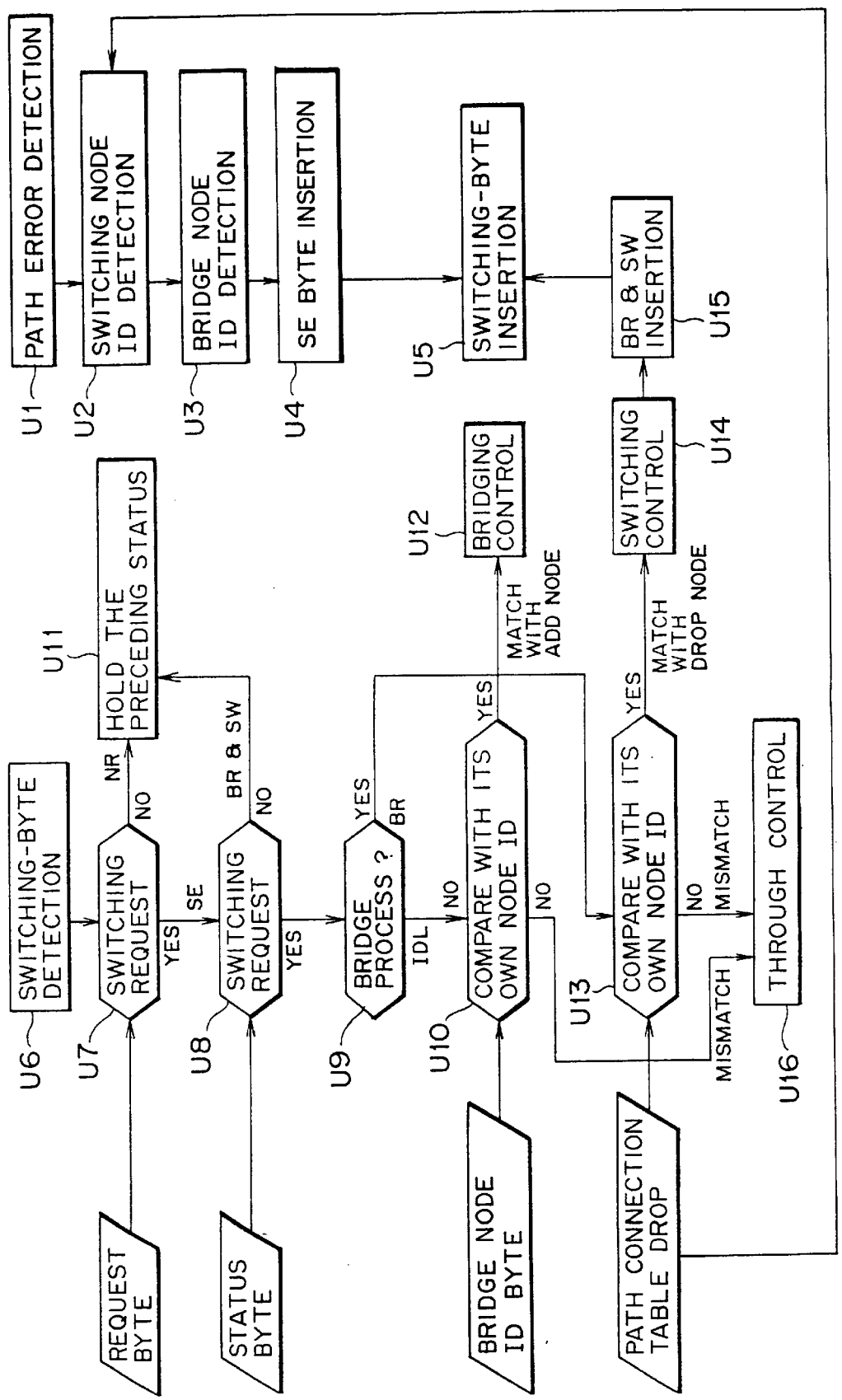
FIG. 18 is a flowchart for explaining the operation of each node device in the ring network according to the second embodiment of the present invention, when a path failure occurs.

Note that the process, in which the node devices 10-A1~10-D1 detect the changeback request NB(0000) in the switching bytes and return to a non-switch status, is not shown in FIG. 18.

Also, for the changeback process sequence, as with that shown in FIG. 2, for example, the changeback request is transmitted from the node device 10-C1 through the node devices 10-D1 and 10-A1 to the node device 10-B1 and then the bridging process is released at the node device 10-B1.

In addition, the changeback request is transmitted. from the node device 10-B1 through the node devices 10-A1 and 10-D1 to the node device 10-C1 and then the switching process is released at the node device 10-C1.

Thus, according-to the ring network 1-1 of the second embodiment of the present invention, in the case where the node device 10-B1 is constructed as a relay node device that delays a signal, at the time of normal operation the memory read phase control section 37 of the ring bridge section 17-1 (east) of the relay node device 10-B1 stores the path signal being transmitted onto the transmission line on the west side with the work channel (CH1) in the work memory 38. When a path failure occurs, the memory read phase control section 37 reads out the path signal held before failure occurrence, from the work memory 38 and sends out the read path signal onto the transmission line on the east side with the protection channel (CH3) (in the opposite direction from the direction of transmission employed before failure occurrence).

In the other node device 10-C1, the path signal coming in with the work channel (CH1) at the time of normal operation is stored in the work memory 24-8 of the switching section 23-1 west). At the time of failure occurrence, if the path signal coming in along the transmission line on the west side with the protection channel is received by the memory read phase control section 37 of one node device 10-B1, the path signal will be stored in the protection memory 24-11. And the memory read phase control section 24-6 matches the time phase of the received signal stored in the work memory 24-8 after path failure occurrence with the time phase of the received signal stored in the protection memory 24-11 before path failure occurrence, and outputs the received signal held in the protection memory 24-11 to the outside.

Therefore, by performing the bridging process at one node device 10-B1 and performing the switching process at the other node device 10-C1, the ring network 1-1 can transmit a signal from one node device 10-B1 to the other node device 10-C1 without instantaneous hitting of the signal, thereby being able to prevent transmission quality reduction.

(c) Description of a Third Embodiment

Figure 19:
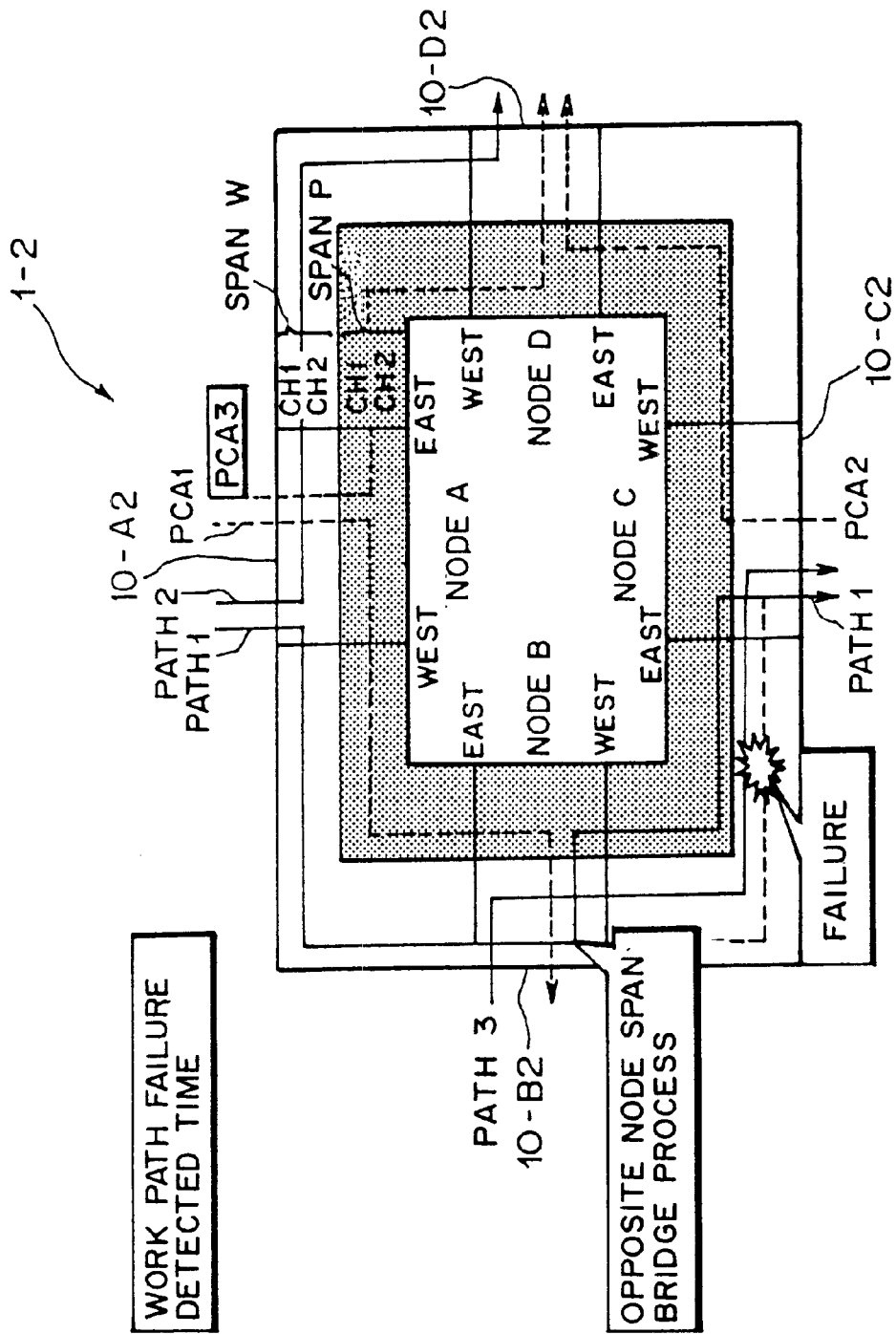
FIG. 19 is a diagram showing a ring network according to a third embodiment of the present invention.

FIG. 19 is a diagram showing a ring network 1-2 according to the third embodiment of the present invention. The node devices 10-A2~10-D2 shown in the diagram are practically identical in function with those described in the first embodiment, but the ring network 1-2 according to this third embodiment differs from the ring network 1 according to the first embodiment in that, at the time of path failure occurrence, the node devices (10-A2~10-D2) that relay a path signal retransmit the path signal held before path failure occurrence, in the same direction as the direction which sent the path signal where the failure occurred.

Note that in the description of the third embodiment, the same reference numeral as that stated in the aforementioned first and second embodiments denotes the same part or practically the same part.

Here, the switching of the channel in the ring network 1-2 along which a signal is transmitted is performed for each path, the same as the aforementioned ring network 1. The node devices 10- A2~10-D2, which relay a signal on the high-speed transmission line, transmit a path signal held before failure occurrence, in the same direction as the direction which sent the path signal where a failure. occurred (span bridging process). After failure occurrence, in the drop node, if the path signal (path signal before failure occurrence) sent from the relay node device (which is one of the node devices 10-A2~10-D2) is received, the received path signal will be adjusted in phase and sent out onto the low-speed transmission line (switching process).

Note that in the ring network 1-2, the node devices 10-A2~10-D2 are connected, for example, by 4 optical fibers (high-speed transmission lines) and are constituted in ring form. The two optical fibers are employed in work transmission lines, while the remaining optical fibers are employed as protection transmission lines. Also, the two work transmission lines are arranged so that signals are transmitted in different directions. Similarly, the two protection transmission lines are arranged so that signals are transmitted in different directions. In FIG. 19, 4 optical fibers are not separately expressed, but an example of transmitting a signal between the node devices 10-A2~10-D2 is shown.

Also, a single optical fiber can transmit signals corresponding to the amount of N channels.

Here, in the ring network 1-2, at the time of normal operation a path signal is transmitted or received with the work channel. On the other hand, when a path failure occurs in the path signal transmitted with the work channel, the path signal where the failure occurred is transmitted with the protection channel.

For instance, when channels 1~N (N an integer) can be set in each optical fiber, at the time of normal operation the work channels 1~N in the work transmission line are employed for transmission of path signals as work channels, while the protection channels 1~N in the protection transmission line for transmitting a signal in the same direction can be employed for transmission of PCA signals as protection channels.

When a path failure occurs in the work channel J (which is any one of the work channels 1~N), the path signal-before failure occurrence is transmitted with the channel J onto the protection transmission line that transmits a signal in the same direction as the work transmission line where the failure occurred.

In the ring network 1-2 shown in FIG. 19, two channels (CH1 and CH2) are employed in the work transmission line to transmit a signal and the protection transmission line also employs two channels (CH1 and CH2) to transmit a signal. A description will hereinafter be made with reference to the case where two channels (N=2) are employed in each transmission line.

Here, as shown in FIG. 19, a description will be made with respect to the case where between the node devices 10-B2 and 10-C2 a failure occurs in a path signal (path 1) that is transmitted with the work channel (CH1) onto the high-speed transmission line at the node 10-A2 through a low-speed transmission line.

Incidentally, explain as an example the case where between the node devices 10-B2 and 10-C2 a path failure occurs in a path signal (path 1) that is output with the work channel onto the high-speed transmission line at the node 10-A2 and output onto a low-speed transmission line at the node device 10-C2 via the node device 10-B2.

Note that the hitless path switching process sequence in the ring network 1-2 is nearly the same as that in the ring network 1-1 according to the aforementioned second embodiment shown in FIG. 16. The node device 10-C2, which detected a path failure, adds the switching bytes to the SQH of a SDH frame and sends out the switching bytes to the. node devices 10-D2, 10-A2, and 10-B2 through the opposite transmission line from the transmission line where the failure occurred.

Also, in the switching bytes in the ring network 10-2, SE(0011) represents a span bridge switch request, status BR(0010) represents a span bridge status, and BR(1100) represents a bridge-switch status (span).

Note that even in this ring network 1-1, the above-mentioned switching bytes are transmitted with the work channel.

Also, at the time of normal operation, the node devices 10-A2~10-D2 each pass a path signal transmitted from one node device through each node device and delay the path signal to another node device, when the path signal does not correspond to a signal that terminates at its own node. At the same time, each node device holds the transmitted path signal (relayed path signal) in the unit of a path.

That is, in the ring network 1-2, in relaying a path signal coming in along the high-speed transmission line on one side onto the high-speed transmission line on the other side, the node devices 10-A2~10-D2 each hold the relayed path signal. If a path failure occurs in the transmitted path signal, each node-device will transmit the path signal held before failure occurrence, in the same direction as the direction in which the path failure occurred.

For instance, as shown in FIG. 19, if the node device 10-B2 relays the path signal coming in along the work transmission line on the east side with the work channel (CH1) onto the work transmission line on the west side at the time of normal operation and if a path failure occurs in the relayed path signal, the node device 10-B2 will send out the path signal held when relayed (i.e., path signal before a failure occurs), onto the protection transmission line on the west side with the protection channel (CH1) (span bridging process).

Also, if each of the node devices 10-A2~10-D2 receives a path signal that terminates at its own device at the time of normal operation, the node device will adjust the phase of the path signal and output the adjusted signal onto the low-speed transmission line. At the time of path failure occurrence, if each of the node devices 10-A2~10-D2 receives the path signal before failure occurrence that is coming in with the protection channel, the node device will hold the path signal temporarily, and will adjust the phase of the received path signal and output it onto the low-speed transmission line.

For example, as shown in FIG. 19, if a path failure occurs in the path signal coming in along the work transmission line on the east side with the work channel (CH1) at the time of normal operation, the node device 10-C2 will receive and hold the path signal coming in with the protection channel (CH1) (i.e., path signal output from the node device 10-B2), through the protection transmission line on the east side and will output the path signal coming in with the protection channel (CH1) after a predetermined time onto the low-speed transmission line (switching process).

Note that if the node device 10-C2 receives a switching request (status BR(0010)) from the node device 10-B2 that performed the span bridging process, the node device 10-C will perform the channel switching process of receiving with the protection channel (CH1) the signal (path 1) being received with the work channel (CH1).

Figure 20:
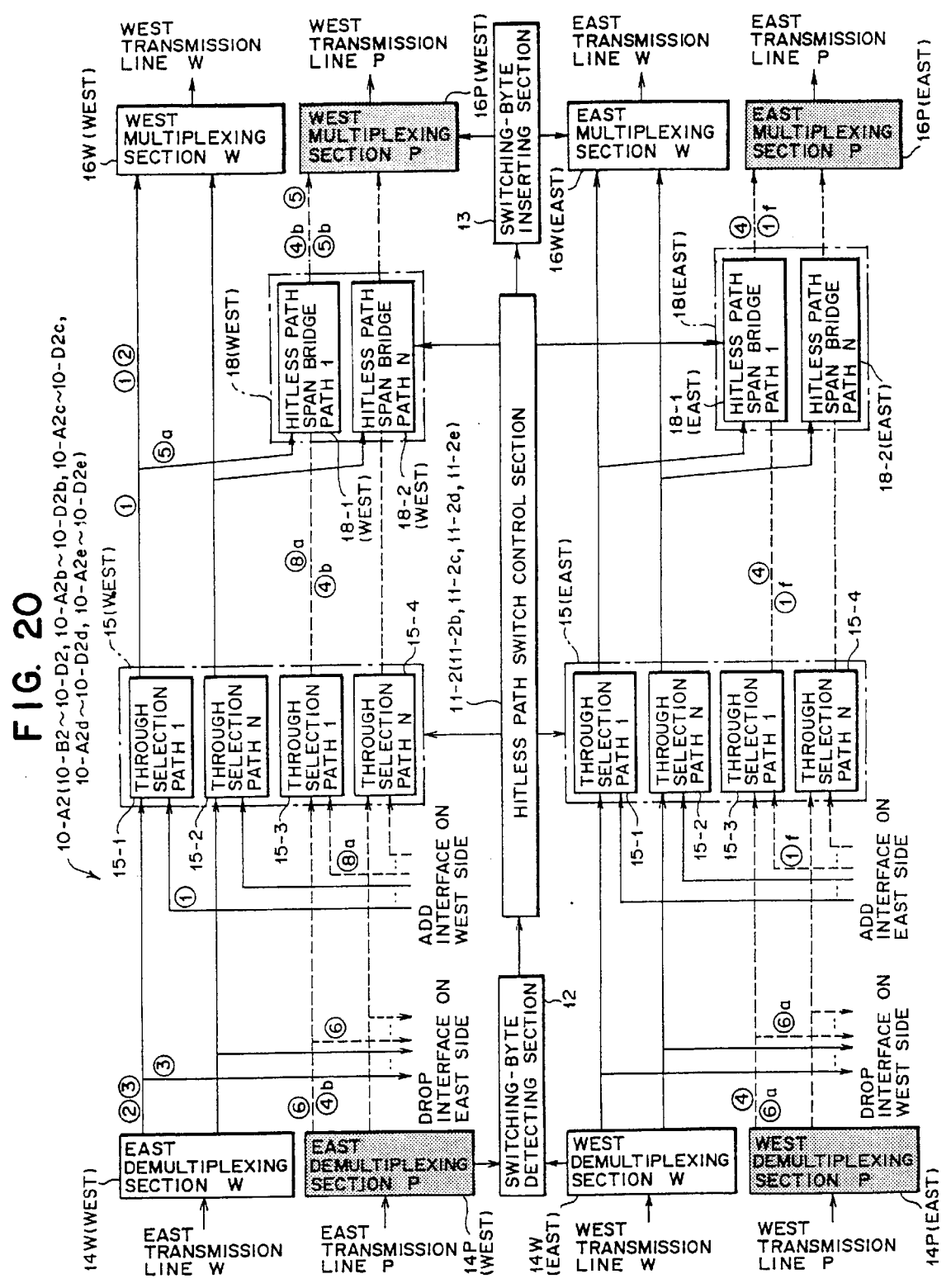
Figure 21:
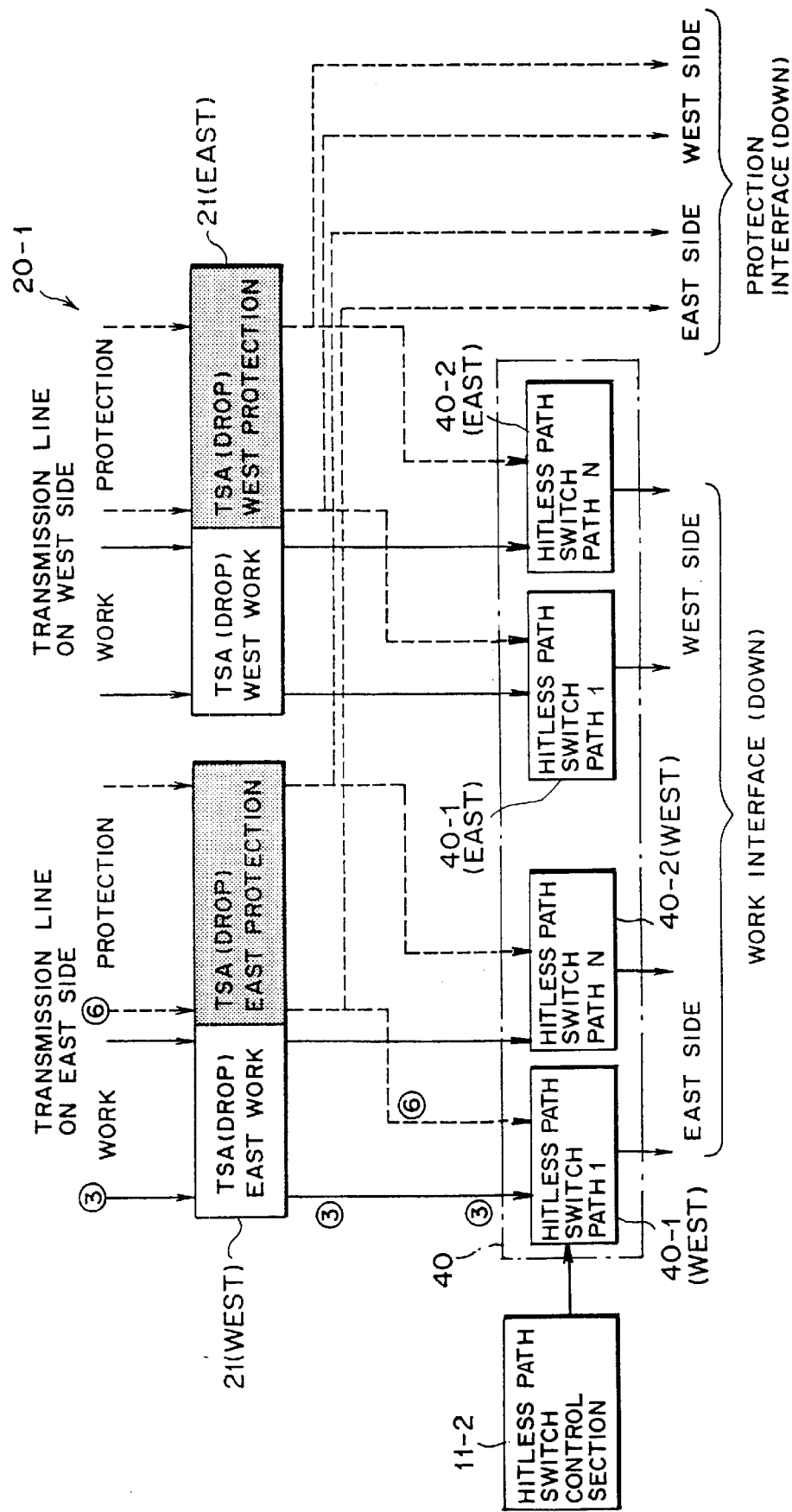
FIG. 21 is a diagram showing a drop interface according to the third embodiment of the present invention.

For this reason, the node devices 10-A2~10-D2 are equipped with a hitless path switch control section 11-2, a switching-byte detecting section 12, and a switching-byte inserting section 13, as shown in FIG. 20. Also, the node devices 10-A2 10-D2 are equipped with demultiplexing sections 14W and 14P (west, east), through processing sections 15 (west, east), multiplexing sections 16W and 16P. (west, east), and span bridge processing sections 18 (west, east) in the directions of transmitting a signal and for the work and protection channels, respectively. Furthermore, the node devices 10-A2~10-D2 are equipped with an add interface 30-1 shown in FIG. 9 and a drop interface 20-1 shown-in. FIG. 21.

Note that the "W" added after each reference numeral indicates that it is associated with a signal going out onto and coming in along the work transmission line, while the "P" means that it is associated with a signal going out onto and coming in along the protection transmission line.

Also, the node devices 10-A2~10-D2 differ from the node devices 10-A10-D according to the first embodiment in that they are equipped with the span bridge sections 17 (west, east) instead of the bridge processing section 33 and the drop inter-face 20-1 instead of the drop interface 20.

Here, the hitless path switch control section 11-2 functions the same as the hitless path switch control section 11-1 according to the second embodiment, but it differs from the hitless path switch control section 11-1 according to the second embodiment in that it controls the span bridge processing sections. 18 (west, east) and a span switch processing section 40 to described later, but does not control the ring bridge processing section 17 (see FIG. 17) and the hitless path switch processing section 23.

The demultiplexing sections 14W and 14P (west, east) each terminate the SOH of the SDH frame received through the transmission line, and also demultiplex signals from the SDH frame in accordance with channels, respectively. For example, the demultiplexing section 14W demultiplexes path signals from the SDH frame coming in along the work transmission line on the east side in accordance with the channels and outputs the demultiplexed path signals to the through processing section 15 (west) and the drop interface 20-1.

The multiplexing sections 16W and 16P (east, west) each multiplex a signal for each channel (CH1, CH2), or the SOH coming in from the switching-byte inserting section 13, to the SDH frame and send out the SDH frame onto the high-speed transmission line. For example, the multiplexing section 16W (east) multiplexes a signal for each channel to the SDH frame and sends out the SDH frame onto the work transmission line on the east side.

The span bridge processing sections 18 (west, east) each pass-a path signal coming in from another node device therethrough and hold the path signal transmitted onto the high-speed transmission line. If a failure occurs in the path signal transmitted with the work-channel, the span bridge processing sections 18 will read out and output the path signal held before failure occurrence.

Here, the span bridge processing section 18 (west) holds a signal that is transmitted with the work channel (CH1, CH2) in the west direction, for each channel. If a failure occurs in a path signal sent out onto the work transmission line on the east side, the span bridge processing section 18 (west) will sent out the held path signal onto the protection transmission line on the west side via the multiplexing section 16P (west). On the other hand, a signal that is transmitted with the work channel (CH1, CH2) in the west direction is transmitted onto the work transmission line on the east side and is also held for each channel by the span bridge processing section 18 (east). If a failure occurs in a path signal (CH1, CH2) sent out onto the work transmission line on the east side, the span bridge processing section 18 (east) will sent out the held path signal onto the protection transmission line on the east side via the multiplexing section 16P (east)

Note that at the time of normal operation, the span bridge processing section 18 (west) selects a protection channel access (PCA) signal coming in from the through processing section 15 (west) and outputs the PCA signal to the multiplexing section 16P (west) Also, the span bridge processing section 18 (east) selects a PCA signal coming in from the through processing section 15 (east) and outputs the PCA signal to the multiplexing section 16P (east).

For this reason, the span bridge processing sections 18 (east, west) are equipped with span bridge sections 18-1 and 18-2 (east, west), as shown in FIG. 20. In the figure, each of the span bridge sections 18-1 and 18-2 (east, west) is expressed as a non-break span bridge.

Note that the bridge sections 18-1 and 18-2 (east, west) are provided for each path. When a path failure occurs in a path signal sent out with the work channel, the bridge sections 18-1 and 18-2 (east, west) each output the path signal in the same direction as the direction that sent out the path signal where the path failure occurred.

For example, the path signal that is transmitted onto the work transmission line on the west side with the work channel (CH1) is held by the span bridge section 18-1 (west) via the selecting section 15-1 (east). If a path failure occurs, the held path signal will be read out from the span bridge section 17-1 (west) and sent out onto the work transmission line on the west side with the protection channel (CH1)

For this reason, the span bridge sections 18-1 and 18-2 (west, east), as with the aforementioned bridge sections 33-1 and 33-2 (west, east) shown in FIG. 10, are each equipped with a work multi-frame detecting section 35, a memory write control section 36, a memory read phase control section 37, a work memory 38, and a work/protection path selecting section 39.

Note that the work memory (fourth memory section) 38 stores a signal being transmitted onto the work transmission line at the time of normal operation. The memory read phase control section (second read control section) 37 reads out the path signal (held before failure occurrence) from the work memory 38 and sends out the path signal through the protection transmission line in the same direction as the direction of transmission used before failure occurrence, at the time of path failure occurrence in the work transmission line.

When the span bridge sections 18-1 and 18-2 (east, west), as with the aforementioned bridge sections 33-1 and 33-2 (east, west), detect a switching request from another node device, the hitless path switch control section 11-2 outputs the information about the switching request to the memory read-phase control section 37. With this, the path signal held in the work memory 38 is read out.

Note that if there is a switching request (request of the switching process), the work/protection path selecting section 39 will select and output the data output from the work memory 38, by control from the hitless path switch control section 11-2. At the time of normal operation, the work/protection path selecting section 39 selects a protection channel access (PCA) signal.

On the other hand, FIG. 21 is a diagram showing a drop interface according to the third embodiment. As with the drop interface 20 according to the first embodiment, the drop interface 20-1 shown in the diagram is an interface for dropping a path signal and a PCA signal coming in along the high-speed transmission line (work or protection transmission line) to another network (low-speed transmission line). This drop interface 20-1 receives the path signal read out from the span bridge section 18 (west, east) of a node device that relays a signal, then make a phase adjustment, and outputs the path signal onto the low-speed transmission line (another network).

The drop interface 20-1, however, differs from the drop interface 20 according to the first embodiment in that the phases of a path signal (i.e., path signal coming in along the work transmission line with the work channel) and a path signal [i.e., path signal read out from the span bridge section 18 (west, east) of the relay node and coming in along the protection transmission line] coming in from the same direction are matched with each other.

For this reason, the drop interface 20-1, as shown in FIG. 21, is equipped with a span switch processing section 40 instead of the hitless path switch processing section 23, compared with the drop interface 20 according to the first embodiment.

Here, if a path failure occurs in a path signal coming in with the work channel, the span switch processing section 40 will receive the path signal readout from the span bridge section 18 (west, east) of the relay node and coming in with the protection channel, and will output the received path signal onto the low-speed transmission line without instantaneous hitting of the signal (span switching process). Note that at the time of normal operation and the time of path failure occurrence, a phase adjustment to a received signal is made and then the received signal is output onto the low-speed transmission line.

That is, if the span switch processing section 40 receives a path signal coming in along the work transmission line on the east side with the work channel at the time of normal operation, the span switch processing section 40 will hold the path signal temporarily and will output the path signal onto the low-speed transmission line after making a phase adjustment (after a predetermined time has been-delayed). When a path failure occurs in the path signal coming in along the work transmission line on the east side with the work channel, the span switch processing section 40 temporarily holds the path signal before path failure occurrence which is coming in along the protection transmission line on the west side with the protection channel (i.e., path signal read out from the span bridge section 18 (west)). After making a phase adjustment (after a predetermined time has been delayed), the span switch processing section 40 outputs the path signal onto the low-speed transmission line.

Note that at the time of normal operation, even in the case where a path failure occurs in a path signal coming in along the work transmission line on the west side with the work channel, the span switch processing section 40 likewise receives a path signal coming in along the protection transmission line on the east side with the protection channel (i.e., path signal before path failure occurrence) and makes a phase adjustment.

For this reason, the span switch processing section 40 is equipped with span switching sections 40-1 and 40-2 (west, east) for handling a signal coming in along the transmission line on the east and west sides for each path, as shown in FIG. 21. Note that in the figure, the switching sections 40-1 and 40-2 (west, east) are expressed as hitless path switches.

Here, at the time of normal operation, in addition to adjusting the phase of the path signal coming in with the work channel and outputting the adjusted signal onto the low-speed transmission line, at the time of path failure occurrence the switching sections 40-1 and 40-2 (west, east) each receive a path signal before failure occurrence which comes in from the same direction as the direction of transmission coming in with the work channel, then make a phase adjustment, and output the adjusted signal onto the low-speed transmission line (span switching process). For instance, the path signal, which is received through the work transmission line on the west side at the time of normal operation, is also received through the protection transmission line on the west side at the time of path failure occurrence.

For this reason, the switching sections 40-1 and 40-2 (west, east), as with the switching sections 23-1 and 23-2 (west, east) according to the aforementioned first embodiment (see FIG. 12), are equipped with a work/protection path bit error detecting section 24-1, a work path multiframe detecting section 24-2, an M-multi frame detecting section 24-3, a phase comparing section 24-4, a work memory write phase control section 24-5, a memory read-phase control section 24-6, a work/protection path selecting section 24-7, a work memory 24-8, a protection path multiframe detecting section 24-9, a protection memory write phase control section 24-10, and a protection memory 24-11.

The work memory (fifth memory section) 24-8 stores a path signal received through the work transmission line at the time of normal operation, while the protection memory (sixth memory section) 24-11 stores a path signal received through the protection transmission line by the memory read phase control section 37 of a relay node at the time of path failure occurrence.

The memory read phase control section (second phase adjusting section) 24-6 matches the time phase of the path signal (after path failure occurrence) stored in the work memory 24-8 with the time phase of the path signal (before path failure occurrence) stored in the protection memory 24-11, at the time of path failure occurrence and reads out the path signal from the protection memory 24-11 and outputs it to the outside.

Note that at the time of normal operation, a signal (PCA signal) coming in with the work channel is input to the protection memory 24-11.

Here, as with the aforementioned, the direction in which a path signal comes in with the protection channel at the time of path failure occurrence is the same as the direction in which a path signal coming in at the time of failure occurrence comes in.

For example, at the time of normal operation, the path signal coming in along the work transmission line en the east side with the work channel (CH1) is held in the work memory 24-8. After the phase of the path signal has been adjusted, the path signal is output onto the low-speed transmission line through the work/protection path selecting section 24-7. At the time of path failure occurrence, the path signal coming in along the protection transmission line on the east side with the protection channel (CH1) is held in the protection memory 24-11. After the phase of the path signal has been adjusted, the path signal is output onto the low-speed transmission line through the work/protection path selecting section 24-7.

Note that the ring switching process in a switching node is performed by detection of the switching bytes transmitted from a relay node.

The operation inside and outside the node devices 10-A2~10-D2 of the ring network 1-2 according to the third embodiment, constructed as described above, will hereinafter be described.

At the time of normal operation, the transmission of a path signal (path 1) between the node devices 10-A2 and 10-C2 is practically the same as the signal transmission at the ring network 1 according to the first embodiment.

Here, in the node device 10-B2$a$, a path signal coming in with the work channel (CH1) from the node device 10-A2$a$ is added to a SDH frame at the multiplexing section 16 (west) along with other signals and is sent out onto the work transmission line on the west side toward the node device 10-C2, while the path signal is held in the ring bridge section 17A-1 (east) in accordance with route ⑤ $a$ shown in FIG. 20.

Incidentally, as with the aforementioned case, the operation of the node devices 10-A2~10-D2 in the case where a path failure occurs in a path signal coming in with the work channel (CH1) between the node devices 10-B2 and 10-C2 is practically the same as the operation of the node devices 10-A1~10-D1 according to the second embodiment, so a detailed description thereof is omitted.

If the hitless path switch control section 11-2 of the node device 10-B2 receives the switching bytes (where the request is BR(0010)) sent out from the node device 10-C2, its own node corresponds to a bridge node. Therefore, the hitless path switch control section 11-2 outputs the M-multi frame data, held before path failure occurrence in the work memory 38 (see FIG. 10) of the span bridge section 18-1 (west) shown in FIG. 20, onto the protection transmission line on the west side (in the same direction as the direction of the transmission line (west side) where the path failure occurred) (span bridging process).

That is, in the span bridge processing section 18 (west) of the node device 10-B2, the path signal held in the span bridge section 18-1 (west) is sent to the multiplexing section 16P (west) in accordance with route ⑤ *b* shown in FIG. 20. The multiplexing section 16P (west) adds the path signal to the SDH frame along with other path signals and sends the SDH frame to the node device 10-C2 through the protection transmission line on the west side.

In performing the ring bridging process, the hitless path switch control section 11-2 of the node device 10-B2 inserts the status BR(0010) in the switching bytes. Thereafter, the SDH frame added with the switching bytes (added with the status BR(0010)) is sent to the other-node devices 10-A2, 10-D2 and 10-C2.

In the node devices 10-A2 and 10-D2, judgments of the status, etc. are made. Since the status information in the switching bytes is BR(0010), the hitless path switch control section 11-2 of the node devices 10-A2 and 10-D2 further judges with the path connection table (see FIG. 6) whether or not its own node corresponds to the switching node. Because the node devices 10-A2 and 10-D2 do not correspond to a switching node, the hitless path switch control section 11-2 of the node devices 10-A2 and 10-D2 performs the through control, the same as the above-mentioned way.

Next, the node device 10-C2 detects the switching bytes received from the node device 10-D2 and makes judgements of the status, etc. Since its own node ID corresponds to a switching node ID, the node device 10-C2 receives the path signal coming in along the transmission line on east side with the protection channel (CH1) (i.e., M-multi frame data before path failure occurrence which was output from the node device 10-B2). After adjusting the phase of the frame data, the node device 10-C2 outputs the adjusted data onto the low-speed transmission line.

More specifically, the node device 10-C2 demultiplexes the path signal (path 1) from the SDH frame at the demultiplexing section 14P (east). This node device 10-C2 sends the path signal (path 1) coming in with the protection channel (CH1) to the drop interface 20-1 in accordance with route ⑥ shown in FIG. 20.

The drop interface 20-1 sends the path signal (path 1) coming in with the protection channel (CH1) to the span switching section 40-1 (west) in accordance with route ⑥ shown in FIG. 21. This span switching section 40-1 (east) holds this path signal (path 1) in the protection memory 24-11. After delaying the path signal by a predetermined time, the span switching section 40-1 (east) outputs the signal onto the low-speed transmission line.

Note that in performing the switching control, the hitless path switch control section 11-2 of the node device 10-C2 adds status BR&SW(1100) to the switching bytes and the switching-byte inserting section 13 inserts the switching bytes in the SOH of the SDH frame. Thereafter, the SDH frame added with status BR&SW(1100) is sent to the node devices 10-D2 and 10-A2.

In the node devices 10-D2 and 10-A2, if the switching bytes including the SDH frame (added with status BR&SW (1100) that were sent from the node device 10-C2 are received, judgements of the status, etc. are made in-the same way as the above-mentioned case. Since the status is BR&SW(1100), the preceding status is held.

Incidentally, as described above, when a failure occurs in the path signal (path 1) transmitted with the work channel (CH1), the node device 10-B2 performs the span bridging process and transmits the path signal held before path failure occurrence, while the node device 10-C2 performs the span switching process. However, the present invention is not limited to this. For example, with a changeback request (i.e., a request that the path signal transmitted on the protection transmission line with the protection channel be retransmitted with the original work channel) sent by the node device 10-C2, the path signal (path 1) can be transmitted from the protection transmission line onto the protection transmission line.

Also, the changeback process sequence can be set, for example, in the same procedure as the switching process sequence in the ring network 1-1 shown in FIG. 16. The changeback request is transmitted from the node device 10-C2 through the node devices 10-D2 and 10-A2 to the node device 10-B2 and then the span bridging process- is released at the node device 10-B2.

In addition, the changeback request is transmitted from the node device 10-B2 through the node devices 10-A2 and 10-D2 to the node device 10-C2 and then the span switching process is released at the node device 10-C2.

Thus, according to the ring network 1-2 of the third embodiment, in the node device 10-B2 the work memory 38 of the span bridge section 18-1 (west) stores a signal being transmitted onto the work transmission line on the west side at the time of normal operation. The memory read phase control section 37 reads out the path signal (held before failure occurrence) from the work memory 38 and sends out the path signal through the protection transmission line on the west side in the same direction as the direction of transmission employed before failure occurrence, at the time of path failure occurrence in the work transmission line on the west side.

Also, in the other node device 10-C2, at the time of normal operation the work memory 24-8 of the span-switching section 40-1 (west) stores a signal received through the work transmission line on the east side. At the time of failure occurrence, the protection memory 24-11 stores a signal received through the-protection transmission line on the west side by the memory read phase control section 37 of one node device 10-B2. And the memory read phase control section 24-6 matches the time phase of the received signal stored in the work memory 24-8 after path failure occurrence with the time phase of the received signal stored in the protection memory 24-11 before path failure occurrence, and outputs the received signal held in the protection memory 24-11 to the outside.

Therefore, by performing the span bridging process at one node device 10-B2 and performing the-span switching process at the other node device 10-C2, the ring network 1-2 can transmit a signal from one node device 10-B2 to the other node device 10-C2 without instantaneous hitting of the signal, thereby being able to prevent transmission quality reduction.

(c-1) Description of a First Modification of the Third Embodiment

Figure 22:
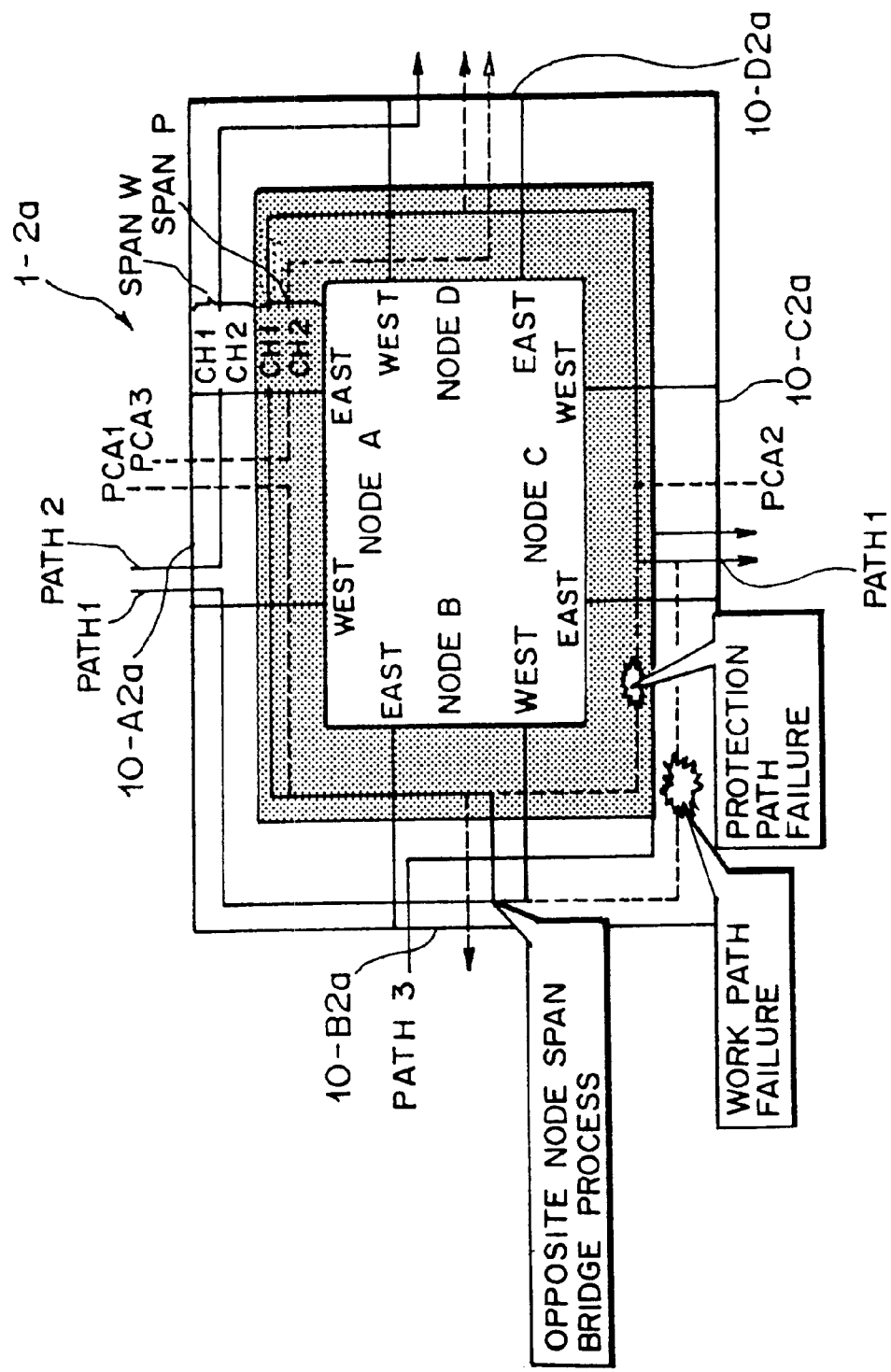
FIG. 22 is a diagram showing a ring network according to a first modification of the third embodiment of the present invention.

FIG. 22 is a diagram showing a ring network 1-2*a* according to the first modification of the third embodiment of the present invention. The node devices 10-A2*a*~10-D2*a* shown in the diagram are practically identical in function with those described in the third embodiment, but the ring network 1-2*a* according to the first modification of the third embodiment differs from the ring network 1-2 according to the third embodiment in that, after failure occurrence in the work transmission line, if a failure further occurs in the protection transmission line (along which a path signal before path failure occurrence is transmitted), the node devices (10-A2*a*~10-D2*a*) will loop back and send out a signal onto the protection transmission line in the opposite direction from the direction of the protection transmission line along which the-signal before failure occurrence is transmitted.

In the transmission of the same path signal, the ring network 1-2a can perform the switching of the transmission line that-performs the bridging process after the span bridging process, without instantaneous hitting of the signal.

Note that in the description of the first modification of the third embodiment, the same reference numeral as that stated in the aforementioned third embodiment denotes the same part or practically the same part.

In the ring network 1-2a, in relaying a path signal coming in along the work transmission line, the node devices 10-A2a~10-D2a each hold the relayed path signal in the same way as the node devices 10-A2~10-D2 according to the aforementioned third embodiment. If a failure occurs in the path signal transmitted on the work transmission line, each node device will read out and send out the held path signal onto the protection transmission line (in the same. direction as the direction in which the path failure occurred) (span bridging process)., Furthermore, the node devices 10-A2a~10-D2a each hold a path signal that is sent out onto the protection transmission line by the span bridging process. If a failure occurs in the path signal sent out onto the protection transmission line, each node device will send out the path signal (path signal before failure occurrence) onto the protection transmission line along which a signal is transmitted in a direction differing from the direction that transmitted the path signal where the failure occurred (bridging process).

For instance, when a failure occurs in the path signal sent out onto the work transmission line on the west side and the path signal before failure occurrence is being sent out onto the protection transmission line on the west side, if a failure occurs in this path signal sent out onto the protection transmission line on the west side, the node device 10-B2a will sent out the path signal (path signal before failure occurrence that was sent out onto the protection transmission line on the west side) onto the protection transmission line on the east side.

Figure 23:
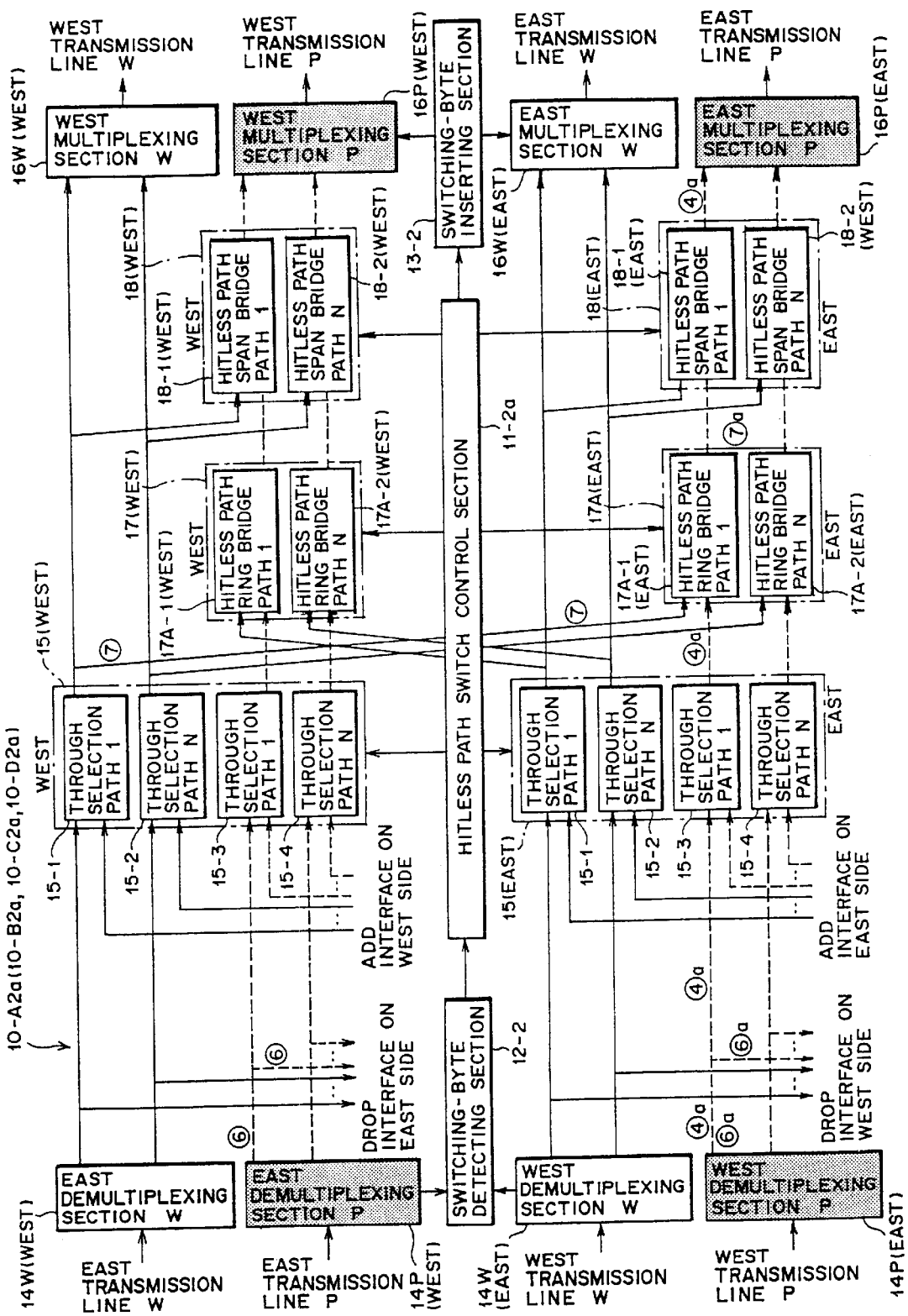
FIG. 23 is a block diagram showing the node device according to the first modification of the third embodiment of the present invention.

For this reason, the node devices 10-A2a~10-D2a are equipped with a hitless path switch control section 112a, a switching-byte detecting section 12, and a switching-byte inserting section 13, as shown in FIG. 23. Also, the node devices 10-A2a~10-D2a are equipped with demultiplexing sections 14W and 14P (west, east), through processing sections 15 (west, east), multiplexing sections 16W and 16P (west, east), span bridge processing sections 18 (west, east), and ring switch processing sections 17A (west, east) in the directions of transmitting a signal and for the work and protection transmission lines, respectively. Furthermore, the node devices 10-A2a~10-D2a are equipped with an add interface 30-1 shown in FIG. 9 and a drop interface 20-1a shown in FIG. 24.

Note that the node devices 10-A2a~10-D2a differ from the node devices 10-A2~10-D2 according to the third embodiment in that they are equipped with the ring bridge sections 17A (west, east) and are equipped with the drop interface 20-1a instead of the drop interface 20.

Here, the hitless path switch control section 11-2a functions the same as the hitless path switch control section 11-2 according to the third embodiment, but it differs from the hitless path switch control section 11-2 according to the third embodiment in that it controls the ring bridge processing sections 17A (west, east) and the drop interface 20-1a.

Here, the ring bridge processing section 17A (west, east) differs from the ring bridge processing section 17 (west, east) of the second embodiment in that it holds the path signal that is read out from the span bridge processing section 18 (west, east) and transmitted onto the protection transmission line.

For instance, the ring bridge processing section 17A (west) receives from the selecting sections. 15-1 and 15-2 (east) the same path signal as the signal that is read out from the span bridge processing section 18 (east) and sent out onto the protection transmission line on the east side, and holds the same path signal. If a failure occurs in the path signal transmitted on the protection transmission line on the east side, the ring bridge processing section 17A (west) will read out the held path signal and sent out it onto the protection transmission line on the west side [i.e., protection transmission line in the opposite direction from the protection transmission line on the east side along which the path signal read out from the span bridge processing section 18 (east) is transmitted] via the multiplexing section 16P (east).

Similarly, the ring bridge processing section 17A (east) holds the same path signal as the signal read out from the span bridge processing section 18 (west). If a failure occurs in the path signal transmitted on the protection transmission line on the west side, the ring bridge processing section 17A (east) will send out the held path signal onto the protection transmission line on the east side.

For this reason, the ring bridge processing sections 17A (east, west) are equipped with ring bridge sections 17A-1 and 17A-2 (east, west), as shown in FIG. 23. In the figure, each of the ring bridge sections 17A-1 and 17A-2 (east, west) is expressed as a hitless path switching ring bridge.

Note that after failure occurrence in the work transmission line, if a failure further occurs in the protection transmission line, the ring bridge sections (protection transmission line failure occurrence-time sending control section) 17A-1 and 17A-2 (west, east) will send out a transmitted signal through the protection transmission line in the opposite direction from the direction of the protection transmission line along which a signal before failure occurrence is transmitted.

The ring bridge sections 17A-1 and 17A-2 (west, east) are provided for each path. When a path failure occurs in a,path signal read out from the span bridge sections 18-1 and 18-2 (west, east) and sent out with the protection channel, the ring bridge sections 17A-1 and 17B-2 (west, east) each output the path signal in the opposite direction from the direction that sent out the path signal where the path failure occurred.

For example, the path signal that is transmitted onto the protection transmission line on the west side with the work channel (CH1) is read out from the span bridge section 18-1 (west), while under control of the hitless path switch control section 11-2a the signal is also held in the ring bridge section 17A-1 (east) via the selecting section 15-1 (west). Furthermore, if a path failure occurs in the path signal read out from the span bridge section 18-1 (west) and transmitted onto the protection transmission line on the west side, the path signal held by the ring bridge section 17A-1 (east) will be sent out onto the protection transmission line on the east side.

For this reason, the ring bridge sections. 17A-1 and 17A-2 (west, east), as with the aforementioned bridge sections 33-1 and 33-2 (west, east) shown in FIG. 10, are each equipped with a work multi-frame detecting section 35, a memory write control section 36, a memory read phase control section 37, a work memory 38, and a work/protection path selecting section 39.

Note that the work memory (tenth memory section) 38 stores a signal received after a failure has occurred in the work transmission line. The memory read phase control section (fourth read control section) 37 will read out the path signal (held before failure occurrence) from the work memory (tenth memory section) 38 and send out the read path signal through the protection transmission line in the opposite direction from the transmission direction of the protection transmission line used before failure occurrence, if a failure further occurs in the protection transmission line after failure occurrence in the work transmission line.

When the ring bridge sections 17A-1 and 17A-2 (east, west), as with the aforementioned bridge sections 33-1 and 33-2 (east, west), detect a switching request (request SE(0001) from another node device, the hitless path switch control section 11-2*a* outputs the information about the switching request to the memory read phase control section 37. With this, the path signal held in the work memory 38 is read out.

Note that at the time of normal operation, the work/ protection path selecting section 39 selects protection path input data under control of the hitless path switch control section 11-2*a*.

This will be described with the ring section 17A-1 (west) as an example. When a failure occurs in the path signal read out from the span bridge section 18-1 (east), the work/ protection path selecting section 39 selects the path signal read out from the work memory 38 of the ring bridge section, 17A-1 (west) under control of the hitless path switch control section 11-2*a*, and sends the signal to the span bridge section 18-1 (west).

Furthermore, in this case, in the span bridge section 18-1 (west), the work/protection path selecting section 39 selects protection path input data (path signal read out from the work memory 38 of the ring bridge section 17A-1 (west) under control of the hitless path switch control section 11-2*a*, and sends the signal to the multiplexing section 16P. Note that in FIG. 23, each of the span bridge sections 18-1 and 18-2 (west, east) is expressed as a hitless path switching span bridge.

Figure 24:
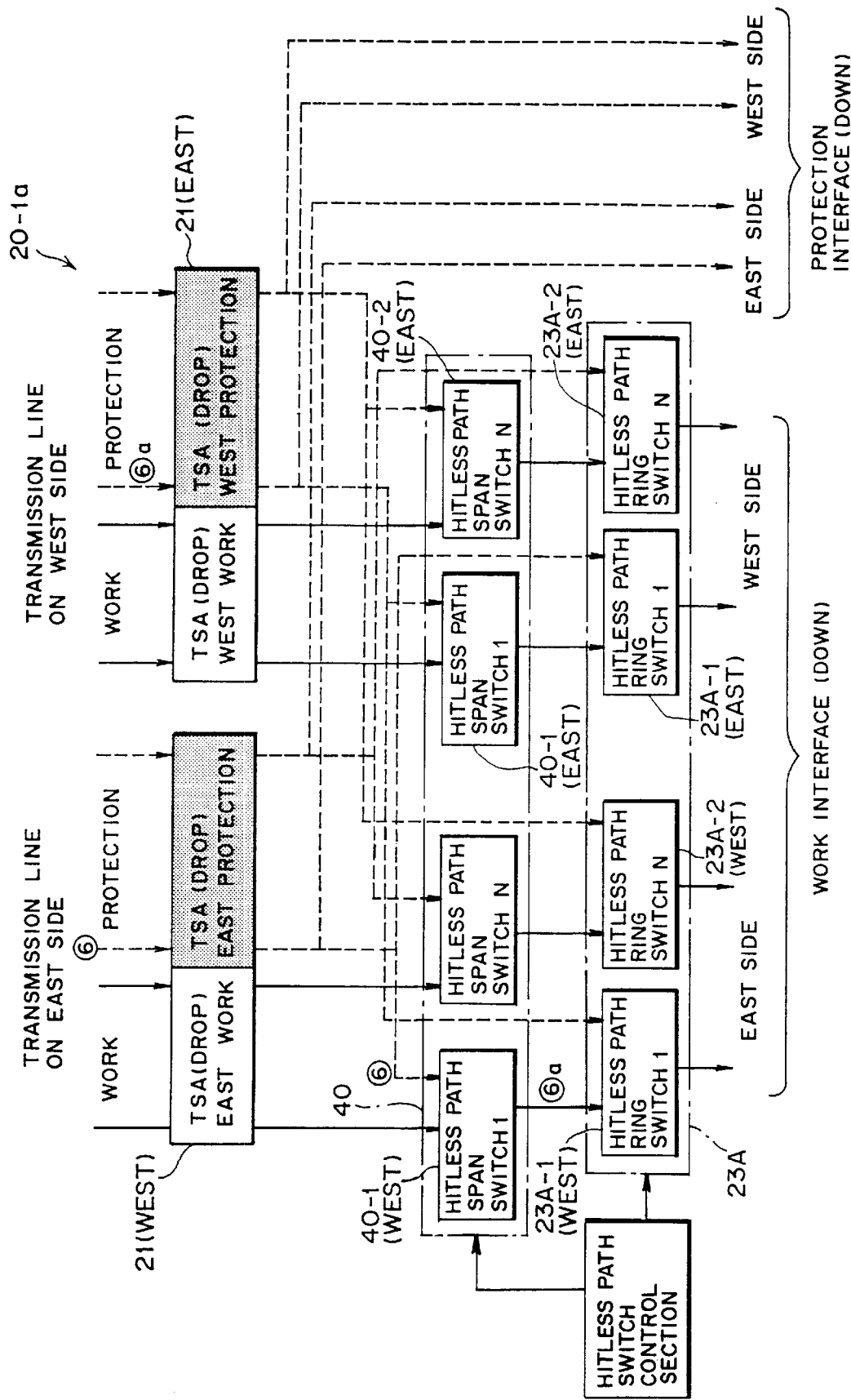
FIG. 24 is a block diagram showing a drop interface according to the first modification of the third embodiment of the present invention.

The drop interface 20-1*a*, shown in FIG. 24, functions the same as the drop interface 20-1 according to the third embodiment with respect to the fact that it makes a phase adjustment in sending out a path signal coming in along the high-speed transmission line onto the low-speed transmission line (another network, etc.), but it differs from the drop interface 20-1 according to the third embodiment in that the path signal coming in along the protection transmission line by the bridging process (process of switching the same path) after the span bridging process is adjusted in phase and output onto the low-speed transmission line.

That is, the drop interface 20-1*a*, as with the drop interface 20-1 according to the aforementioned third embodiment, matches the phase of the path signal coming in along the work transmission line with the phase of the path signal read out from the span bridge section 18 (west, east) of the relay node device and coming in along the protection transmission line, and outputs the adjusted signal onto the low-speed transmission line. Furthermore, the drop interface 20-1*a* matches the phase of the path signal read out the span bridge section 18 (west, east) of the relay node device and coming in along the protection transmission line with the phase of the path signal read out the ring bridge processing section 17 (west, east) of the relay node device and coming in along the protection transmission line, and outputs the adjusted signal onto the low-speed transmission line.

For instance, consider mainly the node device 10-C that outputs a path signal (path 1) from the high-speed transmission line onto the low-speed transmission line. At the time of normal operation, if the drop interface 20-1*a* receives and holds the path signal (path 1) through the protection transmission line on the east side, it will delay the path signal by a predetermined time and output it onto the low-speed transmission line. Thereafter, if a failure occurs in the path signal (path 1) coming in along the work transmission line on the east side, the path signal (path 1) coming in along the protection transmission line on the east side will be adjusted in phase by the drop interface 20-1*a* and output onto the low-speed transmission line.

Furthermore, when a failure occurs in the path signal (path 1) coming in along the protection transmission line on the east side, the drop interface 20-1*a* receives the path signal (path 1) coming in along the protection transmission line on the west side, then makes a phase adjustment, and outputs the adjusted signal onto the low-speed transmission line.

For this reason, the drop interface 20-1*a*, as shown in FIG. 24, is equipped with time slot assignment (TSA) sections 21 (west, east), a span switch processing section 40, and a hitless path switch processing section 23A.

Here, the hitless path switch processing section 23A has the same function as the hitless path switch processing section 23, and makes a phase adjustment for each path signal and then outputs the adjusted signal onto the low-speed transmission line.

For example, consider a certain single path signal. At the time of normal operation, the hitless path switch processing section 23A receives a path signal coming in along the work transmission line and holds it temporarily, then makes a phase adjustment, and outputs the adjusted signal onto the low-speed transmission line. Thereafter, when the hitless path switch processing section 23A receives a path signal coming in by the ring bridging process, it likewise holds the signal temporarily, then make a phase adjustment, and outputs the adjusted signal onto the low-speed transmission line.

For this reason, the hitless path switch processing section 23A is equipped with switching sections 23A-1 and 23B-2 (west, east) for handling path signals coming in along the-work and protection transmission lines on the east and west sides, as shown in FIG. 24. Note that in the figure, the switching sections 23A-1 and 23B-2 (west, east) are expressed as hitless path switching ring switches.

Here, the switching sections 23A-1 and 23A-2 (west, east), as with the switching sections 23-1 and 23-2 according to the aforementioned first embodiment (see FIG. 12), are equipped with a work/protection path bit error detecting section 24-1, a work path multi-frame detecting section 24-2, an M-multi frame counter 24-3, a phase comparing section 24-4, a work memory write phase control section 24-5, a memory read phase control section 24-6, a work/ protection path selecting section 24-7, a work memory 24-8, a protection path multi-frame detecting section 24-9, a protection memory write phase control section 24-10, and a protection memory 24-11.

Note that the work memory (eleventh memory section) 24-8 stores a path signal received after a failure has occurred in the work transmission line, and also receives and stores a path signal coming in along the work transmission line through the span switch processing section at the time of normal operation.

At the time of path failure occurrence, the protection memory (twelfth memory section) 24-11 stores a path signal that is received by the memory read phase control section 37 of the ring bridge processing section 17A of a relay node through the protection transmission line in the opposite direction from the direction of the protection transmission line along which a signal before failure occurrence was transmitted.

When a path failure occurs in the path signal-sent out onto the protection transmission line by the span bridging process, the memory read phase control section (fourth phase adjusting section) 24-6 matches the time phase of the path signal stored in the work memory (eleventh memory section) 24-8 after path failure occurrence in the protection transmission line with the time phase of the path signal stored in the protection memory (twelfth memory section) 24-11 before path failure occurrence in the protection transmission line, and outputs the signal read out from the protection memory (twelfth memory section) 24-11 to the outside.

For example, consider a path signal (path 1) coming in from the node device 10-A2a through the node device 10-B2a to the node device 10-C2a at the time of normal operation. If the switching section 23-1 (east) receives from the span switching section 40-1 (east) either a path signal (path 1) coming in along the work transmission line on the east side at the time of normal operation or a path signal (path 1) coming in along the protection transmission line on the east side at the time of path failure occurrence (at the time of failure occurrence in a path signal (path 1) in coming in along the work transmission line on the east side), the switching section 23-1 (east), will hold the received signal in the work memory 24-8 temporarily. After delaying the signal by a predetermined time, the switching section 23-1 (east) outputs it onto the low-speed transmission line through the work/protection path selecting section 24-7.

Also, if the switching section 23-1 (east) receives a path signal (path 1) coming in along the protection transmission line on the west side at the time of path failure occurrence (at the time of failure occurrence in a path signal (path 1) coming in along the protection transmission line on the east side) without passing the path signal (path 1) through the span switching section 40-1 (east), the switching section 23-1 (east) will hold the received signal in the protection memory 24-11 temporarily. After delaying the signal by a predetermined time, the switching section 23-1 (east) outputs it onto the low-speed transmission line through the work/protection path selecting section 24-7. Note that each of the span switching sections 40-1 and 40-2 (west, east) is expressed as a hitless path switching span switch.

The operation inside and outside the node devices 10-A2a~10-D2a of the ring network 1-2a will hereinafter be described on the assumption that a path signal (path 1), sent out from the low-speed transmission line onto the high-speed transmission line at the node device 10-A2a, is sent from the node device 10-B2a to the node device 10-C2a through the protection transmission line (along which a signal is transmitted from the node device 10-B2a to the node device 10-C2a) by the span bridging process performed at the node device 10-B2a.

In the node device 10-B2a, the path signal (path 1) is read out from the span bridge section 18-1 (west) and sent to the multiplexing section 16P (west) under control of the hitless path switch control section 11-2a, as shown in FIG. 23.

The path signal (path 1) coming in with the work channel (CH1) from this node device 10-A2a is adjusted in phase by the span bridge section 18-1 (west) and then is added to a SDH frame by the multiplexing section 16P (west) along with other signals. The path signal (path 1) is sent out onto the protection transmission line on the west side toward the node device 10-C2b. Also, the path signal is held in the ring bridge section 17A-1 (east) via the selecting section 15-1 (west) in accordance with route ⑦ shown in FIG. 23.

On the other hand, in the node device 10-C2a, if the SDH frame added with the path signal (path 1) coming in along the protection transmission line on the east side with the protection channel (CH1) is received, the signals added to the SDH frame will be demultiplexed by the demultiplexing section 14P (west) in accordance with channels.

The path signal (path 1) is sent to the drop interface 20-1a in accordance with route ⑥ shown in FIG. 23.

In the drop interface 20-1a, the path signal (path 1) is sent to the span switching section 40-1 (west) in accordance with route ⑥ shown in FIG. 24.

Here, the span switching section 40-1 (west) temporarily holds the incoming path signal (path 1) in the protection memory 24-11, then adjusts the phase, and outputs the adjusted signal to the switching section 23A-1 (west) via the work/protection path selecting section 24-7.

Thereafter, the path signal is temporarily held in the work memory 24-8 of the switching section 23A-1. After the phase of the path signal has been adjusted, it is sent out onto the low-speed transmission line through the work/protection path selecting section 24-7.

Incidentally, as with the aforementioned case, the operation inside and outside the node devices 10-A2a~10-D2a in the case where a path failure (i.e., a path failure in the path signal (path 1) transmitted from the node device 10-B2a to the node device 10-A2a) occurs between the node devices 10-B2a and 10-C2a is practically the same as the operation inside and outside the node devices 10-A1~10-D1 according to the second embodiment, so a detailed description thereof is omitted.

If a failure occurs in the path 1 (path signal sent out from the span bridge section 18-1 of the node device 10-B2a onto the protection transmission line on the east side), the node device 10-C2a will detect the path failure from the received signal. That is, the work/protection path input bit error detecting section 24 (see FIG. 12) of the span switching section 40-1 (east) sends the error information about the counted input data to the hitless path switch control section 11-2a, which in turn detects the occurrence of the path failure.

After detecting the path error, the hitless path switch control section 11-2a outputs the SOH added with the switching bytes (where the request is SE(0001) toward the node devices 10-D2a~10-A2a and 10-B2a.

If the hitless path switch control section 11-2a of the node device 10-B2a receives the switching bytes (where the request is BR(0010) sent out from the node device 10-C2a and detects SE(0001) from the switching bytes, the hitless path switch control section 11-2a will judge that its own node corresponds to a bridge node. Therefore, the hitless path switch control section 11-2a outputs the M-multi frame data, held before path failure occurrence in the work memory 38 (see FIG. 10) of the span bridge section 17A-1 (east) shown in FIG. 23, onto the protection transmission line on the east side (in the opposite direction from the direction of the transmission line (west side) where the path failure occurred) (bridging process)

That is, in the ring bridge processing section 17A (east) of the node device 10-B2a, the path signal held in the ring bridge section 17A-1 (east) is sent to the multiplexing section 16P (east) via the span bridge section 18-1 (east) in accordance with route ⑦ a shown in FIG. 23. The multiplexing section 16P (east) adds the path signal to the SDH frame along with other path signals and outputs the SDH frame onto the protection transmission line on the east side.

In performing the ring bridging process, the hitless path switch control section 11-2a of the node device 10-B2a inserts the status BR(0001) in the switching bytes. Thereafter, the SDH frame added with the switching bytes (added with the status BR(0001) is sent to the other node devices 10-A2a~10-D2a and 10-C2a.

In the node devices 10-A2a and 10-D2a, judgments of the status, etc. are made. Since the status information in the switching bytes is BR(0001), the hitless path switch control section 11-2a of the node devices 10-A2a and 10-D2a judges that its own node does not correspond to a switching node and therefore performs-the through control.

More-specifically, if the node device 10-A2a receives the path signal before path failure occurrence which was sent by the ring bridging process at the node device 10-B2a (i.e., the path signal coming in with the protection channel (CH1), the node device 10-A2a will pass the path signal therethrough in accordance with route ④ a shown in FIG. 23 (through control). If there are other path signals at the multiplexing section 16P (east), the path signal before path failure occurrence will be multiplexed to the SDH frame along with the other path signals. The SDH frame is output onto the protection transmission line on the east side toward the node device 10-D2a with the protection channel (CH1).

Note that the node device 10-D2a likewise performs the through control on the path signal coming in with the protection channel (CH1) (i.e., the path signal path sent from the ring bridge section 17A-1 (east) by the ring bridging process of the node device 10-B2a).

Next, the node device 10-C2a detects the switching bytes received from the node device 10-D2a and makes judgements of the status, etc. Since its own node ID corresponds to a switching node ID, the node device 10-C2a receives the M-multi frame data coming in with the protection channel (CH1) (i.e., M-multi frame data before path failure occurrence which was out from the node device 10-B2a ). After adjusting the phase of the frame data, the node device 10-C2a outputs the adjusted data onto the low-speed transmission line (switching control).

More specifically, the node device 10-C2a receives the path signal (path 1) coming in with the protection channel (CH1) and performs the demultiplexing process at the demultiplexing section 14P (east). Next, the node device 10-C2a sends the path signal (path 1) to the drop interface 20-1a in accordance with route ⑥ a shown in FIG. 23.

The drop interface 20-1a sends the path signal (path 1) coming in with the protection channel (CH1) to the switching section 23A-1 (west) in accordance with route ⑥ a shown in FIG. 24. This switching section 23A-1 (east) holds this path signal (path 1) in the protection memory 24-11. After delaying the path signal by a predetermined time, the ring switching section 23A-1 (west) outputs the signal onto the low-speed transmission line.

Note that in performing the switching control, the hitless path switch control section 11-2a of the node device 10-C2a adds status BR&SW(0100) to the switching bytes and the switching-byte inserting section 13 inserts the switching bytes in the SOH of the SDH frame. Thereafter, the SDH frame added with status BR&SW(0100) is sent to the node devices 10-D2a and 10-A2a.

Incidentally, as described above, when a failure occurs in the path signal (path 1) transmitted with the work channel (CH1) by the span bridging process of the node device 10-B2a, the node device 10-B2a performs the ring bridging process and transmits the path signal held before path failure occurrence, while the node device 10-C2a performs the switching process. However, the present invention is not limited to this. For example, with a changeback request (i.e., a request that the path signal transmitted with the protection channel be retransmitted with the original work channel) sent by the node device 10-C2a, the path signal transmitted with the protection channel (CH1) by the ring bridge process can be transmitted with the protection channel (CH1). Or the path signal can be transmitted with the work channel employed at the time of normal operation.

Thus, according to the ring network 1-2a of the first modification of the third embodiment, in the node device 10-B2a the work memory 38 of the ring bridge section 17A-1 (east) stores a signal received through the work the protection channel (CH1) on the east side. The memory read phase control section 37 will read out the transmitted signal (held before failure occurrence) from the work memory 38 and will loop back and send out the transmitted signal through the protection transmission line on the east side in the opposite direction from the transmission direction of the protection transmission line on the west side employed before failure occurrence, if a failure further occurs in the protection transmission line on the west side after failure occurrence in the work transmission line on the west side.

Also, in the other node device 10-C2a, the work memory 24-8 of the switching section 23A-1 (west) stores the path signal (path 1) received through the protection transmission line on the east side. After failure occurrence in the protection transmission line on the east side, the protection memory 24-11 stores a signal that is received through the protection transmission line on the west side by the memory read phase control section 37 of the node device 10-B2a. And the memory read phase control section 24-6 matches the time phase of the received signal stored in the work memory 24-8 after path failure occurrence with the time phase of the received signal stored in the protection memory 24-11 before path failure occurrence, and outputs the received signal held in the protection memory 24-11 to the outside.

Therefore, after failure occurrence in the work transmission line on the west side, even when a failure further occurs in the protection transmission line, the ring network 1-2a can transmit a signal from one node device 10-B2a to the other node device 10-C2a without instantaneous hitting of the signal, by performing the ring bridging process at the node device 10-B2a and performing the switching process at the node device 10-C2a. As a result, transmission quality reduction can be prevented.

(c-2) Description of a Second Modification of the Third Embodiment

Figure 25:
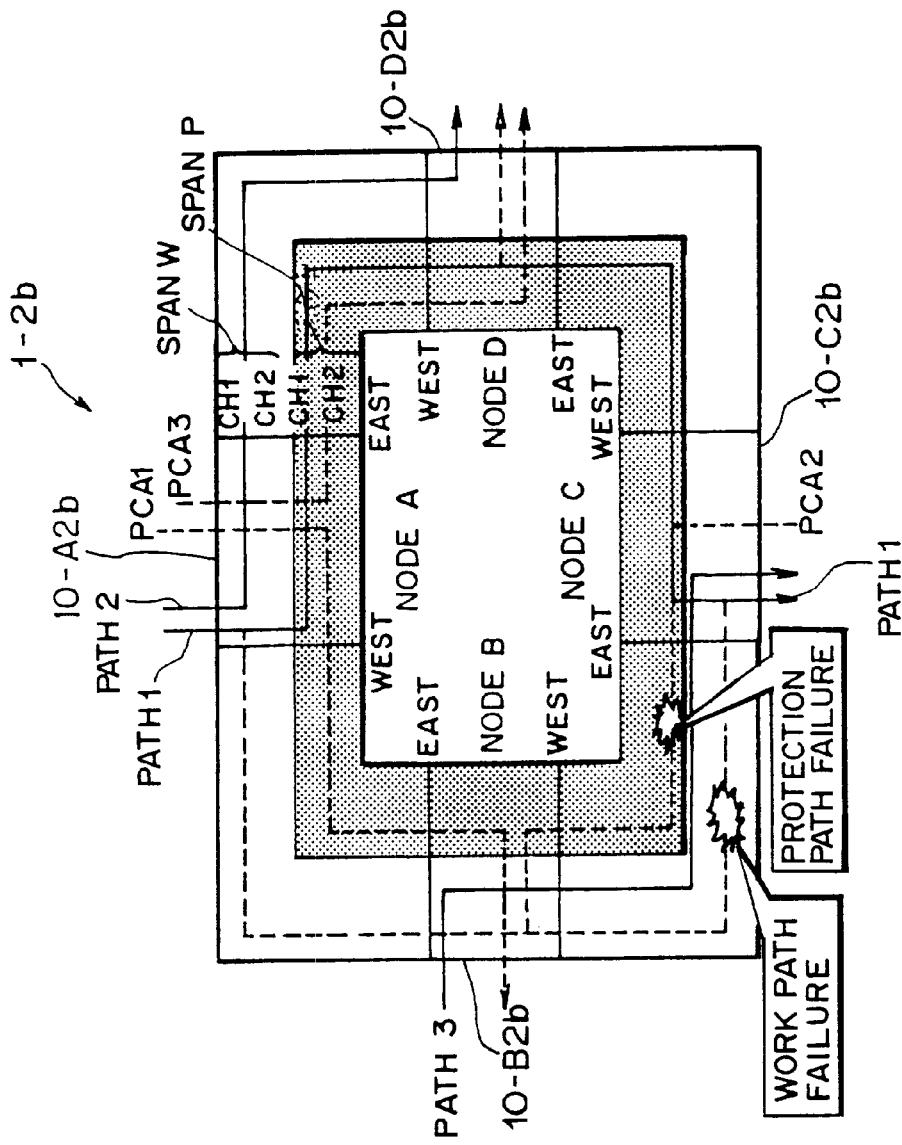
FIG. 25 is a diagram showing a ring network according to a second modification of the third embodiment of the present invention.

FIG. 25 is a diagram showing a ring network 1-2b according to the second modification of the third embodiment of the present invention. The node devices 10-A2b~10-D2b shown in the diagram are practically identical in function with those described in the third embodiment, but the ring network 1-2b according to the second modification of the third embodiment differs from the ring network 1-2 according to the third embodiment in that, after failure occurrence in the work transmission line, if a failure further occurs in the protection transmission line (along which a path signal before path failure occurrence is transmitted), the node devices (10-A2b~10-D2b) will loop back and send out a signal onto the protection transmission line in the opposite direction from the direction of the protection transmission line along which a signal before failure occurrence is transmitted. Also, the ring network 1-2*b* differs from the ring network 1-2 according to the third embodiment in that the add node device (add node), which adds a path signal received through the low-speed transmission line to the high-speed transmission line, loops back and sends out a signal through the protection transmission line in the opposite direction from the direction of the protection transmission line along which a signal before failure occurrence is transmitted.

Note that in the description of the second modification of the third embodiment, the same reference numeral as that stated in the aforementioned first, second, and third embodiments and the first modification of the third embodiment denotes the same part or practically the same part.

In relaying a path signal coming in along the work transmission line, the node devices 10-A2*b*~10-D2*b* in the ring network 1-2*b* each hold the relayed path signal in the same way as the node devices 10-A2~10-D2 according to the aforementioned third embodiment. If a failure occurs in the path signal transmitted on the work transmission line, each node device will read out and send out the held path signal (span bridging process).

Furthermore, each of the node devices 10-A2*b*~10-D2*b* hold a path signal, which is sent out onto the high-speed transmission line through the low-speed transmission line by its own node and also is sent out onto the protection transmission line by the span bridging process at a relay node. If a failure occurs in the path signal sent out onto the protection transmission line by the span bridge process, each node device will send out the path signal (path signal held before failure occurrence) onto the protection transmission line along which a signal is transmitted in a direction differing from the direction that transmitted the path signal where the failure occurred (bridging process).

For instance, consider the case where the path signal (path 1), sent out onto the work transmission line on the west side through the low-speed transmission line at the node device 10-A2*b*, is sent out onto the protection transmission line on the west side by the span bridge process at a relay node device 10-B2*b*. The node device 10-A2*b* holds the same content data (path signal) as the signal (path 1) that is transmitted by the span bridging process at the node device 10-B2*b*.

Here, if a failure occurs in the path signal (path 1) sent out onto the protection transmission line on the west side from the node device 10-B2*b*, the node device 10-A2*a* will sent out the path signal (path signal before failure occurrence that was sent out onto the protection transmission line on the west side) onto the protection transmission line on the east side.

For this reason, the node devices 10-A2*b*~10-D2*b* are equipped with a hitless path switch control section 11-2*a*, a switching-byte detecting section 12, and a switching-byte inserting section 13, as shown in FIG. 20. Also, the node devices 10-A2*b*~10-D2*b* are equipped with demultiplexing sections 14W and 14P (west, east), through processing sections 15 (west, east), multiplexing sections 16W and 16P (west, east), and ring switch processing sections 17A (west, east) in the directions of transmitting a signal and for the work, and protection channels, respectively. Furthermore, the node devices 10-A2*b*~10-D2*b* are equipped with an add interface 30-2 shown in FIG. 9 and a drop interface 20-1*a* shown in FIG. 24.

Note that the node devices 10-A2*b*~10-D2*b* differ from the node devices 10-A2~10-D2 according to the third embodiment in that they are equipped with the drop interface 20-1*a* and the add interface 30-2 instead of the drop interface 20 and the add interface 30-1.

Here, the hitless path switch control section 11-2*b* functions the same as the hitless path switch control section 11-2 according to the third embodiment, but it differs from the hitless path switch control section 11-2 according to the third embodiment in that it controls the drop interface 20-1*a* and the add interface 30-2.

Next, the add interface 30-2 shown in FIG. 9 is an interface for sending out a path signal received from another network or the like (low-speed transmission line) onto the high-speed transmission line (work or protection transmission line). The add interface 30-2 holds at least the same content path signal as the path signal transmitted by the span bridging process at a relay node (another node device). If a path failure occurs in the path signal transmitted by the span bridging process at the relay node (another node device), the add interface 30-2 will transmit the path signal held before failure occurrence to another relay node side.

For instance, consider the case where the path signal (path 1), sent out onto the work transmission line on the west side through the low-speed transmission line at the node device 10-A2*b*, is sent out onto the protection transmission line on the west side by span bridging process at a relay node device 10-B2*b*. The add interface 30-2 holds the same content data (path signal) as the path signal sent out onto the protection transmission line on the west side from the node device 10-B2*b*. If a path failure occurs in the path signal (path 1) sent out onto the protection transmission line on the west side from the node device 10-B2*b*, the add interface 30-2 will output the held path signal onto the protection transmission line on the east side toward another relay node side (node device 10-D2*b*).

For this reason, the add interface 30-2 is equipped with time slot assignment (TSA) sections 31 (west, east), a hitless path switch bridge processing section 33A, and a byte-J1 inserting section 34, as shown in FIG. 9.

The hitless path switch bridge processing section 33A has the same function as the hitless path switch bridge processing section 33 according to the first embodiment and holds a path signal transmitted to the high-speed transmission line side. If a failure occurs in a path signal being transmitted with the work channel (i.e., if a failure occurs in the path signal sent out by the span bridging process at a relay node), the hitless path switch bridge processing section 33A will read out and output the path signal held before failure occurrence.

Here, after path failure occurrence, the hitless path switch bridge processing section 33A outputs the path signal held before path failure occurrence onto the protection transmission line in the opposite direction from the direction of the transmission line where the path failure occurred.

For instance, when a path failure occurs in the path signal sent out onto the protection transmission line on the west side, the hitless path switch bridge processing section 33A transmits the path signal held before failure occurrence onto the protection transmission line on the east side-with the protection channel.

For this reason, the hitless path switch bridge processing section 33A is equipped with bridge sections 33A-1 and 33A-2 (west, east), which correspond to path signals that are transmitted onto transmission lines on the west and east sides at the time of path failure occurrence, respectively.

Note that after failure occurrence in the work transmission line, if a failure further occurs in the protection transmission line, the bridge sections (protection transmission line failure occurrence-time sending control section) 33A-1 and 33A-2 (west, east) will send out a transmitted signal through the protection transmission line in the opposite direction from the direction of the protection transmission line along which a signal before failure occurrence is transmitted.

For example, the bridge section 33A-1 (east) holds the path signal transmitted onto the work transmission line on the west side with the work channel (CH1). If a path failure occurs, the bridge section 33A-1 (east) will read out and sent out the held path signal to the TSA section 31 (east).

For this reason, the ring bridge sections 33A-1 and 33A-2 (west, east), as with the bridge sections 33-1 and. 33-2 (west, east) according to the first embodiment (see FIG. 10), are each equipped with a work multi-frame detecting section 35, a memory write control section 36, a memory read phase control section 37, a work memory.38, and a work/ protection path selecting section 39.

Note that the work memory (seventh memory section) 38 stores a signal being transmitted onto the work transmission line at the time of normal operation. The memory read phase control section (third read control section) 37 will read out the transmitted signal (held before failure occurrence) from the work memory 38 and send out the read path signal through the protection transmission line in the opposite direction from the transmission direction of the protection transmission line employed before failure occurrence, if a failure further occurs in the protection transmission line after failure occurrence in the work transmission line.

Also, under control of the memory read phase control. section 37, the work memory 38 is adjusted in phase so that it is read out after a failure occurs in the path signal sent out by the span bridging process at a relay node (the same signal as the data contents held in the work memory 38).

Note that the work memory (eighth memory section) 24-8 within the switching sections 23-A1 and 23A-2 (west, east) of the drop interface 20-1a stores a path signal received through the protection transmission line after failure occurrence in the work transmission line. At the time of failure occurrence in the protection transmission line, the protection memory (ninth memory section) 24-11 stores a path signal that is received by the memory read phase control section 37 of an add node device through the protection transmission line in the direction differing from the direction of the protection transmission line along which a signal before failure occurrence is transmitted.

Also, when a path failure occurs in the path signal sent out onto the protection transmission line by the span bridging process, the memory read phase control section (third phase adjusting section) 24-6 of the switching sections 23A-1 and 23A-2 matches the time phase of the path signal stored in the work-memory (eighth memory section) 24-8 after path failure occurrence in the protection transmission line with the time phase of the path signal stored in the protection memory (ninth memory section) 24-11 before path failure occurrence in the protection transmission line, and outputs the signal read out from the protection memory (ninth memory section) 24-11 to the outside.

The operation inside and outside the node devices 10-A2b~10-D2b of the ring network 1-2b will hereinafter be described on the assumption that a path signal (path 1), sent out from, the low-speed transmission line onto the high- speed transmission line at the node device 10-A2b, is sent from the node device 10-B2b to the node device 10-C2b through the protection transmission line (along which a signal is transmitted from the node device 10-B2b to the node device 10-C2b) by the span bridging process performed at the node device 10-B2b.

In the node device 10-B2b, the path signal (path 1) is read out from the span bridge section 18-1 (west) and sent to the multiplexing section 16P (west) under control of the hitless path switch control section 11-2b, as shown in FIG. 20.

The path signal (path 1) coming in with the work channel (CH1) from this node device 10-A2b is adjusted in phase by the span bridge section 18-1 (west) of the node device 10-Ab2 and then is added to a SDH frame by the multiplexing section 16P (west) along with other signals. The path signal (path 1) is sent out onto the protection transmission line on the west side toward the node device 10-C2b.

Also, the same content data as the path signal read out from the span bridge section 18-1 (west) of the node device 10-B2b is held in the bridge section 33A-1 (east) by the add interface 30-2 of the node device 10-A2b in accordance with route ⑧ shown in FIG. 9.

On the other hand, in the node device 10-C2b, if the SDH frame added with the path signal (path 1) coming in along the protection transmission line on the east side with the protection channel (CH1) is received, the signals added to the SDH frame will be demultiplexed by the demultiplexing section 14P.(west) in accordance with channels.

Here, the path signal (path 1) is sent to the drop interface 20-1a in accordance with route ⑥ shown in FIG. 23. As with the aforementioned first modification of the third embodiment, the path signal is adjusted in phase and sent out onto the low-speed transmission line.

Incidentally, as with the aforementioned case, the operation inside and outside the node devices 10-A2b 10-D2b in the case where a path failure (i.e., a path failure in the path signal (path 1) transmitted from the node device 10-B2b to the node device 10-A2b ) occurs between the node devices 10-B2b and 10-C2b follows the flowchart shown in FIG. 14 in the same as the operation inside and outside the. node devices 10-A~10-D according to the first embodiment, so a detailed description thereof is omitted.

If a failure occurs in the path 1, the node device 10-C2b will detect the path failure, based on the received signal. That is, the work/protection path input bit error detecting section 24 (see FIG. 12) of the span switching section 40-1 (east) sends the error information about the counted input data to the hitless path switch control section. 11-2b, which in turn detects the occurrence of the path failure.

After the path error has been detected, the SOH added with the switching bytes (where the request is SE(0001) is sent out from the node device 10-C2b toward the work transmission line on the west side (the opposite channel from the transmission line where the path failure occurred)

If the add node device 10-A2b detects the switching bytes sent out from the node device 10-D2b, the node device 10-A2b will judge from the detected switching bytes and the path connection table that its own node corresponds to a bridge node. Therefore, the node device 10-A2b outputs the M-multi frame data, held before path failure occurrence in the work memory 38 (see FIG. 10) of the span bridge section 17A-1 (east) shown in FIG. 23, onto the protection transmission line on the east side [in the opposite direction from the direction of the transmission line (west side) where the path failure occurred] (bridging process)

That is, in the add interface 30-2 of the node device 10-A2b, the path signal held in the bridge section 33A-1

(east) is output toward the high-speed-transmission line on the east side in accordance with route ⑤ shown in FIG. 9.

The path signal before path failure occurrence, output from the add interface 30-2, is sent through the selecting section 15-3 (east) to the multiplexing section 16P (east) in accordance with route b ① f shown in FIG. 20. The multiplexing section 16P (east) adds the path signal to the SDH frame along with other path signals and outputs the SDH frame onto the protection transmission line on the east side opposite from the work transmission line on the west side that transmitted the path signal before path failure occurrence (see FIG. 25).

In performing the ring bridging process, the hitless path switch control section 11-2b inserts the bridge node ID and the status BR in the switching bytes and adds the switching bytes to the SOH of the SDH frame. Thereafter, the SDH frame added with the switching bytes (added with the status BR) is sent to the other node devices 10-D2b and 10-C2b.

In the node devices 10-D2b, judgments of the status, etc. are made based on the switching bytes received from the preceding node device 10-C2b. The node devices 10-D2b performs the through control, because its own node does not correspond to a switching node.

More specifically, if the node device 10-D2b receives the path signal before path failure occurrence which was sent by the bridging control at the node device 10-A2b (i.e., the path signal coming in with the protection channel (CH1)), the node device 10-D2b will pass the path signal therethrough in accordance with route ④ shown in FIG. 20 (through control). If there are other path signals at the multiplexing section 16P (east), the path signal before path failure occurrence will be multiplexed to the SDH frame along with the other path signals. The SDH frame is output onto the protection transmission line toward the node device 10-C2b.

On the other hand, the node device 10-C2b judges, based on the switching bytes received from the node device 10-D2b and the path connection table, that its own node corresponds to a switching node. Therefore, the node device 10-C2b receives the M-multi frame data coming in with the protection channel (CH1) (i.e., M-multi frame data before path failure occurrence which was out from the node device 10-A2b). After adjusting the phase of the frame data (see FIG. 13), the node device 10-C2b outputs the adjusted data onto the low-speed transmission line.

More specifically, the node device 10-C2b receives the path signal (path 1) coming in with the protection channel (CH1) and performs the demultiplexing process at the demultiplexing section 14P (east). Next, the node device 10-C2b sends the path signal (path 1) to the drop interface 20-1a in accordance with route ⑥ a shown in FIG. 20.

The drop interface 20-1a sends the path signal (path 1) coming in with the protection channel (CH1) to the switching section 23A-1 (west) in accordance with route ⑥ a shown in FIG. 24. This switching section 23A-1 (east) holds this path signal (path 1) in the protection memory 24-11. After delaying the path signal by a predetermined time, the ring switching section 23A-1 (west) outputs the signal onto the low-speed transmission line.

Thus, according to the ring network 1-2b of the second modification of the third embodiment, in the node device 10-A2b the work memory 38 of the bridge section 33A-1 (east) stores the path signal (path 1) received through the low-speed transmission line. The memory read phase control section 37 will read out the transmitted signal of path 1 (held before failure occurrence) from the work memory 38 and will loop back and send out the transmitted signal through the protection transmission line on the east side in the opposite direction from the transmission direction of the protection transmission line employed before failure occurrence, if a failure further occurs in the protection transmission line on the west side after failure occurrence in the work transmission line on the west side.

In addition, in the other node device 10-C2b, the work memory 24-8 of the switching section 23A-1 (west) stores the path signal (path 1) received through the protection transmission line on the east side. After failure occurrence in the protection transmission line on the east side, the protection memory 24-11 stores a signal that is received through the protection transmission line on the west side by the memory read phase control section 37 of the node device 10-A2b. And the memory read phase control section 24-6 matches the time phase of the received signal stored in the work memory 24-8 after path failure occurrence with the time phase of the received signal stored in the protection memory 24-11 before path failure occurrence, and outputs the received signal held in the protection memory 24-11 to the outside.

Therefore, after failure occurrence in the work transmission line on the west side, even when a failure further occurs in the protection transmission line, the ring network 1-2b can transmit a signal from one node device 10-A2b to the other node device 10-C2b without instantaneous hitting of the signal, by performing the ring bridging process at the node device 10-A2b and performing the switching process at the node device 10-C2b. As a result, transmission quality reduction can be prevented.

(c-3) Description of a Third Modification of the Third Embodiment

Figure 26:
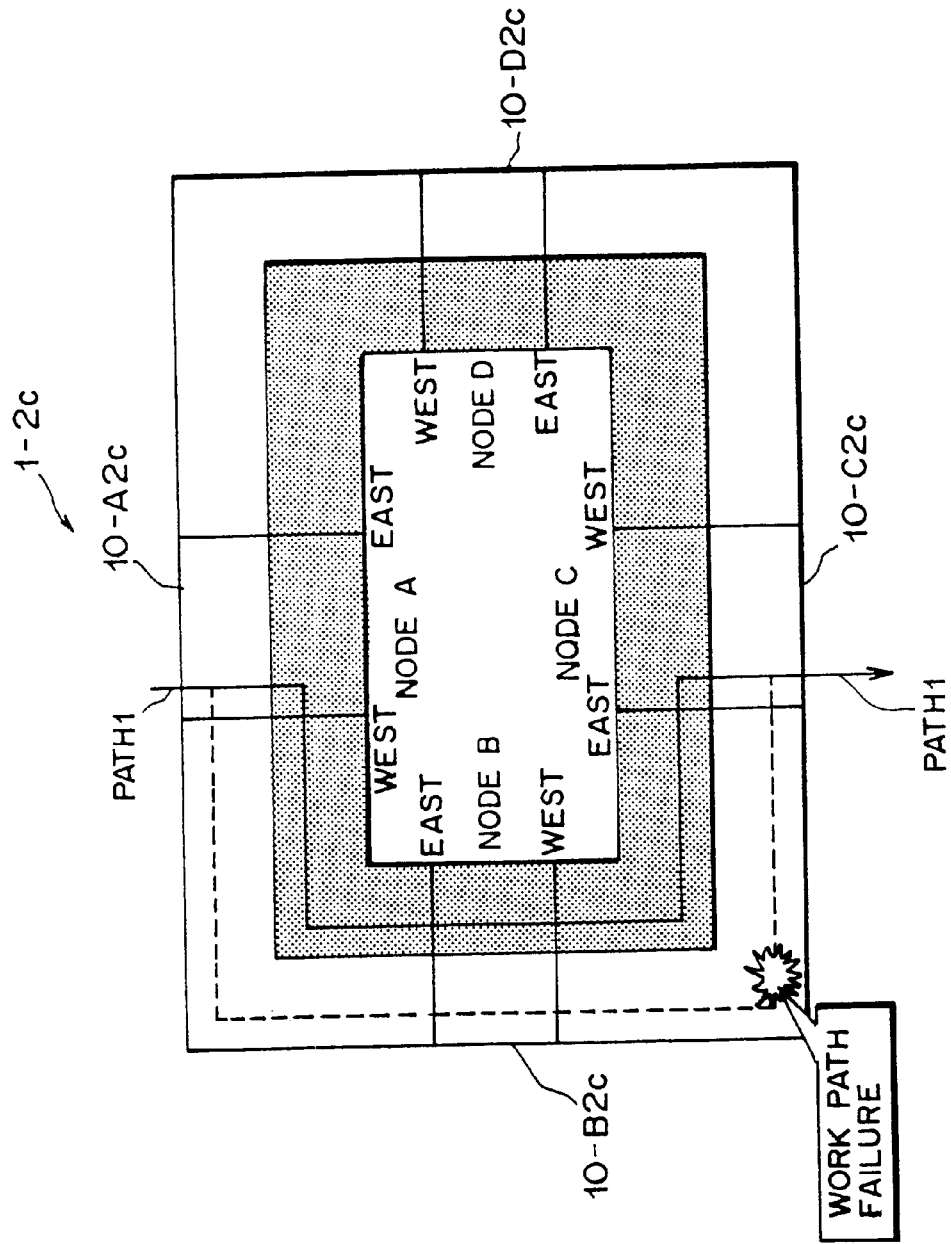
FIG. 26 is a diagram showing a ring network according to a third modification of the third embodiment of,the present invention.

FIG. 26 is a diagram showing a ring network 1-2c according to the third modification of the third embodiment of the present invention. The node devices 10-A2c~10-D2c shown in the diagram are practically identical in function with those described in the first, second, and third embodiments, but the ring network 1-2c according to the third modification of the third embodiment differs from the ring network 1-2 according to the aforementioned third embodiment in that, at the time of path failure occurrence, the add node device (add node), which sends out a path signal from the low-speed transmission line onto the high-speed transmission line, transmits a path signal held before failure occurrence to a drop node (node device that sends out a signal from the high-speed transmission line onto the low-speed transmission line) in the same direction as the direction of the protection transmission line where the path failure occurred.

Note that in the description of the third modification of the third embodiment, the same reference numeral as that stated in the aforementioned first, second, and third embodiments denotes the same part or practically the same part.

Here, consider the case where, between the node devices 10-B2c and 10-C2c, a failure occurs in the path signal (path 1) sent out from the low-speed transmission line onto the high-speed transmission line at the node device 10-A2c, as shown FIG. 26.

Here, the switching of the channel in the ring network 1-2 along which a signal is transmitted is performed for each path, as in the aforementioned ring network 1. The node devices 10-A2c~10-D2c, which send out a path signal from the low-speed transmission line onto the high-speed transmission line, transmit a path signal held before failure occurrence, in the same direction as the direction that transmitted the path signal where the failure occurred (span bridging process). After failure occurrence, if the node device that transmits a path signal from the high-speed transmission line onto the low-speed transmission line receives the path signal (path signal before failure occurrence) sent out by the span bridging process at the node device (which is one of the node devices 10-A2c 10-D2c), the received path signal will be adjusted in phase and sent out onto the low-speed transmission line (switching process).

Note that the hitless path switching process sequence in the ring network 1-2c is nearly the same as that in the ring network 1-1 according to the aforementioned second embodiment shown in FIG. 16 and that in the ring network 1-2 according to the third embodiment. The node device 10-C2c that detected a path failure adds the switching bytes to the SOH of a SDH frame and sends out the switching bytes to the node devices 10-D2c and 10-A2c through the opposite transmission line from the transmission line where the failure occurred.

Also, in the switching bytes in the ring network 1-2c, SE(0011) represents a span bridge switch request, status BR(0010) represents a span bridge status, and BR(1100) represents a bridge-switch status (span).

Note that even in this ring network 1-2c, the above-mentioned switching bytes are transmitted with the work channel.

Here, at the time of normal operation, the node device 10-A2c multiplexes the path signal, (path 1) received through the low-speed transmission line to the SDH frame and sends out the path signal onto the work transmission line on the west side, and also temporarily holds the path signal output onto the work transmission line on the west side. At the time of path failure occurrence, the node device 10-A2c outputs the held path signal onto the protection transmission line on the west side in the same direction as the direction of the work transmission line on the west side along which the path signal was transmitted.

For this reason, the node devices 10-A2c~10-D2c are equipped with a hitless path switch control section 11-2c, a switching-byte, detecting section 12, and a switching-byte inserting section 13, as shown in FIG. 20. Also, the node devices 10-A2c~10-D2c are equipped with demultiplexing sections 14W and 14P (west, east), through processing sections 15 (west, east), and multiplexing sections 16W and 16P (west, east) in the directions of transmitting a signal and for the work and protection channels, respectively. Furthermore, the node devices 10-A2c~10-D2c are equipped with a drop interface 20-1 shown in FIG. 21 and an add interface 30-3 shown in FIG. 27.

Note that the node devices 10-A2c~10-D2c differ from the node devices 10-A2~10-D2 according to the third embodiment in that they are equipped with a span bridge processing section 18A instead of the span bridge processing sections 18 (west, east).

Here, the-hitless path switch control section 11-2c functions the same as the hitless path switch control section 11-2 according to the third embodiment, but it differs from the hitless path switch control section 11-2 according to the third embodiment in that it controls the span bridge processing section 18A.

Next, the add interface 30-3 is the same as the node device 30 according to the first embodiment in that it is an interface for sending out a path signal coming in from the low-speed transmission line, onto the high-speed transmission line. The add interface 30-3 holds a path signal sent out onto the work transmission line. If a path failure occurs in the path signal sent out, the add interface 30-3 will sent out the held path signal onto the protection transmission line that transmits a signal in the same direction (which transmits the path-signal where the failure occurred).

Figure 27:
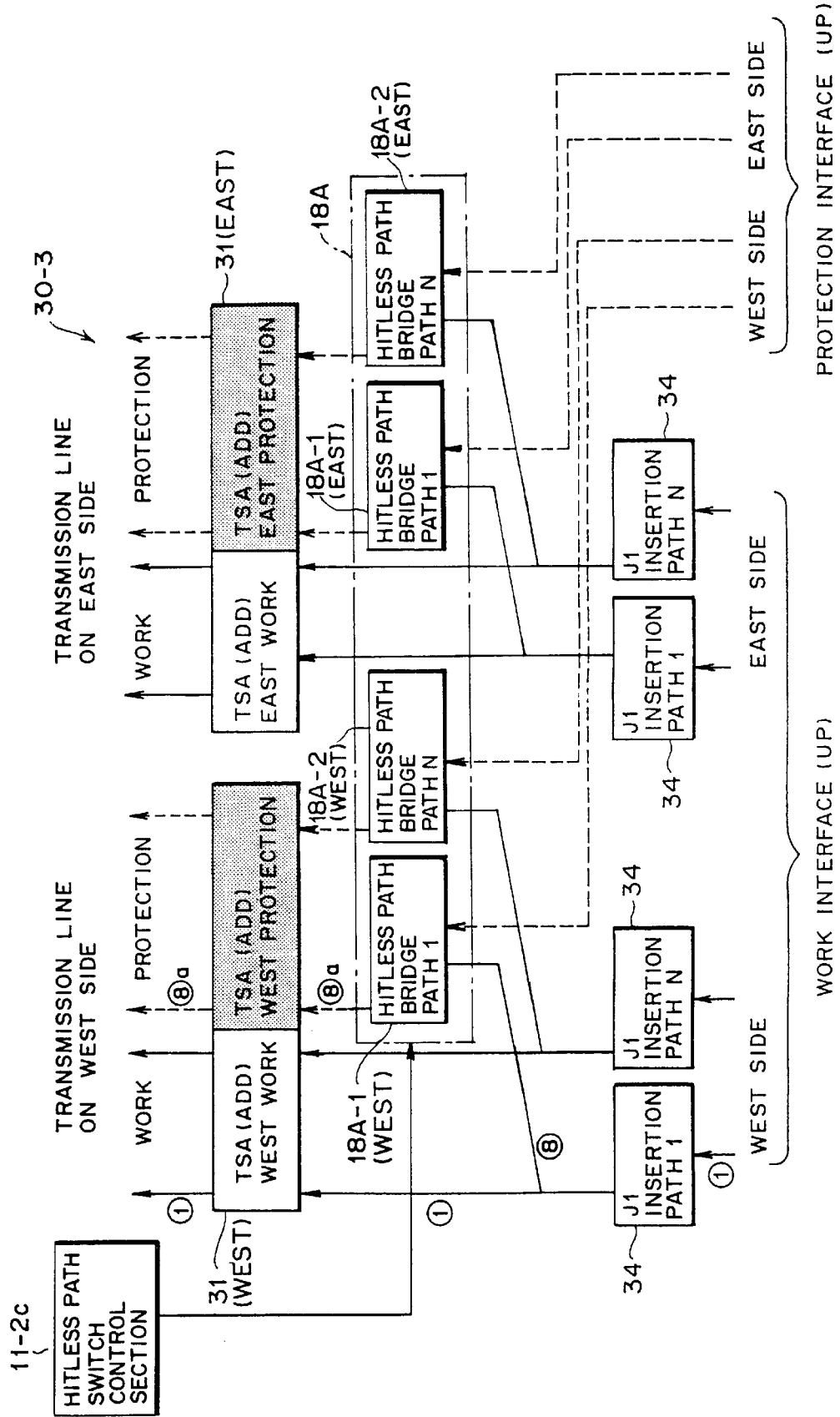
FIG. 27 is a block diagram showing an add interface according to the third modification of the third embodiment of the present invention.

For this reason, the add interface 30-3 is equipped with time slot assignment (TSA) sections 31 (west) and 31 (east), a span bridge processing section 18A, and a byte-J1 inserting sections 34. In FIG. 27, the byte-J1 inserting section 34 is expressed as J1 insertion.

The span bridge processing section 18A holds a path signal transmitted from the low-speed transmission line onto the high-speed transmission line. If a failure occurs in the path signal transmitted with the work channel, the span bridge processing section 18A will read out and output the path signal held before failure occurrence.

Note that at time of normal operation, the span bridge processing section 18A selects and outputs a PCA signal coming in from the low-speed transmission line.

For this reason, the span bridge processing section 18A is equipped with span bridge sections 18A-1 and 18A-2 (east, west), as shown in FIG. 27. In the figure, each of the span bridge sections 18A-1 and 18A-2 (east, west) is expressed as a hitless path switching bridge.

Note that the span bridge sections 18A-1 and 18A-2 (west, east) are provided so as to correspond to path signals, respectively. If a path failure occurs in the path signal sent out with the work channel, the span bridge sections 18A-1 and 18A-2 (west, east) will output a path signal in the same direction as the direction that transmitted the path signal where the path failure occurred.

For example, the path signal (path 1), transmitted with the work channel (CH1) on the west side, is held in the span bridge section 18A-1 (west) via the byte-J1 t inserting section 34. If a path failure occurs, the held path signal will be read out from the span bridge section 18A-1 (west) and sent out onto the protection transmission line on the west side with the protection channel (CH1).

For this reason, the span bridge sections 18A-1 and 1BA-2 (east, west), as with the aforementioned bridge sections 33-1 and 33-2 (east, west) shown in FIG. 10, are each equipped with a work multi-frame detecting section 35, a memory write control section 36, a memory read phase control section 37, a work memory 38, and a work/protection path selecting section 39.

Note that the work memory (fourth memory section) 38 stores a signal being transmitted onto the work transmission line at the time of normal operation. The memory read phase control section (second read control section) 37 reads out the path signal (held before failure occurrence) from the work memory 38 and sends out the path signal through the protection transmission line in the same direction as the direction of transmission used before failure occurrence, at the time of failure occurrence in the work transmission line.

When the span bridge sections 18A-1 and 18A-2 (east, west), as with the aforementioned bridge sections 33-1 and 33-2 (east, west), detect a switching request from another node device, the hitless path switch control section 11-2 outputs the information about the switching request to the memory read phase control section 37. With this, the path signal held in the work memory 38 is read out.

Note that if there is a switching request, the work/protection path selecting section 39 will select the data output from the work memory 38 and will output the data to-the TSA section 31 (east), by control of the hitless path switch control section 11-2. At the time of normal operation, the work/protection path selecting section 39 selects a protection channel access (PCA) signal.

The normal operation inside and outside the node devices 10-A2c~10-D2c of the ring network 1-2c according to the third modification of the third embodiment, constructed as described above, is the same as the node devices 10-A~10-D of the aforementioned first embodiment. In the node device 10-A2c, the path signal (path 1), output from the add interface 30-3, is sent through the selecting section 15-1 (west) to the multiplexing section 16W (east) in accordance with route ① shown in FIG. 20. The path signal is added to the SDH frame along with other path signals and is sent out onto the protection transmission line on the west side. Also, the path signal is held in the span bridge section 18A-1 (west) of the add interface 30-3 in accordance with route ⑧ shown in FIG. 27.

Incidentally, the operation inside and outside the node devices 10-A2c~10-D2c in the case where a path failure occurs in a path signal coming in with the work channel (CH1) between the node devices 10-B2c and 10-C2c is the same as the ring network 1-2 according to the third embodiment. The node device 10-C2c adds the switching bytes, added with the switching node ID and the bridge node ID, to the SOH of then SDH frame and sends out the switching bytes toward the node devices 10-D2c~10-A2c.

In the node device 10-D2c, the through-control is performed based on the received switching bytes. Also, in the node device 1G-A2c, if the switching bytes are detected, the M-multi frame data, held in the work memory 38 (see FIG. 10) of the span bridge section 18A-1 (west) before path failure occurrence, will be output onto the protection transmission line on the west side (in the same direction as the direction of the transmission line (west side) where the path failure occurred).

That is, in the span bridge processing-section 18A of the add interface 30-3, the path signal held in the span bridge section 18A-1 is sent toward the protection transmission line on the west side in accordance with route ⑧ a shown in FIG. 27. Also, the path signal (path 1) coming in from the add interface 30-3 is sent through the selecting section 15-3 (west) to the multiplexing section 16P (west) in accordance with route ⑧ a shown in FIG. 20. And in the multiplexing section 16P (west), the path signal (path 1) is added to the SDH frame along with other path signals and is sent out onto the protection transmission line on the west side.

In performing the span bridging process, the hitless path switch control section 11-2c of the node device 10-A2c outputs the switching bytes (including status BR(0010)) onto the work transmission line on the east side toward the node devices 10-D2c and 10-C2c.

If the node device 10-C2c detects the switching bytes (including status BR(0010)) output by the node device 10-A2c, the node device 10-C2c will receive the path signal coming in along the protection transmission line on the east side with the protection channel (CH1) (i.e., M-multi frame data before path failure occurrence that was output at the node device 10-A?c). After making a phase adjustment, the node device 10-C2c outputs the path signal onto the low-speed transmission line.

More specifically, the node device 10-C2c sends the path signal (path 1) coming in with the protection channel (CH1), which is one of the signals demultiplexed in accordance with channels by the demultiplexing section 14P (west), to the drop interface 20-1 in accordance with route ⑥ shown in FIG. 20.

In the drop interface 20-1, the path signal (path 1) coming in with the protection channel (CH1) is sent to the span switching section 40-1 (west) in accordance with route ⑥ shown in FIG. 21. The span switching section 40-1 (west) temporarily holds the path signal (path 1) in the protection memory 24-11. After delaying the path signal by a predetermined time, the span switching section 40-1 (west) outputs the path signal onto the low-speed transmission line.

Thus, according to the ring network 1-2c of the third modification of the third embodiment, in the node device 10-A2c the work memory 38 of the span bridge section 18A-1 (west) stores a signal being transmitted onto the work transmission line on the west side at the time of normal operation. The memory read phase control section 37 reads out the transmitted signal (held before failure occurrence) from the work memory 38 and sends out the transmitted signal through the protection transmission line on the west side in the same direction as the direction of transmission employed before failure occurrence, at the time of path failure occurrence in the work transmission line on the west side.

In addition, in the node device 10-C2c, the work memory 24-8 of the span switching section 40-1 (west) stores the path signal (path 1) received through the protection transmission line on the east side at the time of normal operation. The protection memory 24-11 stores a signal that is received through the protection transmission line on the west side by the memory read phase control section 37 of the node device 10-A2c at the time of failure occurrence. And the memory read phase control section 24-6 matches the time phase of the received signal stored in the work memory 24-8 after path failure occurrence with the time phase of the received signal stored in the protection memory 24-11 before path failure occurrence, and outputs the received signal held in the protection memory 24-11 to the outside.

Therefore, by performing the span bridging process at the add node for a path signal (path 1) (the node device 10-A2c) and performing the switching process at the other drop node (node device 10-C2c), the ring network 1-2c can transmit a signal from one node device 10-A2c to the other node device 10-C2c without instantaneous hitting of the signal, thereby being able to prevent transmission quality reduction.

(c-4) Description of a Fourth Modification of the Third Embodiment

Figure 28:
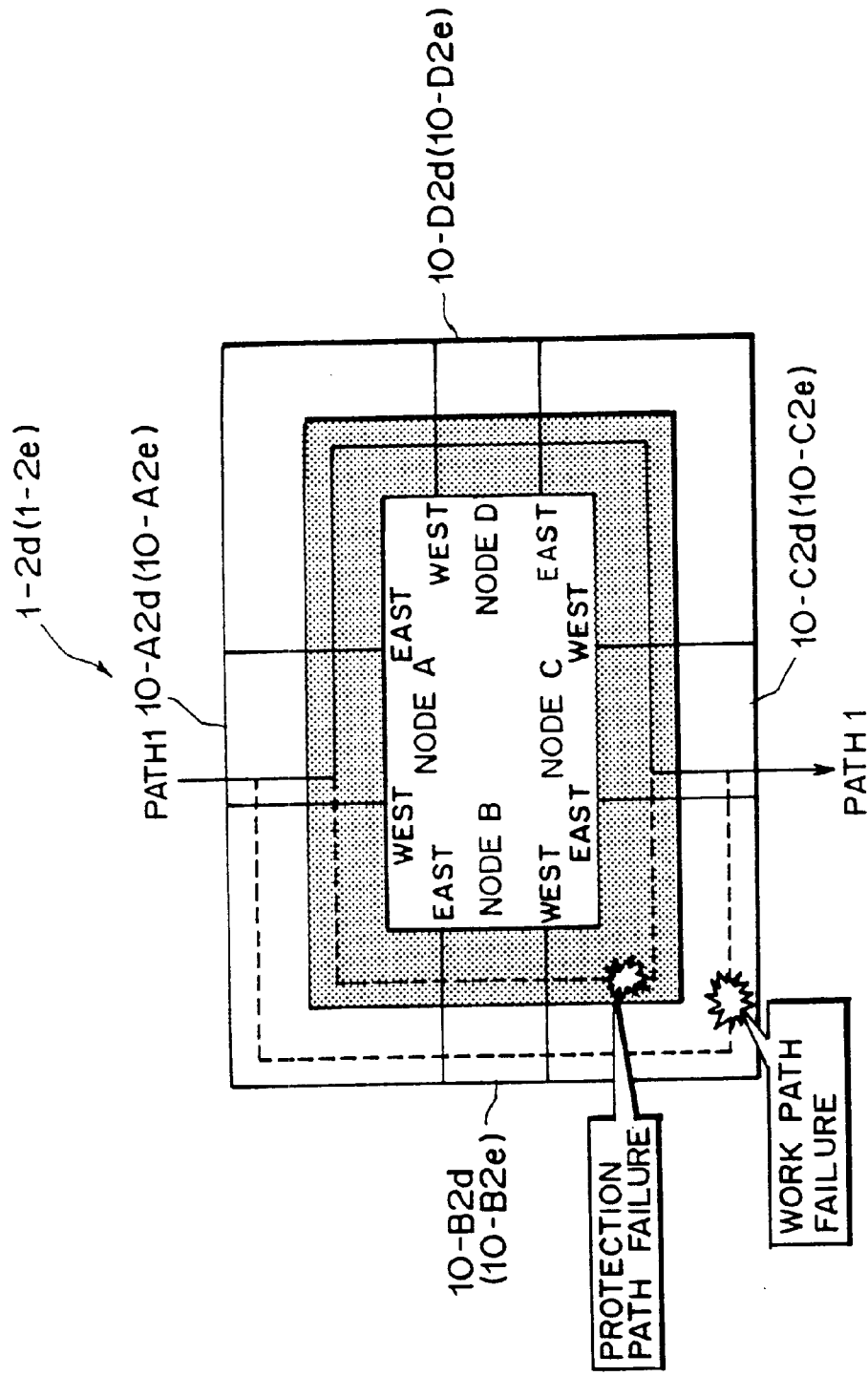
FIG. 28 is a diagram showing a ring network according to a fourth modification of the third embodiment of the present invention.

FIG. 28 is a diagram showing a ring network 1-2d according to the fourth modification of the third embodiment of the present invention. The node devices 10-A2d~10-D2d shown in the diagram are practically identical in function with those described in the first, second, and third embodiments, but the ring network 1-2d according to the fourth modification of the third embodiment differs from the ring network 1-2c according to the third modification of the third embodiment in that, after failure occurrence in the work transmission line, if a failure further occurs in the protection transmission line, the node devices (10-A2c~10-Dc) will loop back and send out a signal through the protection transmission line in the opposite direction from the direction of the protection transmission line along which a signal before-failure occurrence is transmitted.

Note that in the description of the fourth modification of the third embodiment, the same reference numeral as that stated in the aforementioned third modification of the third embodiment denotes the same part or practically the same part.

That is, the ring network 1-2d is the same as the ring network 1-2caccording to the third modification of the third embodiment in that, if a path failure occurs in the path signal transmitted with the work channel, the add node for sending out the path signal, where the failure occurred, from the low-speed transmission line onto the high-speed transmission line (work transmission line) will perform the span bridging process. Furthermore, when a path failure occurs in the path signal transmitted by the span bridging process, the node device for sending out the path signal, where the failure occurred, from the low-speed transmission line onto the high-speed transmission line (work transmission line) will also transmit the signal held before path failure occurrence, in the opposite direction from the direction that transmitted the path signal by the span bridging process.

For this reason, the node devices 10-A2d~10-D2d are equipped with a hitless path switch control section 11-2d, a switching-byte detecting section 12, and a switching-byte inserting section 13, as shown in FIG. 20. Also, the node devices 10-A2d~10-D2d are equipped with demultiplexing sections 14W and 14P (west, east), through processing sections 15 (west, east), and multiplexing. sections 16W and 16P (west, east) in the directions of transmitting a signal and for the work and protection channels, respectively. Furthermore, the node devices 10-A2d~10-D2d are equipped with a drop interface 20-1a shown in FIG. 24 and an add interface 30-4 shown in FIG. 29

Note that the node devices 10-A2d10-D2d differ from the node devices 10-A2c18 10-D2c~according to the third modification of the third embodiment in that they are equipped with the add interface 30-4 instead of the add interface 30-3 (see FIG. 27).

Here, the hitless path switch control section 11-2d functions the same as the hitless path switch control section 11-2c according to the third modification of the third embodiment, but it differs from the hitless path switch control section 11-2 according to the third embodiment in that it controls the drop interface 20-1a and the add interface 30-4.

Next, the add interface 30-4 has the same function as that of the node device 30-3 according to the third modification of the third embodiment. In addition, when a path failure occurs in a path signal transmitted by the span bridging process, the add interface 30-4 sends out the path signal held before failure occurrence, in the opposite direction from the direction that transmitted the path signal by the span bridging process.

For instance, consider a path signal (path 1). The add interface 30-4 holds the path signal transmitted toward the protection transmission line on the west side by the span bridging process. When a failure occurs in the path signal transmitted toward the protection transmission line on the west side, the add interface 30-4 transmits the held path signal (path signal before path failure occurrence) toward the protection transmission line on the east side.

Figure 29:
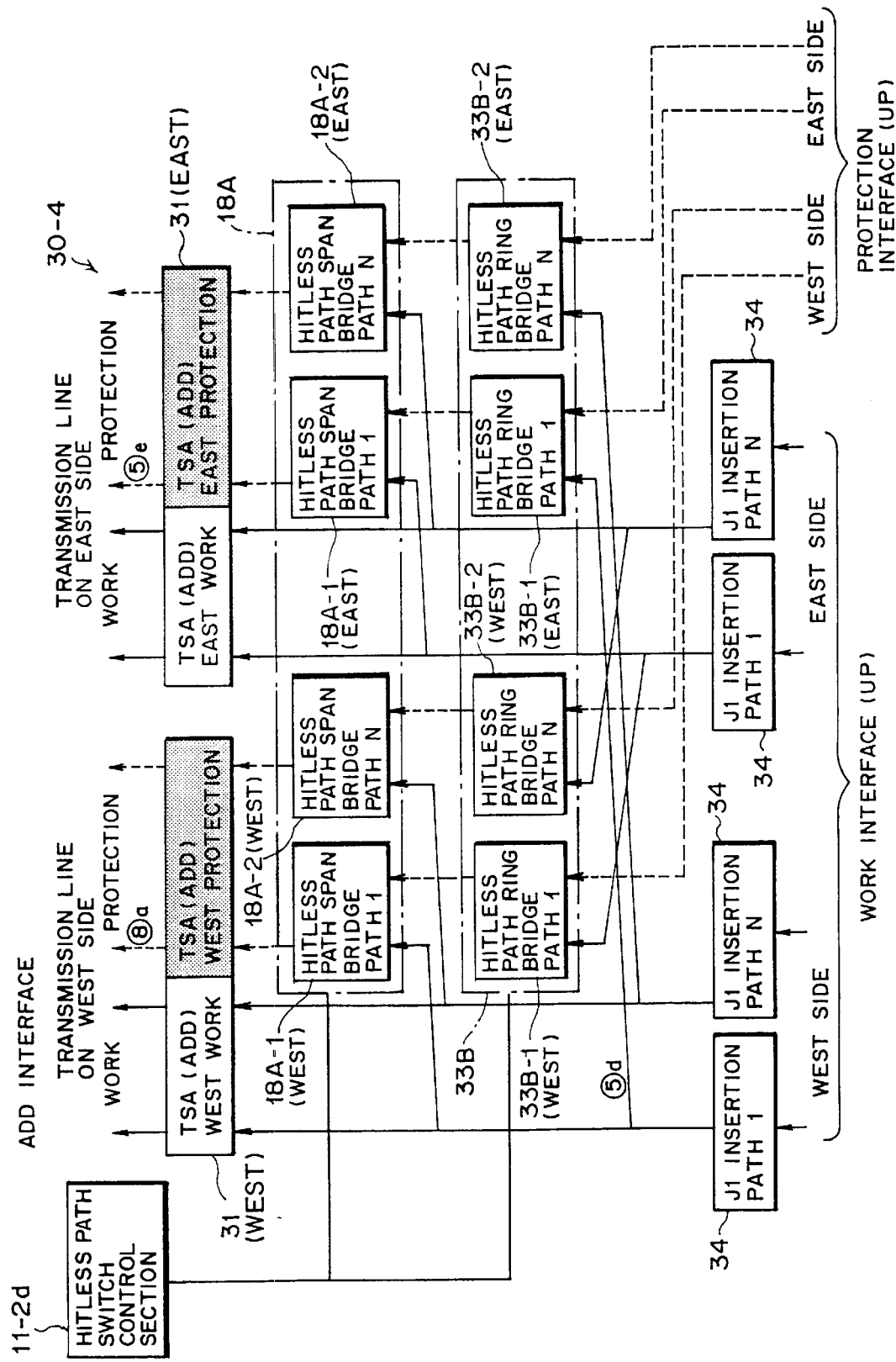
FIG. 29 is a block diagram showing an add interface according to the fourth modification of the third embodiment of the present invention.

For this reason, the add interface 30-4 is equipped with time slot assignment (TSA) sections 31 (west, east) a span bridge processing section 18A, a hitless path switch bridge processing section 33B, and a byte-J1 inserting sections 34. In FIG. 29, the byte-J1 inserting section 34 is expressed as J1 insertion.

Note that the add interface 30-4 differs from the add interface 30-3 according to the third modification of the third embodiment in that it is equipped with the hitless path switch bridge processing section 33B.

Here, the hitless path switch bridge processing section 33B has the same function as the hitless path switch bridge processing section 33 according to the first embodiment and holds the same content signal as the signal read out from the span bridge processing section 18A. If a failure occurs in the signal read out from the span bridge processing section 18A, the hitless path switch bridge processing section 33B will send out the held path signal in a direction differing from the direction in which the signal read out from the span bridge processing section 18A was transmitted.

For example, if a failure occurs in the path signal sent out toward the projection transmission line on the west side by the span bridge processing section 18A, the hitless path switch bridge processing section 33B will send out the path signal held before path failure occurrence, toward the projection transmission line on the east side.

For this reason, the hitless path switch bridge processing section 33B is equipped with bridge sections 33B-1 and 33B-2 (east, west), as shown in FIG. 29. In the figure, each of the span bridge sections 33B-1 and 33B-2 (east, west) is expressed as a hitless path switching ring bridge.

Note that after failure occurrence in the work transmission line, if a failure further occurs in the protection transmission line, the bridge sections (protection transmission line failure occurrence-time sending control section) 33B-1 and 33B-2 (east, west) will send out a transmitted signal through the protection transmission line in the opposite direction from the direction of the protection transmission line along which a signal before failure occurrence is transmitted. The bridge sections 33B-1 and 33B-2 (east, west) are provided so as to correspond to path signals, respectively.

For example, the path signal, read out from the span bridge section 18A-1 (west) and transmitted onto the protection transmission line on the west side with the work channel (CH1), is held in the bridge section 33B-1 (east) via the byte-J1 inserting section 34. If a path failure occurs, the held path signal will be read out from the bridge section. 33B-1 (east) and sent out onto the protection transmission line on the west side with the protection channel (CH1). Note that in FIG. 29, each of the span brige sections 18A-1 (east, west ) are expresses as a hitless path switching span brige.

For this reason, the ring bridge sections 33B-1 and 33B-2 (east, west), as with the aforementioned bridge sections 33-1 and 33-2 (east, west) shown in FIG. 10, are each equipped with a work multi-frame detecting section 35, a memory write control section 36, a memory read phase control section 37, a work memory 38, and a work/protection path selecting section 39.

Note that the work memory (tenth memory section) 38 stores a signal received after a failure has occurred in the work transmission line. The memory read phase control section (fourth read control section) 37 will read out the transmitted signal (held before failure occurrence) from the work memory 38 and send out the transmitted signal through the protection transmission line in the opposite direction from the transmission direction of the protection transmission line employed before failure occurrence, if a failure further occurs in the protection transmission line after failure occurrence in the work transmission line.

The operation inside and outside the node devices 10-A2d~10-D2d of the ring network 1-2d will hereinafter be described on the assumption that a path signal (path 1), sent out from the low-speed transmission line onto the high-speed transmission line at the node device 10-A2d, is sent through the protection transmission line on the west side by the span bridging process performed at the node device 10-A2d.

In the node device 10-A2d, the path signal (path 1) is read out from the span bridge section 18A-1 (west) and sent toward the protection transmission line on the west side under control of the hitless path switch control section 11-2b, in accordance with ⑧ a shown in FIG. 29. The path signal (path 1) coming in from the add interface 30-4 is sent through the selecting section 15-3 (west) to the multiplexing section 16P (west) in accordance with route ⑧ a shown in FIG. 20.

This path signal (path 1) is added to the SDH frame along with other path signals by the multiplexing section 16P (west) and is sent out onto the protection transmission line on the west side toward the node device 10-C2d. Also, in the add interface 30-4, the path signal is held in the bridge section 33B-1 (east) in accordance with route ⑤ d shown in FIG. 29.

Also, in the node device 10-B2d, if the SDH frame with the path signal (path 1) coming in along the protection transmission line on the east side with the protection channel (CH1) is received, the signals added to the SDH frame will be demultiplexed by the demultiplexing section 14P (west) into in accordance with channels.

The path signal (path 1) is sent through the selecting section 15-3 (west) to the multiplexing section 16P (west) in accordance with route ⑤ b shown in FIG. 20. In the multiplexing section 16P (west), the path signal is added to the SDH frame along with other signals and sent to the node device 10-C2a.

On the other hand, in the node device 10-C2d, if the SDH frame with the path signal (path 1) coming in along the protection transmission line on the east side with the protection channel (CH1) is received, the signals added to the SDH frame will be demultiplexed by the demultiplexing section 14P (west) in accordance with channels.

Here, the path signal (path 1) is sent to the drop interface 20-1a in accordance with route ⑥ shown in FIG. 20.

In the drop interface 20-1a, the path signal (path 1) is sent to the span switching section 40-1 (east) in accordance with route By shown ⑥ in FIG. 24.

Here, the span switching section 40-1 (east) temporarily holds the incoming path signal (path 1) in the protection memory 24-11. After the path signal has been adjusted in phase, it is sent to the switching section 23A-1 through the work/protection path selecting section 24-7. Thereafter, the path signal is temporarily held in the work memory 24-8 of the switching section 23A-1 (east). After the path signal has been adjusted in phase, it is sent onto the low-speed transmission line through the work/protection path selecting section 24-7.

Incidentally, the operation inside and outside the node devices 10-A2b~10-D2b in the case where a path failure (i.e., a failure in a path signal (path 1) coming in with the protection channel from the node device 10-B2d to the node device 10-A2d) occurs between the node devices 10-B2d and 10-C2d is the same as the ring network-according to the first embodiment. The node device 10-C2d adds the switching bytes, added with the switching node ID and the bridge node ID, to the SOH of the SDH frame and sends out the switching bytes toward the node devices 10-D2d and 10-A2d.

In the node device 10-D2d, the through control is performed based on the received switching bytes. Also, in the node device 10-A2d, if the switching bytes are detected, the M-multi frame data held before path failure occurrence in the work memory 38 (see FIG. 10) of the bridge section 33B-1 (west) will be output onto the protection transmission line on the west side (in the opposite direction from the direction of the transmission line (west side) where the path failure occurred).

That is, in the hitless path switch bridge processing section 33B of the add interface 30-4, the path signal held in the bridge section 33B-1 is sent toward the protection transmission line on the west side via the span bridge section 18A-1 in accordance with route ⑤ e shown in FIG. 29.

Also, the path signal (path 1) coming in from the add interface 30-4 is sent through the selecting section 15-3 (east) to the multiplexing section 16P (west) in accordance with route ① f shown in FIG. 20. And in the multiplexing section 16P (east), the path signal (path 1) is added to the SDH frame along with other path signals and is sent out onto the protection transmission line on the east side.

In performing the bridging process, the hitless path switch control section 11-2d of the node device 10-A2d outputs the switching bytes (including status BR(0001)) onto the work transmission line on the east side toward the node devices 10-D2d and 10-C2d.

If the node device 10-C2d detects the switching bytes (including status BR(0001)) output by the node device 10-A2d, the node device 10-C2d will receive the path signal coming in along the protection transmission line on the east side with the protection channel (CH1) (i.e., M-multi frame data before path failure occurrence that was output at the node device 10-A2d). After making a phase adjustment, the node device 10-C2d outputs the path signal onto the low-speed transmission line.

More specifically, the node device 10-C2d sends the path signal (path 1) coming in with the protection channel (CH1), which is one of the signals demultiplexed in accordance with channels by the demultiplexing section 14P (east), to the drop interface 20-1a in accordance with route ⑥ a shown in FIG. 20.

In the drop interface 20-1a, the path signal (path 1) coming in with the protection channel (CH1) is sent to the switching section 23A-1 (west) in accordance with route ⑧ a shown in FIG. 24. This switching section 23A-1 (west) temporarily holds the path signal (path 1) in the protection memory 24-11. After delaying the path signal by a predetermined time, the switching section 23A-1 (west) outputs the path signal onto the low-speed transmission line.

Thus, according to the ring network 1-2d of the fourth modification of the third embodiment, in the node device 10-A2d the work memory 38 of the bridge section 33B-1 (east) stores the path signal (path 1) received through the low-speed transmission line. The memory read phase control section 37 will read out the transmitted signal of path 1 (held before failure occurrence) from the work memory 38 and loop back and send out the transmitted signal through the protection transmission line on the east side in the opposite direction from the transmission direction of the protection transmission line on the west side employed before failure-occurrence, if a failure further occurs in the protection transmission line on the west side after failure occurrence in the work transmission line on the west side.

In addition, in the node device 10-C2d, the work memory 24-8 of the switching section 23A-1 (west) stores the path signal (path 1) received through the protection transmission line on the east side. At the time of failure occurrence in the protection transmission line on the east side, the protection memory 24-11 stores a signal that is received through the protection transmission line on the west side by the memory read phase control section 37 of the node device 10-A2d. And the memory read phase control section 24-6 matches the time phase of the received signal stored in the work memory 24-8 after path failure occurrence with the time phase of the received signal stored in the protection memory 24-11 before path failure occurrence, and outputs the received signal held in the protection memory 24-11 to the outside.

Therefore, after failure occurrence in the work transmission line on the west side, even when a failure further occurs in the protection transmission line, the ring network 1-2d can transmit a signal from one node device 10-A2d to the other node device 10-D2d without instantaneous hitting of the signal, by performing the bridging process at the add node (the node device 10-A2d) and performing the switching process at the drop node (node device 10-D2d). As a result, transmission, quality reduction can be prevented.

(c-5) Description of a Fifth Modification of the Third Embodiment

The fifth modification of the third embodiment of the present invention will next be described with FIG. 28. The node devices 10-A2e~10-D2e shown in the diagram has nearly the same function as the node devices 10-A2d~10-D2d according to the fourth modification of the third embodiment.

However, the ring network 1-2e according to the fifth modification of the third embodiment shown in FIG. 28 is the same as the ring network 1-2d according to the fourth modification of the third embodiment in that a phase adjustment is made in sending out the path signal (sent out onto the high-speed transmission line by the span bridging process) onto the low-speed transmission line, but it di differs from the ring network 1-2d according to the fourth modification of the third embodiment in that a phase adjustment is not made in sending out the path signal (sent but onto the high-speed transmission line by the bridging process) onto the low-speed transmission line.

Note that in the description of the fifth modification of the third embodiment, the same reference numeral as that stated in the aforementioned third modification of the third embodiment denotes the same part or practically the same part.

Also, in the channel switching process in the ring network 1-2e, as with the ring network 1-2d according to the fourth modification of the third embodiment, the bridging process will be performed, for example, if a failure occurs in the path signal transmitted on the high-speed transmission line by the span bridging process.

Figure 30:
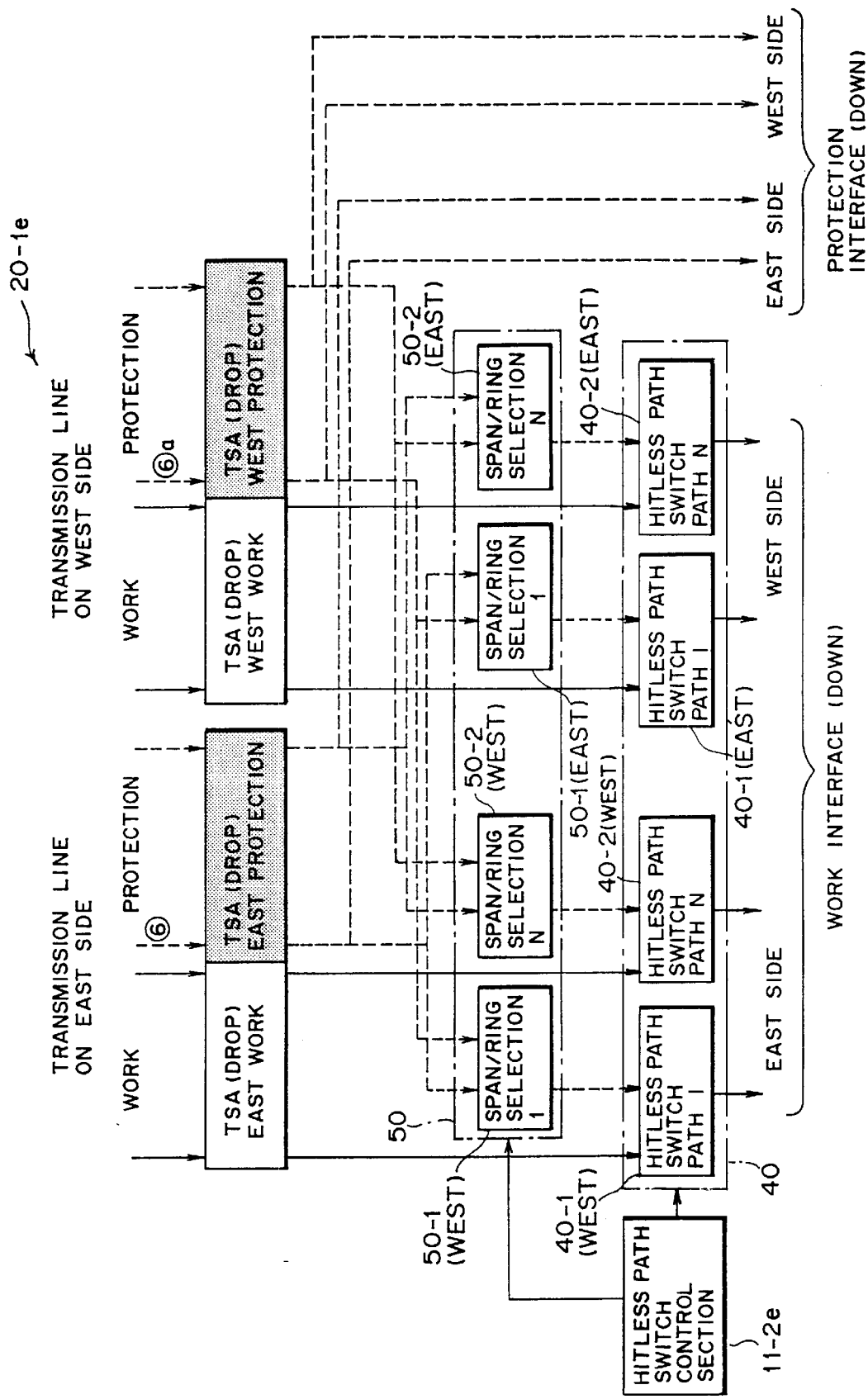
FIG. 30 is a block diagram showing a drop interface according to the fourth modification of the third embodiment of the present invention.

For this reason, the node devices 10-A2e~10-D2e differ from the node devices 10-A2d~10-D2d according to the third modification of the third embodiment in that they are equipped with the drop interface 20-1e shown in FIG. 30 instead of the drop interface 20-1a (see FIG. 24).

Note that if the drop interface 20-1e receives either a path signal at the time of normal operation or a path signal coming in by the span bridging process, it will adjust the phase and output the adjusted signal onto the protection transmission line without instantaneous hitting. However, if the drop interface 20-1e receives a path signal coming in by the bridging process, it will output it onto the low-speed transmission line with instantaneous hitting.

For this reason, the drop interface 20-1e is equipped with TSA sections 21 (west, east), a span switch processing section 40, and a span/ring selecting section 50.

Here, the span/ring selecting section 50 selects either the path signal sent out from the span bridge processing section 18A or the path signal sent out from the hitless path switch bridge processing section 18A, and sends out the selected signal to the span switch processing section 40.

For instance, in the node device 10-A2e; consider a path signal (path 1) coming from the low-speed transmission line through the high-speed-transmission line to the node device 10-A2e.

At the time of normal operation, in the node device 10-A2e, if a failure occurs in a path signal (path 1) sent out onto the work transmission line on the west side, the span bridge processing section 18A of the node device 10-A2e will send out a path signal (path signal before failure occurrence) onto the protection transmission line on the west side. This path signal is selected by the span/ring selecting section 50 of the node device 10-C2e and sent to the span switch processing section 40.

Thereafter, if a path failure occurs in the path signal sent out onto the protection transmission line on the west side by the span bridge processing section 18A of the node device 10-A2e, the hitless path switch bridge. processing section 33B of the node device 10-A2e will send out a path signal (path signal before failure occurrence) onto the protection transmission line on the east side. This path signal is selected by the span/ring-selecting section 50 of the node device 10-C2e and sent to the span switch processing section 40.

Note that the process of signal selection in the span/ring selecting section 50 is performed under control of the hitless-path switch control section 11-2e (see FIG. 20).

For this reason, the span/ring selecting section 50 is equipped with switches 50-1 and 50-2 (east, west), as shown in FIG. 30. In the figure, each of the switches 50-1 and 50-2 (east, west) is expressed as span/ring.

Note that the switches 50-1 and 50-2 (east, west) are provided so as to correspond to path signals, respectively. Each'switch selects a signal-under control of the hitless path switch control section 11-2e.

For example, at the time of normal operation, in the node device 10-A2e, if a failure occurs in a path signal (path 1) sent out onto the work transmission line on the west side, the span bridge section 18A-1 (west) of the node device 10-A2e will send out a path signal (path signal before failure occurrence) onto the protection transmission line on the west side. This path signal is selected by the switch 50-1 (west) of the node device 10-C2e and sent to the span switch section 40-1 (west).

Thereafter, if a path failure occurs in the path signal sent out onto the protection transmission line on the west side by the span bridge section 18A-1 of the node device 10-A2e, the bridge section 33B-1 (east) of the node device 10-A2e will send out a path signal (path signal before failure occurrence) onto the protection transmission line on the east side. This path signal is selected by the switch 50-1 (west) of the node device 10-C2e and sent to the span switch section 40-1 (west). In FIG. 30, the span switch sections 40-1 and 40-2 (east, west) are expressed as hitless path switches.

Even in the ring network 11-2e according to the fifth modification of the third embodiment constructed as described above, when a failure occurs in a path signal (path 1t sent out onto the work transmission line, the path signal (path 1) is likewise sent to the node device 10-C2e by the span bridging process of the node device 10-A2e. The path signal is adjusted in phase by the spans witch section 40-1 (west). Without instantaneous hitting, the path signal (path 1) can be sent onto the low-speed transmission line.

Thus, according to the ring network 1-2e of the third. modification of the third embodiment, when a failure occurs in the path signal (path 1) sent out onto the work transmission line, the transmission line can be switched without reducing the quality of the transmission line by the span bridging process and the switching process.

Note that the aforementioned span/ring selecting section 50 may be provided in the node device 10-A2a of each of the aforementioned ring networks 1-2a~1-2c. Even in such a case, as with the aforementioned case, the transmission line can be switched without reducing the quality of the transmission line by the span bridging process and the switching process, at least when a failure occurs in the work transmission line.

(d) Description of a Fourth Embodiment

The fourth embodiment of the present invention will next be described with FIG. 1. The function of the node devices 10-A3 10-D3 shown in the diagram is nearly the same as that described in the first embodiment, but the ring network 1-3 according to the fourth embodiment differs from the ring network 1 according to the first embodiment in that the switching of the transmission line is not performed at all of the plurality of paths without instantaneous hitting of a signal but is performed in the units of some paths of the plurality of paths without instantaneous hitting of a signal.

Note that in the description of the fourth embodiment, the same reference numeral as that stated in the aforementioned first embodiment denotes the same part or practically the same part.

For this reason, the node devices 10-A3~10-D3 according to the fourth embodiment is equipped with a bridge section 33-1 and a switching section 23-1 in the units of some paths of a plurality of paths, unlike the node devices 10-A~10-D according to the first embodiment.

As an example, the following description will be made on the assumption that the hitless path switch processing section 23 (see FIG. 8) of each of the node devices 10-A3~10-D3 according to the fourth embodiment is equipped with the switching sections 23-1 (west, east) but not with the switching sections 23-2 (west, east) and also on the assumption that the hitless path switching bridge processing section 33 (see FIG. 8) is equipped with the bridge sections 33-1 (west, east) but not with the bridge sections 33-2 (west, east).

That is, in the node device 10-A3, if the path signal (path 1) is sent out from the low-speed transmission line onto the transmission line on the west side with the work channel (CH1), it will be held in the bridge section 33-1 (east).

On the other hand, in the node device 10-D3; if the path signal (path 1) coming in along the transmission line on the east side with the work channel (CH1) is received by the switching section 23-1 (east), it will be held. After the path signal has been adjusted in phase, it is output onto the low-speed transmission line.

Next, if a path failure occurs in this path signal (path 1), in the node device 10-A3 the path signal (path signal before path failure occurrence) will be read out from the bridge section 33-1 (east) and sent out onto the transmission line on the east side with the protection channel (CH3), as in the ring network 1 according to the first embodiment.

Also, in the node device 10-D3, if the path signal (path 1) coming in along the transmission line on the west side with the protection channel (CH3) is received by the switching section 23-1 (east), it will be held. After the path signal has been adjusted in phase, it is output onto the low-speed transmission line.

Incidentally, as shown in FIG. 1, when a failure occurs in a path signal (path 2) being transmitted from the node device 10-A3 to the node device 10-D3, the transmission line cannot be switched without instantaneous hitting.

Thus, according to the ring network 1-3, the transmission line is switched in the units of some paths of a plurality of paths without instantaneous hitting. Therefore, line quality reduction for only a path with an undesirable chopped status can be suppressed and also the device can be simply constructed.

Note that, in addition to the aforementioned first embodiment, the span bridge section 18-1, the span switching section 40-1, the ring bridge section 17-1, the ring switching section 23-1 and the like described in the second through the fourth embodiments may also be provided in the units of some paths of a specific plurality of paths. Even in another network provided with the span bridge section 18-1, etc. in the units of some paths of a plurality of paths as in the ring network 1-3, the transmission line can be switched in the units of some paths of a plurality of paths without instantaneous hitting. Therefore, line quality reduction for only a path with an undesirable chopped status can be suppressed and also the device can be simply constructed.

(e) Description of a Fifth Embodiment

The fifth embodiment of the present invention will next be described with FIG. 1. The function of the node devices 10-A4~10-D4 shown in the diagram is nearly the same as that described in the first embodiment, but the ring network 1-5 according to the fifth embodiment differs from the ring network 1 according to the first embodiment in that the protection channel whose utilization factor is lower is employed.

Note that in the description of the fifth embodiment, the same reference numeral as that stated in the aforementioned first embodiment denotes the same part or practically the same part.

Here, in the ring network 1-4, the protection channel for transmitting a path-signal (path signal before failure occurrence) by the bridging process is previously set in performing the bridging process.

As an example, a description will hereinafter be made of a path single (path 1) that is transmitted along the transmission line on the west side from the low-speed transmission line to the node device 10-D4 with the work channel (CH1).

If a path failure occurs in the path signal (path 1) when there is no failure in other path signals within the ring network 1-4, the node device 10-A4 will transmit a path signal (path signal before path failure occurrence) with the protection channel (CH3 or CH4) in consideration of the previously set order of priority by the bridging process.

On the other hand, in the node device 10-C4, the protection channel of the path signal coming in by the bridging process at the node device 10-A4 is selected and the path signal (path signal before path failure occurrence) is temporarily held. After the path signal has been adjusted in phase, it is output onto the low-speed transmission line.

Note that the order of priority means that the protection channels are arranged in the order of the utilization factor of the protection channel. More specifically, the node devices 10-A4~10-D4 each have a priority order table and select the protection channel in consideration of this priority order table.

Also, for the order of priority, the protection channel with a lower utilization factor has a higher order. For example, in the protection channels (CH3 and CH4) of the ring network 1-4 shown in FIG. 1, the protection channel (CH4) is lower in priority order than the protection channel (CH3) for the PCA 1, PCA 3, and PCA 2 (whose number of accesses is 1), so the protection channel (CH4) is first employed for transmission of a path signal when the bridging process is performed.

An example of the priority order table for the ring network 1-4 is listed in Table 1.

TABLE 1

Priority order table

| The number of PCAs | Priority order |
|---|---|---|
| CH3 | 2 | 1 |
| CH4 | 1 | 2 |

Figure 31:
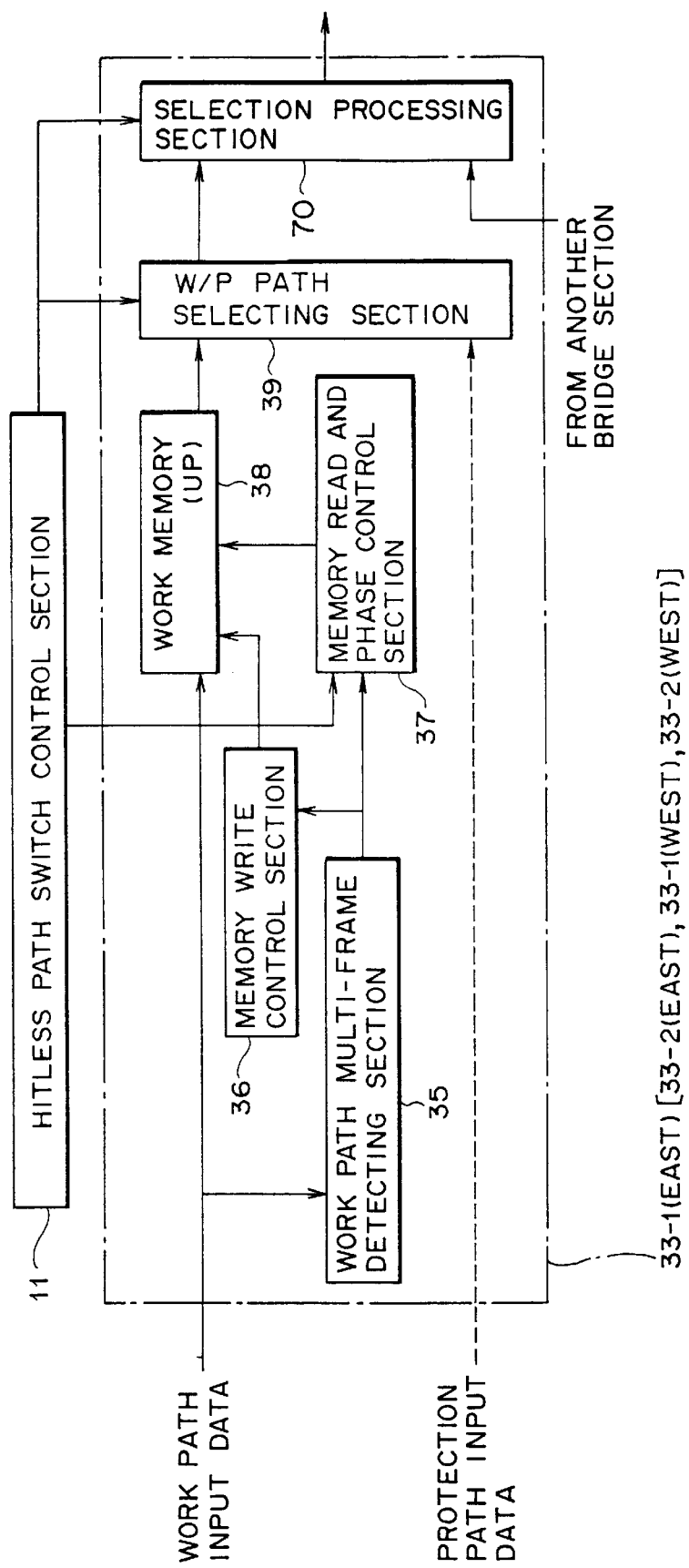
FIG. 31 is a diagram showing a bridge section according to a fifth embodiment of the present invention.
Figure 32:
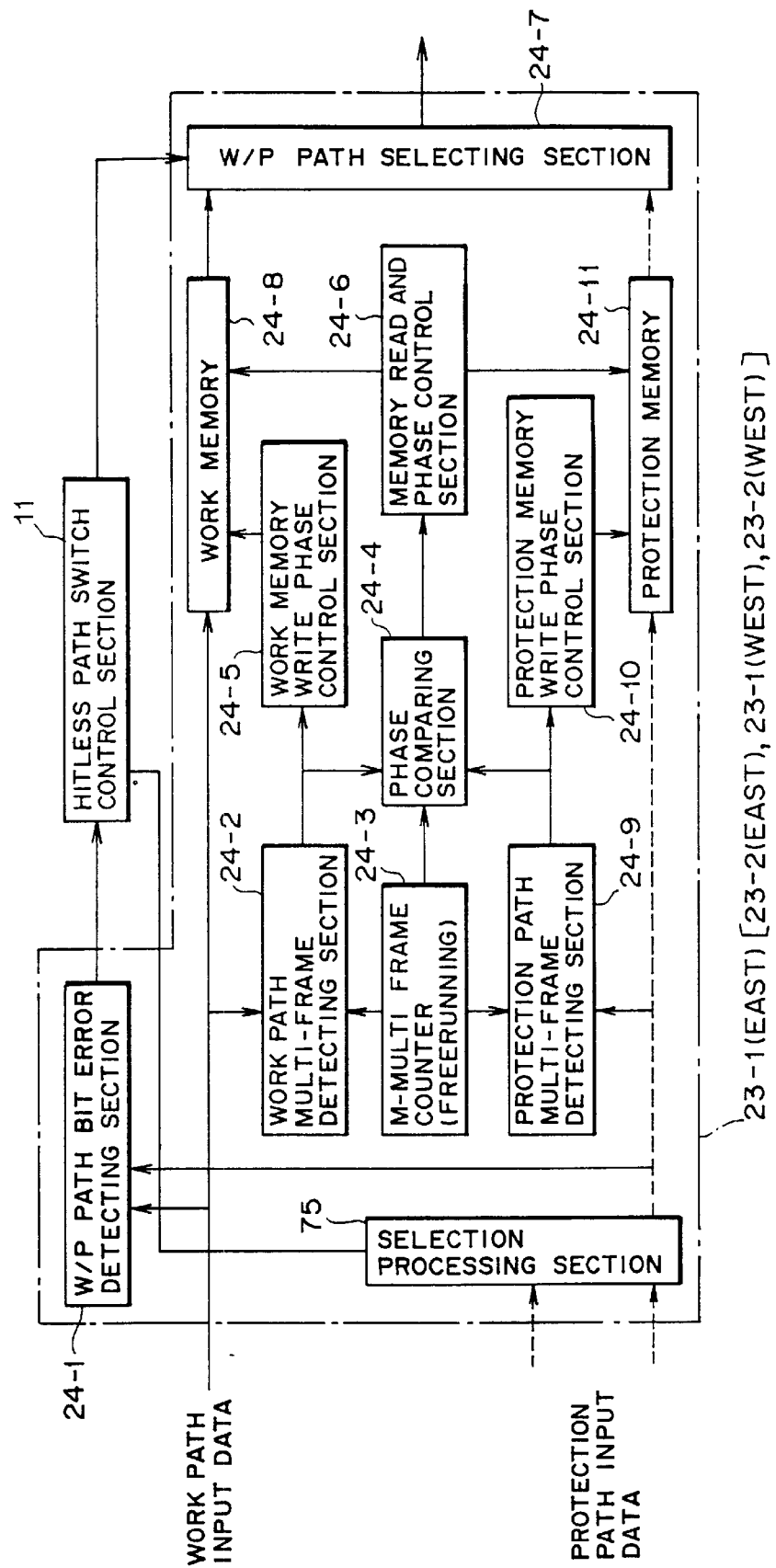
FIG. 32 is a diagram showing a switching section according to the fifth embodiment of the present invention.

For this reason, the node devices 10-A4~10-D4 differ from the node devices 10-A~10-D according to the first embodiment in that the bridge sections 33-1 and 33-2 (east, west) are equipped with a selection processing section 70, as shown in FIG. 31, and the switching sections 23-1 and 23-2 (east, west) are equipped with a selection processing section 75, as shown in FIG. 32.

Here, in transmitting a path signal in the path unit, the selection processing section (first path selecting section) 70 selects a protection channel whose priority order is lower within the previously set priority order. The selection processing section 70 selects the protection channel under control of the hitless path switch control section 11. For example, consider mainly the bridge section 33-1 (east). Both a path signal output from the work/protection path selecting section 39 of the bridge section 33-1 (east) and a signal output from the path selecting section 70 of the bridge section 32-1 (east) are sent to the selection processing section 70 (omitted in FIG. 9) of the bridge section 33-1 (east). This selection processing section 70 selects either signal.

Also, as with the description of the first embodiment, the signal read out from the bridge section 33-1 (east) is sent onto the transmission line on the east side with the protection channel (CH3), while the signal read out from the bridge section 33-2 (east) is sent onto the transmission line on the east side with the protection channel (CH4).

Here, if a path failure occurs in the path signal (path 1) when there is no failure in other path signals within the ring network 1-4, the node device 10-A4 will transmit a path signal (path signal before path failure occurrence) with the protection channel (CH4) in consideration of the previously set order of priority by the bridging process.

That is, at the time of path failure occurrence, if the path signal (path 1) is read out from the work memory 38 of the bridge section 33-1 (east), it will be sent to the selection processing section 70 of the bridge section 3372 (east) through the work/protection path selecting section 39 and the selection processing section, 70. Thereafter, the path signal (path 1) is selected by the selection processing section 70 of the bridge section 33-2 (east) and is output onto the transmission line on the east side with the protection channel (CH3).

On the other hand, in sending out a transmitted signal in the path unit, the selection processing section (second path selecting section) 75 shown in FIG. 32 selects a protection channel whose priority order is lower within the previously set priority order.

This selection processing section 75 selects the protection channel under control of the hitless path switch control section 11. For example, consider mainly the switching section 23-1 (east). Both the signals on the protection channels (CH3 and CH4) output from the TSA section 21 (east) are sent to the selection processing section 75 (omitted in FIG. 8) of the switching section 23-1 (west). This selection processing section 75 selects either signal.

Also, as with the description of the first embodiment, at the time of normal operation the switching section 23-1 (west) receives the path signal (path 1) coming in along the transmission line on the east side with the protection channel (CH3). After adjusting the phase, the switching section 23-1 (west) outputs the path signal (path 1) onto the low-speed transmission line.

Here, if a path failure occurs in the path signal (path 1) when there is no failure in other path signals within the ring network 1-4, the node device 10-C4 will receive a path signal (path signal before path failure occurrence) with the protection channel (CH4) in consideration of the previously set order of priority (see Table 1) by the bridging process. After adjusting the phase, the node device 10-C4 outputs the path signal onto the low-speed transmission line.

That is, at the time of path failure occurrence, the selection processing section 75 of the switching section 23-1 (west) selects the path signal (protection channel (CH4)) coming in from the TSA section 21 (east) and holds. the path signal (path 1) in the protection memory 24-1. After adjusting the phase of the path signal, the selection processing section 75 outputs the path signal onto the low-speed transmission line through the work/protection path selecting section 24-7.

The process of protection channel (CH3, CH4) selection by the bridging process within the ring network 1-4 according to the fifth embodiment constructed as described above will be described based on flowcharts shown in FIGS. 33(*a*) and 33(*b*). In the following-description, consider mainly a path signal (path 1).

Note that the operation of the switching process in the node devices 10-A4~10-D4, as with the switching operation of the first embodiment, is performed according to the flowchart shown in FIG. 14, so a detailed description thereof is omitted.

Figure 33A:
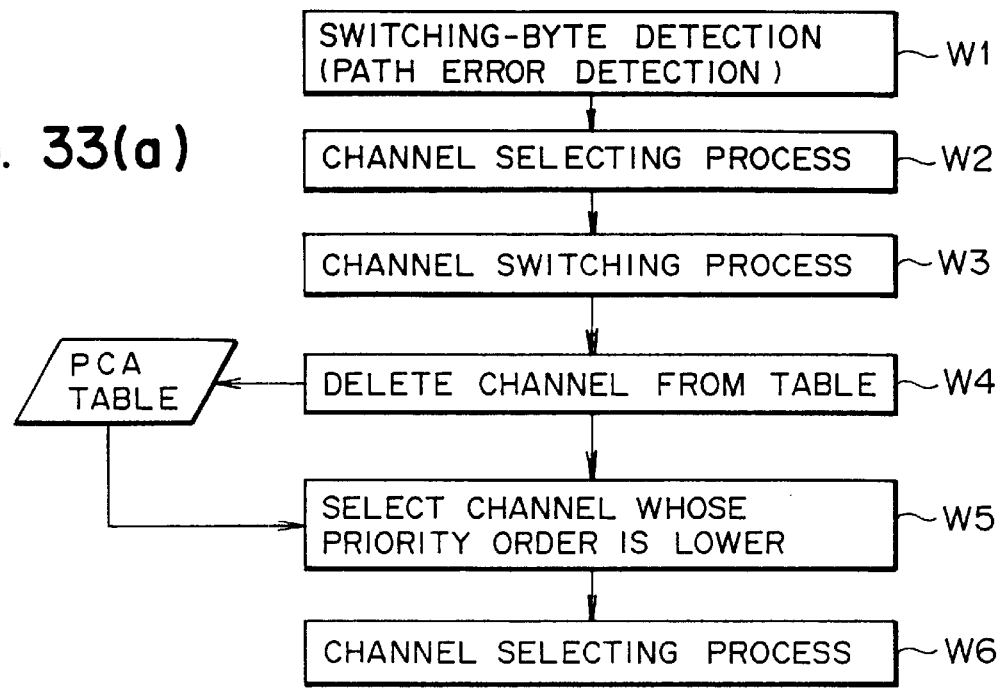
FIG. 33(a) is a flowchart for explaining the process of selecting a protection channel by the bridging process and the switching process within the ring network according to the fifth embodiment of the present invention.
Figure 33B:
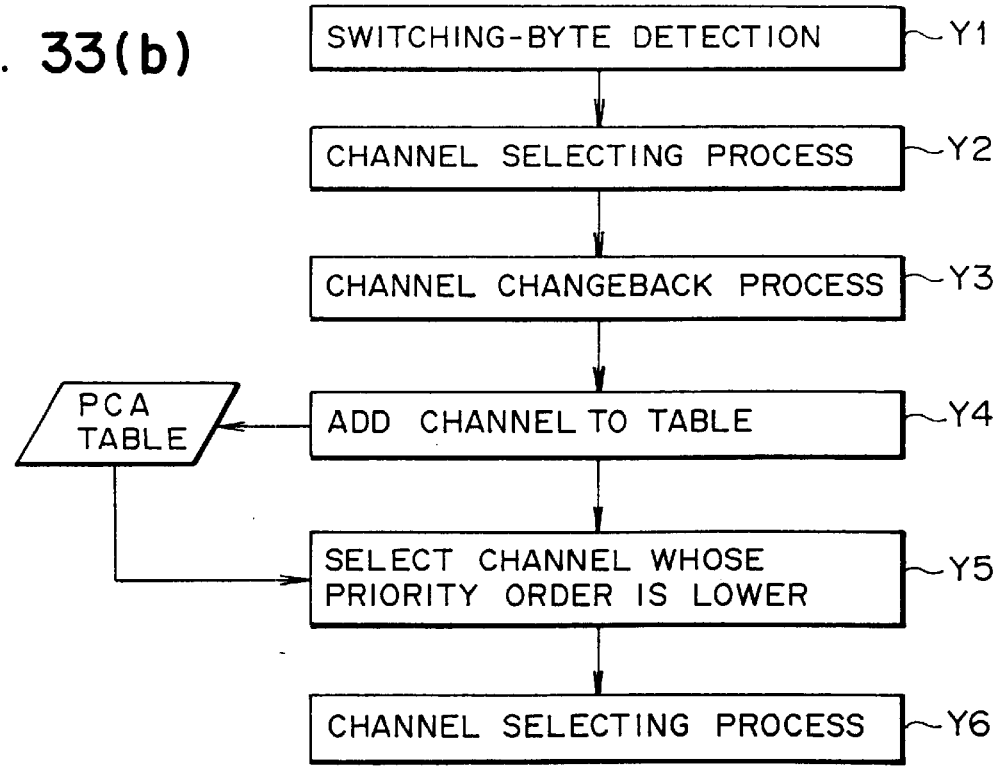
FIG. 33(b) is a flowchart for explaining the changeback process of the protection channel by the bridging process and the switching process within the ring network according to the fifth embodiment of the present invention.
Figure 35:
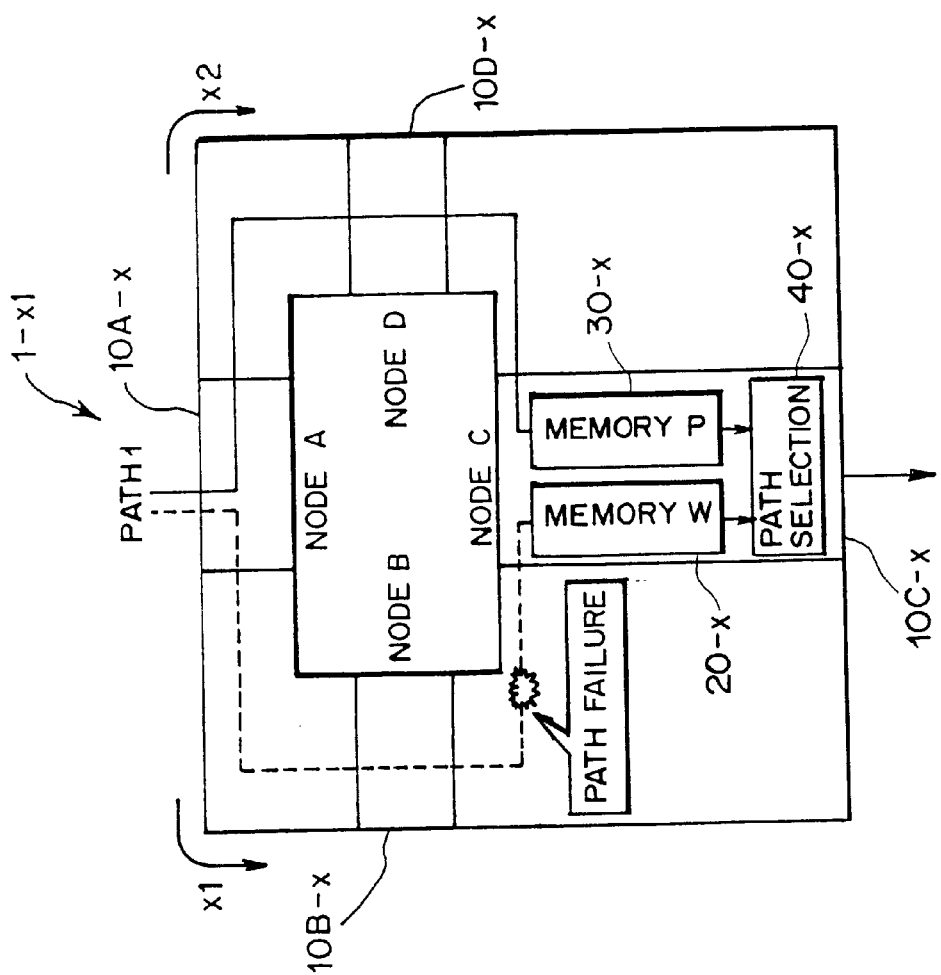
FIG. 35 is a schematic diagram showing a ring network of the USPR type.
Figure 36:
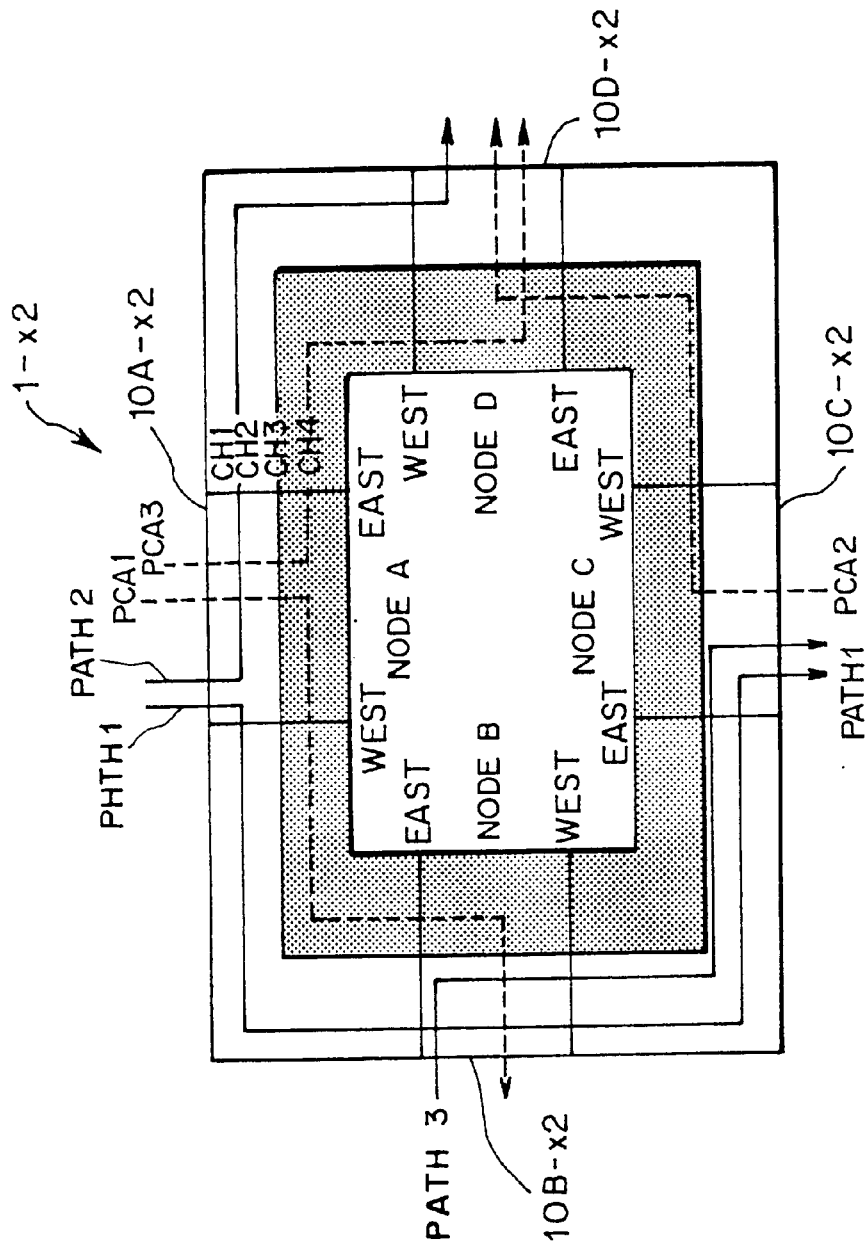
FIG. 36 is a schematic diagram showing a ring network of the BLSR type.
Figure 37:
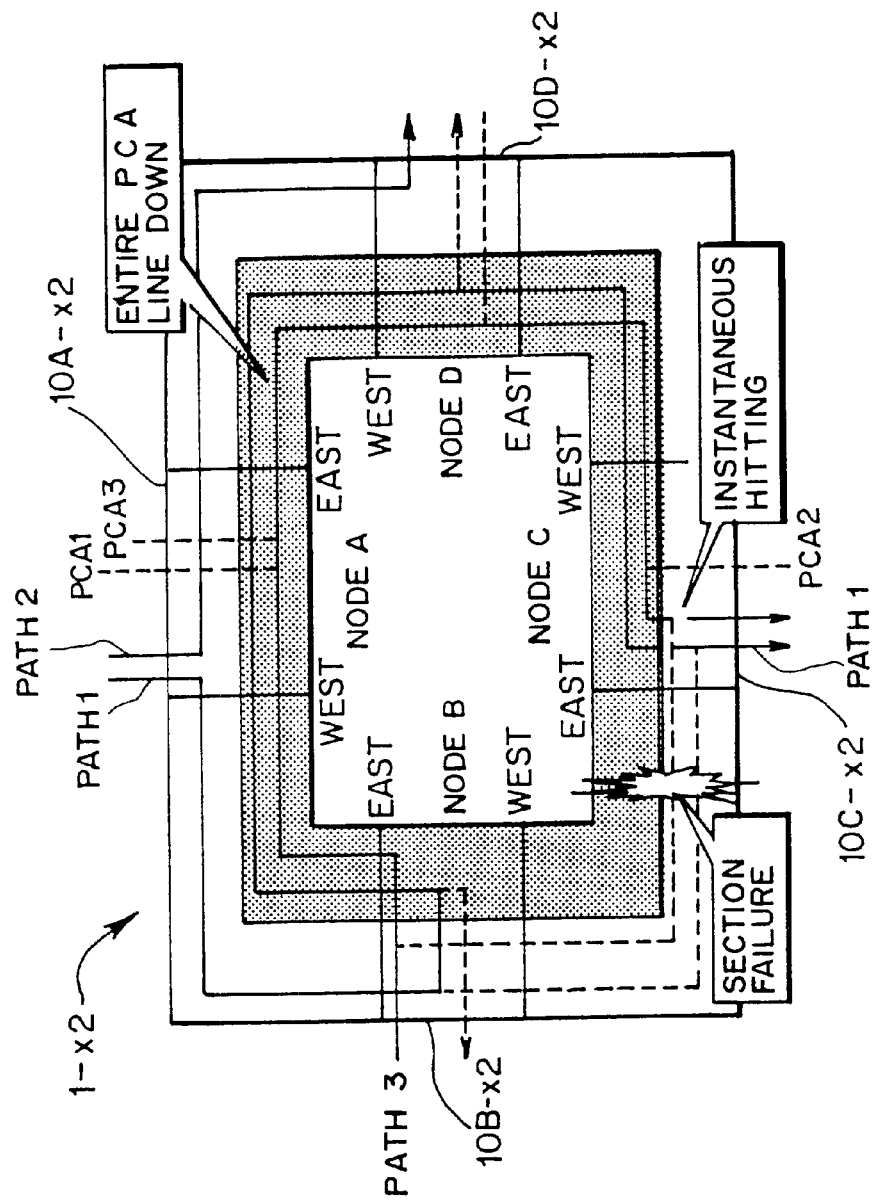
FIG. 37 is a schematic diagram for explaining the operation of switching a transmission line in the ring network of the BLSR type when a section failure occurs.

As shown in FIG. 33(*a*), in the ring network 1-4, if the hitless path switch control section 11 of the node device 10-C4 detects a path error in the path signal (path 1) coming in along the transmission line on the east side with the work channel (CH1) (step W1), it will determine whether a path signal coming in from the node device 10-A4 is selected with the protection channel (CH3) or the protection channel (CH4) (step W2).

Note that when there is no failure in other path signals within the ring network 1-4, the hitless path switch control section 11 of the node device 10-C4 selects the protection channel (CH4) previously set.

And the hitless path switch control section 11 of the node device 10-C4 controls the selection processing section 75 of the switching section 23-1 (west). With this, the selection processing section 75 selects the protection channel CH4 (step W3).

If the selection processing section 75 is controlled so as to select the protection channel CH4, the hitless path switch control section 11 of each of the node devices 10-A4~10-C4 will delete the protection channel CH4 selected from the PCA table (priority order table shown in Table 1) (step W4)

Furthermore, the hitless path switch control section 11 of each of the node devices 10-A4 10-C4 selects from the PCA table the protection channel whose priority order is the next lowest, for a possible path failure that will occur later (step W5).

And the hitless path switch control section 11 of the node device 10-A4 controls the selection processing section 70 of the bridge section 33-2 (east) that transmits a signal with the protection channel CH4. (step W6). With this, the selection processing section 70 selects the path signal (path 1) coming in from the bridge section 33-1 (east) and outputs it onto the transmission line on the east side with the protection channel (CH4).

This path signal (path 1) is sent with the protection channel (CH4) from the node device 10-A4 to the node device 10-C4 through the node device 10-D4 and is received by the switching section 23-1 (west) of the node device 10-C4. After the path signal has been adjusted in phase, it is output onto the low-speed transmission line.

Incidentally, as shown in FIG. 33(*b*), in the node device 10-C4, if the switching bytes for returning the path signal (path 1) to a normal operating state are detected after path failure occurrence (step Y1), the hitless path switch control section Y1 of the node device 10-A4 will determine which channel the path signal coming in from the node device 10-A4 is received with (step Y2)

Note that since the path signal (path 1) is transmitted within the ring network 1-4 at the time of normal operation with the work channel (CH1), the switching section 23-1 (west) controls the path signal (path 1) coming in with the work channel (CH1) so that it is held it the work memory (switching process; step Y3).

If the path signal (path 1) is received with the work channel (CH1), the hitless path switch control section 11 of each of the node devices 10-A4~10-D4 will add the protection channel (CH4) to the PCA table (priority order table shown in Table 1) (step Y4).

Furthermore, the hitless path switch control section 11 of each of the node devices 10-A4~10-C4 selects from the PCA table the protection channel whose priority order is the next lower, for a possible path failure that will occur later (step Y5).

In this case, since the added protection channel (CH4) is selected, the hitless path switch control section 11 of each of the node devices 10-A4~10-C4 controls the selection processing section 75 so that the selection processing section 75 selects the protection channel (CH4) (step Y6).

Note that the hitless path switch control section 11 of the node device 10-A4 controls the selection processing section 70 of the bridge section 33-2 (east) that transmits a signal with the protection channel (CH4) (step W6) With this, the selection processing section 70 selects and outputs the path signal (path 1) coming in from the work/protection path selecting section 39 of the bridge section 33-2 (east). In this case, the work/protection path selecting'section 39 of the bridge section 33-2 (east) outputs a PCA signal by the switching request.

For this reason, according to the ring network 1-4, when a path failure occurs in the path signal (path 1) sent out onto the work transmission line at the node device 10-A4, in the node device 10-A4 the protection channel (CH4) whose priority order is lower is selected by the switching request sent from the node device 10-C4. The path signal held before failure occurrence in the bridge section 33-1 (east) is transmitted with the selected protection channel (CH4) via the selection processing section 70 of the bridge section 33-2 (east) in the opposite direction from the direction that transmitted the path signal where the failure occurred.

In the node device 10-C4, as with the aforementioned case, the protection channel (CH4) whose priority order is lower is selected and the switching process is performed. After the path signal has been adjusted in phase, it is output onto the low-speed transmission line.

Thus, according to the ring network 1-4, the protection channel is selected in the order of lower priority, whereby the path signal where a path failure occurred is transmitted without instantaneous hitting. Therefore, more signals can be transmitted onto the protection channel whose utilization factor is higher. In other words, the number of extinction signals can be reduced, whereby high transmission efficiency can be maintained.

Note that, in addition to the aforementioned first embodiment, in the span bridge section 18-1, the span switching section 40-1, the ring bridge section 17-1 and the like described in the second through the fourth embodiments the protection channel may also be selected in the order of lower priority in order to transmit a signal. Even in this case, more signals can be transmitted onto the protection channel whose utilization factor is higher, whereby high transmission efficiency can be maintained.

(f) Description of a Sixth Embodiment

FIG. 34 is a block diagram showing a line network (hitless path switching transmission system) 1-5 according to the sixth embodiment of the present invention. As shown in the diagram, the line network 1-5 is constituted by node devices 10-A5 and 10-B5 opposite to each other. At the time of normal operation, a signal is transmitted or received between the node devices 10-A5 and 10-B5, with a work transmission line. At the time of path failure occurrence, a transmission line where a path failure occurred is switched without instantaneous hitting.

The node devices 10-A5 and 10-B5 are connected through work and protection transmission lines. Two work transmission lines are provided so that a signal can be transmitted in the opposite directions. Similarly, two protection transmission lines are provided so that a signal can be transmitted in the opposite directions.

Note that the following description will be made on the assumption that a path failure occurs in a path signal (path 1) being transmitted from the node device 10-A5 through the work transmission line to the node device 10-B5.

Here, the node devices 10-A5 and 10-B5 have nearly the same function of the node device 10-A and the like according to the aforementioned first embodiment, but differ in that a signal is transmitted or received between the opposite node devices.

The node devices 10-A5 and 10-B5 are equipped with multiplexing sections 16-1W and 16-1P, demultiplexing sections 14-1W and 14-1P, a hitless path switch control section 11-5, as witching-byte detection/insertion section 12-1, a bridge processing section 90, a switch processing section 95, and a J1 inserting section 34.

The W used in the aforementioned reference numeral indicates that it is associated with a signal going out onto or coming in from the work transmission line, while the P means that it is associated with a signal going out onto or coming in from the protection transmission line.

Here, the multiplexing section 15-1W multiplexes a path signal output from each J1 inserting section 34 to a SDH frame and sends out the SDH frame onto the work transmission line. The multiplexing section 15-1P multiplexes a signal such as a PCA signal to the SDH frame and sends out the SDH frame onto the protection transmission line, at the time of normal operation and multiplexes a path signal output from the bridge processing section 90 to the SDH frame and sends out the SDH frame onto the protection transmission line.

The bridge processing section 90, as with the hitless path switching bridge processing section 33 according to the first embodiment, holds a path signal sent out onto the work transmission line, for each path. At the time of path failure occurrence, the bridge processing section 90 sends out the path signal held before path failure occurrence onto the protection transmission line in the same direction as the direction of the work transmission line where the path failure occurred.

For this reason, the bridge processing section 90 is equipped with bridge sections 90-1~90-N, which correspond to paths, respectively. The bridge sections 90-1~90-N, as with the aforementioned bridge sections 33-1~33-N/2) shown in FIG. 10, are equipped with a work multi-frame, detecting section 35, a memory write control section 36, memory read phase control section 37, a work memory 38, and a work/protection path selecting section 39.

Note that the work memory (thirteenth memory section) 38 stores a signal being transmitted onto the work transmission line at the time of normal operation. The memory read phase control section (fifth read control section) 37 reads out the signal held before failure occurrence, from the work memory 38 and sends out the read signal through the protection transmission line, at the time of failure occurrence in the work transmission line.

For instance, if each, of the bridge sections 90-1~25 90-N, as with the aforementioned bridge section 33-1 and the like, receives a bridge request from the opposite node device at the time of path (path 1) failure occurrence, the hitless path switch control section 11-5 will output information about the bridge request to the memory read phase control section 37 of the bridge section 90-1. With this, the path signal held in the work memory 38 is read out.

On the other hand, the switch processing section 95 shown in FIG. 34, as with the hitless path switch processing section 23, (see FIG. 9) according to the first embodiment, receives a path signal coming in from the demultiplexing section 14-1W. After adjusting the phase of the path signal, the switch processing section 95 outputs it onto the low-speed transmission line. At the time of path failure occurrence, the switch processing section 95 receives a path signal coming in from the demultiplexing section 14-1P and matches the phase of the received path signal with the phase of a path signal coming in from the demultiplexing section 14-1W, and outputs the path signal received from the demultiplexing section 14-1P onto the low-speed transmission line.

For this reason, the switch processing section 95 is equipped with switching sections 95-1~95-N, which correspond to paths, respectively. The switching sections 95-1~95-N, as with the aforementioned switching section 23-1 (west) and the like shown in FIG. 12, are equipped with a work/protection path bit error detecting section 24-1, a work path multi-frame detecting section 24-2, an M-multi frame counter 24-3, a phase comparing section 24-4, a work memory write phase control section 24-5, a memory read phase control section 24-6, a work/protection path selecting. section 24-7, a work memory 24-8, a protection path multi-frame detecting section 24-9, a protection memory write phase control section 24-10, and a protection memory 24-11.

Here, the work memory (fourteenth memory section) 24-8 stores a signal received through the work transmission line at the time of normal operation, while the protection memory (fifteenth memory section) 24-11 stores a signal received through the protection transmission line by the memory read phase control section 37, of the opposite node device at the time of failure occurrence.

Also, the memory read phase control section (fifth phase adjusting section) 24-6 matches the time phase of the signal stored in the work memory 24-8 after path failure occurrence with the time phase of the signal stored in the protection memory 24-11 before path failure occurrence, at the time of path failure occurrence and outputs the signal held in the protection memory 24-11 to the outside.

For example, if the switching section 95-1 of the node device 10-B5, as with the aforementioned switching section 23-1 and the like, receives the switching byte of the bridge request (status BR) from the node device 10-A5, the hitless path switch control section 11-5 of the node device 10-B5 will control the work/protection path selecting section. 24-7 of the switching section 95-1 so that the path signal (path 1), output from the bridge section 90-1 of the node device 10-A5 and held in the protection memory 24-11, is selected and output.

Also, the switching-byte detection/inserting section 12-1 detects the switching byte within the SOH and informs the hitless path switch control section 11-5 of the detected switching byte. Under control of the hitless path switch control section 11-5, the switching-byte detection/insertion section 12-1 also inserts the switching byte in the SOH.

Thus, according to the line network 1-5, when a path failure occurs in the path signal (path 1) transmitted from the node device 10-A, the work/protection path bit error detecting section 24-1 of the switching section 95-1 of the node device 10-B5 detects a bit error.

Based on the detected information, the hitless path switch control section 11-5 detects a failure in the path 1.

The hitless path switch control section 11-5 controls the switching-byte detection/insertion section 12-1 so that the switching byte (request BR) for the path 1 is inserted in the SOH.

Thereafter, the SDH frame added with the switching byte (request BR) for the path 1 is sent from the multiplexing section 15-1W of the node device 10-B5 through the work transmission line to the demultiplexing section 14-1W of the node device 10-A5.

The switching-byte detection/insertion section 12-1 of the node device 10-A5 detects the switching byte (request BR) sent out from the node device 10-B5 and informs the hitless path switch control section 11-5 of the detected information.

In the hitless path switch control section 11-5, the bridge section 90 is controlled so that the path signal (path 1) held before path failure occurrence is transmitted to the multiplexing 15-1P, by the switching byte of the path 1 sent out from the node device 10-B5.

Here, the hitless path switch control section 11-5 controls the memory read phase control section 37 and the work/protection path selecting section 39, whereby the path signal (path 1) held before path failure occurrence in the work memory 38 is sent to the multiplexing section 15-1P.

In the multiplexing section 15-1P, if the path signal (path 1) is received from-the bridge section 90-1, it will be multiplexed to the SDH frame along with other signals and sent out onto the protection transmission line.

Also, in the node device 10-A5, the hitless path switch control section 11-5 controls the switching byte. detection/ insertion section 12-1 so that the switching byte added with status BR (bridge status) is inserted in the SOH of the SDH frame, in performing the bridge control.

Thereafter, the SDH frame added with the switching byte (request BR) for the path 1 is sent from the multiplexing section 15-1W of the node device 10-B5 through the work transmission line to the demultiplexing section 14-1W of the node device 10-B5.

The switching-byte detection/insertion section 12-1 of the node device 10-B5 detects the switching byte (request BR) sent out from the node device 10-A5 and informs the hitless path switch control section 11-5 of the detected information.

In the hitless path switch control section 11-5, the work/protection path selecting section 24-7 of the switching section 95-1 is controlled by the switching byte of the path 1 sent out from the node device 10-A5. With this, the path signal read out from the protection memory 24-11 is selected and sent out onto the low-speed transmission line.

Here, the protection memory 24-11 of the switching section 95-1 sends the held path signal (path 1) sent out from the bridge section 90-1 of the node device 10-A5 to the work/protection path selecting section 24-7, by control of the memory read phase control section 24-6. In the work/protection path selecting section 24-7, the path signal (path 1) read out from the protection memory 24-11 is sent out to a selected low-speed transmission line side.

Thus, according to the line network 1-5, in the node device 10-A5 the work memory 38 of the bridge section 90-1 stores a signal being transmitted onto the work transmission line at the time of normal operation. The memory read phase control section 37 reads out the signal held before failure occurrence, from the work memory 38 and sends out the read signal through the protection transmission line, at the time of failure occurrence in the work transmission line.

In addition, in the node device 10-B5 the work memory 24-8 of the switching section 95-1 stores a signal received through the work transmission line at the time of normal operation, while the protection memory 24-11 stores a signal received through the protection transmission line by the memory-read phase control section 37 of the node device 10-A5 at the time of failure occurrence. Furthermore, the memory read phase control section 24-6 matches the time phase of the signal stored in the work memory 24-8 after path failure occurrence with the time phase of the signal stored in the protection memory 24-11 before path failure occurrence, at the time of path failure occurrence and outputs the signal held in the protection memory 24-11 to the outside.

Therefore, in one node device 10-A5 the path signal (path 1) held before failure occurrence is sent out onto the protection transmission line, while in the other node device 10-B5 the path signal (before path failure occurrence) coming in with the protection transmission line is received. After the path signal has been delayed by a predetermined time, it is output to the low-speed transmission line side. As a result, the line network 1-5 can transmit a signal from one node device 10-5A to the other node device 10-B5 without instantaneous hitting and prevent transmission quality reduction.

(g) Others

In the ring network 1 according to the aforementioned first embodiment, etc., while it has been described that hitless path switching is performed for each path, the present invention is not limited to this. For example, when a section failure is detected, in the add node the bridging process is performed for all the work channels, while in, the drop node the switching process is performed for the signals coming in by the bridging process. With this, even when a section failure occurs, a signal can be transmitted from one node device 10-5A to the other node device 10-B5 without instantaneous hitting and transmission quality reduction can be prevented.

The span bridging process, the ring bridging process and the like can also be performed for all the work channels when a section failure occurs.

In addition, in the aforementioned embodiments, while the node devices in each network are constructed in the same way, the ring network may be constructed by a combination with the node devices of another network.

Furthermore, in the aforementioned embodiments, although the aforementioned description has been made on the assumption that a path failure occurs, the present invention is not limited to this. Under the supervision of a maintenance man for the ring network 1, etc., the switching byte can likewise be sent out to the add node or i the drop node, when the number of node devices is increased or line utilities are replaced. Even in such a case, transmission line switching can be performed without instantaneous hitting and transmission quality reduction can be prevented.

Finally, in addition to the aforementioned embodiments, the invention may be modified within the scope of the appended claims.

What is claimed is:

1. A hitless path switching ring network comprising at least two node devices connected in ring form through a work transmission line and a protection transmission line, wherein at the time of normal operation a signal is transmitted with said work transmission line; at the time of failure occurrence in said work transmission line the signal can be transmitted with said protection transmission line in the opposite direction from the direction in which the signal was transmitted before failure occurrence in said work transmission line;

in order to cause the signal to be received from one of said node devices to the other of said node devices without instantaneous hitting of the signal at the time of failure occurrence in said work transmission line, said one node device includes a first memory section for storing the signal being transmitted onto said work transmission line at the time of normal operation, and a first read control section for reading out the transmitted signal held from said first memory section before failure occurrence in said work transmission line and sending out said transmitted signal through said protection transmission line in said opposite direction at the time of failure occurrence in said work transmission line; and said other node device includes a second memory section for storing the signal received through said work transmission line at said time of normal operation, a third memory section for storing the signal received through said protection transmission line according to said first read control section of said one node device at the time of failure occurrence in said work transmission line, and a first phase adjusting section for matching a time phase of the received signal stored in said, second memory section after failure occurrence in said work transmission line with a time phase of the received signal stored in said third memory section before failure occurrence in said work transmission line and outputting said received signal to the outside.

2. The hitless path switching ring network according to claim 1, wherein said one node device is constructed as an add node device that inserts an external signal into said ring network; and said first read control section of said add node device is constructed so as to send out said received signal in a direction differing from the transmission direction employed before failure occurrence in said work transmission line, at the time of failure occurrence in said work transmission line.

3. The hitless path switching ring network according to claim 1, wherein said one node device is constructed as a relay node device that relays a signal; and said first read control section of said relay node device is constructed so as to loop back and send out said received signal at the time of failure occurrence in said work transmission line.

4. The hitless path switching ring network according to claim 1, wherein said one node device is equipped with said first memory section and said first read control section for each of a plurality of paths handled by said ring network and, performs sending of said received signal in the unit of said path at the time of failure occurrence in said work transmission line; and said other node device is equipped with said second memory section, said third memory section, and said first phase adjusting section for each of said plurality of paths and makes a time phase adjustment to said received signal in the unit of said path.

5. The hitless path switching ring network according to claim 1, wherein said one node device is equipped with said first memory section and said first read control section in the units of some paths of a plurality of paths handled by said ring network and performs sending of said received signal in the units of said some paths at the time of failure occurrence in said work transmission line; and said other node device is equipped with said second memory section, said third memory section, and said first phase adjusting section in the units of said some paths and makes a time phase adjustment to said received signal in the units of said some paths.

6. A hitless path switching ring network comprising at least two node devices connected in ring form through a work transmission line and a protection transmission line, wherein at the time of normal operation a signal is transmitted with said work transmission line; at the time of failure occurrence in said work transmission line the signal can be transmitted with said protection transmission line in the same direction as the direction in which the signal was transmitted before failure occurrence in said work transmission line;

in order to cause the signal to be received from one of said node devices to the other of said node devices without instantaneous hitting of the signal at said time of failure occurrence in said work transmission line, said one node device includes a fourth memory section for storing the signal being transmitted onto said work transmission line at said time of normal operation, and a second read control section for reading out the transmitted signal held from said fourth memory section before failure occurrence in said work transmission line and sending out said transmitted signal through said protection transmission line in said same direction, at the time of failure occurrence in said work transmission line; and said other node device includes a fifth memory section for storing the signal received through said work transmission line at said time of normal operation, a sixth memory section for storing the signal received through said protection transmission line according to said second read control section of said one node device at the time of failure occurrence in said work transmission line, and a second phase adjusting section for matching a time phase of the received signal stored in said fifth memory section after failure occurrence in said work transmission line with a time phase of the received signal stored in said sixth memory section before failure occurrence in said work transmission line and outputting said received signal to the outside.

7. The hitless path switching ring network according to in claim 6, wherein said one node device is equipped with said fourth memory section and said second read control section for each of a plurality of paths handled by said ring network and performs sending of said received signal in the unit of said path at the time of failure occurrence in said work transmission line; and said other node device is equipped with said fifth memory section, said sixth memory section, and said second phase adjusting section for each said path and makes a time phase adjustment to said received signal in the unit of said path.

8. The hitless path switching ring network according to claim 6, wherein said one node device is equipped with said fourth memory section and said second read control section in the units of some paths of a plurality of paths handled by said ring network and performs sending of said received signal in the units of said some paths at the time of failure occurrence in said work transmission line; and said other node device is equipped with said fifth memory section, said sixth memory section, and said second phase adjusting section in the units of said some paths and makes a time phase adjustment to said received signal in the units of said some paths.

9. The hitless path switching ring network according to claim 6, wherein an add node device for inserting a signal into said ring network is provided on an upstream side from said one node device; and if a failure further occurs in said protection transmission line after failure occurrence in said work transmission line, said add node device will send out the signal through said protection transmission line in a direction differing from the direction of said protection transmission line on which the signal was inserted before failure occurrence in said protection transmission line.

10. The hitless path switching ring network according to claim 9, wherein said add node device includes a seventh memory section for storing the signal being transmitted onto said work transmission line at said time of normal operation, and a third read control section for reading out the transmitted signal held from said seventh memory section before failure occurrence in said protection transmission line and sending out said transmitted signal through said protection transmission line in a direction different from the direction of said protection transmission line on which the signal was inserted before failure occurrence in said protection transmission line, if a failure further occurs in said protection transmission line after failure occurrence in said work transmission line; and said other node device includes an eighth memory section for storing the signal received through said-protection transmission line after failure occurrence in said work transmission, a ninth memory section for storing the signal received through said protection transmission line in said different direction from said third read control section of said add node device after failure occurrence in said protection transmission line, and a third phase adjusting section for matching a time phase of the received signal stored in said eighth memory section after failure occurrence in said protection transmission line with a time phase of the received signal stored in said ninth memory section before failure occurrence in said protection transmission line and outputting said received signal to the outside.

11. The hitless path switching ring network according to claim 6, wherein if a failure further occurs in said protection transmission line after failure occurrence in said work transmission line, said one node device will loop back and send out the signal through said protection transmission line in the opposite direction from the direction of said protection transmission line onto which the signal was transmitted before failure occurrence in said protection transmission line.

12. The hitless path switching ring network according to claim 11, wherein said one node device includes a tenth memory section for storing the signal received after failure occurrence in said work transmission line, and a fourth read control section for reading out the transmitted signal held from said tenth memory section and looping back before failure occurrence in said work transmission line and sending out said transmitted signal through said protection transmission line in said opposite direction, if a failure further occurs in said protection transmission line after failure occurrence in said work transmission line; and said other node device includes an eleventh memory section for storing the signal received through said protection transmission line after failure occurrence in said work transmission line, a twelfth memory section for storing the signal received through said protection transmission line in said opposite direction from said fourth:read control section of said one node device after said failure occurrence in said protection transmission line, and a fourth phase adjusting section for matching a time phase of the received signal stored in said eleventh memory section after failure occurrence in said protection transmission line with a time phase of the received signal stored in said twelfth memory section before failure occurrence in said protection transmission line and outputting said received signal to the outside.

13. A hitless path switching transmission system comprising at least two node devices connected in opposition to each other through a work transmission line and a protection transmission line, wherein at the time of normal operation a signal is transmitted with said work transmission line; at the time of failure occurrence in said work transmission line the signal is transmitted with said protection transmission line;

in order to cause the signal to be received from one of said node devices to the other of said node devices without instantaneous hitting of the signal, said one node device includes a thirteenth memory section for storing the signal being transmitted onto said work transmission line at said time of normal operation, and a fifth read control section for reading out the transmitted signal held from said thirteenth memory section before failure occurrence in said work-transmission line and sending out said transmitted signal through said protection transmission line at the time of failure occurrence in said work transmission line; and said other node device includes a fourteenth memory section for storing the signal received through said work transmission line at said time of normal operation, a fifteenth memory section for storing the signal received through said protection transmission line according to said fifth read control section of said one node device at the time of failure occurrence in said work transmission line, and a fifth phase adjusting section for matching a time phase of the received signal stored in said fourteenth memory section after failure occurrence in said work transmission line with a time phase of the received signal stored in said fifteenth memory section before failure occurrence in said work transmission line and outputting said received signal to the outside.

14. In a hitless path switching ring network node device connected in ring form with one or more node devices through a work transmission line and a protection transmission line wherein at the time of normal operation a signal is transmitted with said work transmission line and at the time of a failure occurrence in said work transmission line the signal can be transmitted with said protection transmission line in the opposite direction from the direction in which the signal was transmitted before failure occurrence, in order to cause the signal to be received at another node device without instantaneous hitting of the signal at said time of failure occurrence in said work transmission line, the node device comprising:

a first memory section for storing a transmitted multi-frame signal, having an identifier representing a leading position of the multi-frame signal and which identifier is to be used for matching a time phase between received multi-frame signals from different directions before and after failure occurrence at a reception side, during at said time of normal operation; and a first read control section for reading out said transmitted multi-frame signal with said identifier, stored before failure occurrence, from said first memory section and sending out said transmitted multi-frame signal with said identifier through said protection transmission line in the opposite direction, from the transmission direction employed before failure occurrence in said work transmission line, at the time of failure occurrence in said work transmission line.

15. In a hitless path switching ring network node device connected in ring form with one or more node devices through a work transmission line and a protection transmission line wherein at the time of normal operation a signal is transmitted with said work transmission line and at the time of failure occurrence in said work transmission line the signal can be transmitted with said protection transmission line in the opposite direction from the direction in which the signal was transmitted before failure occurrence, in order to cause the signal to be received at another node device without instantaneous hitting of the signal at said time of failure occurrence in the work transmission line, the node device comprising:

a first memory section for storing the transmitted signal at the time of normal operation; and a first read control section for reading out said transmitted signal stored before failure occurrence in said work transmission line, from said first memory section and sending out said transmitted signal through said protection transmission line in the opposite direction, at the time of failure occurrence in said work transmission line, wherein said node device is constructed as an add node device that inserts an external signal into said ring network; and said first read control section is constructed so as to send out said transmitted signal in a direction differing from the direction in which the external signal was inserted before failure occurrence in said work transmission line, at said time of failure occurrence in said work transmission line.

16. The hitless path switching ring network node device according to claim 14, wherein said node device is constructed as a relay node device that relays a signal; and said first read control section is constructed so as to loop back and send out said transmitted signal at the time of failure occurrence in said work transmission line.

17. The hitless path switching ring network node device according to claim 14, wherein said first memory section and said first read control section are respectively provided for each of a plurality of paths handled by said ring network and are constructed so as to perform sending of said transmitted signal in the unit of said path at the time of failure occurrence in said work transmission line.

18. In a hitless path switching ring network node device connected in ring form with one or more node devices through a work transmission line and a protection transmission line wherein at the time of normal operation a signal is transmitted with said work transmission line and at the time of failure occurrence in said work transmission line the signal can be transmitted with said protection transmission line in the opposite direction from the direction in which the signal was transmitted before failure occurrence in order to cause the signal to be received at another node device without instantaneous hitting of the signal at said time of failure occurrence in said work transmission line, the node device comprising:

a first memory section for storing the transmitted signal at the time of normal operation; and a first read control section for reading out said transmitted signal stored before failure occurrence in said work transmission line, from said first memory section and sending out said transmitted signal through said protection transmission line in the opposite direction, at the time of failure occurrence in said work transmission line, wherein said first memory section and said first read control section are respectively provided for each of a plurality of paths handled by said ring network and are constructed so as to perform sending of said transmitted signal in the unit of said path at the time of failure occurrence in said work transmission line said hitless path switching ring network node device further comprising a first path selecting section for selecting a path whose priority order is lower within a previously determined priority order, when sending of said transmitted signal is performed in the unit of said path.

19. The hitless path switching ring network node device according to claim 14, wherein said first memory section and said first read control section are respectively provided in the units of some paths of a plurality of paths handled by said ring network and are constructed so as to perform sending of said transmitted signal in the units of said some paths at the time of failure occurrence in said work transmission line.

20. In a hitless path switching ring network node device connected in ring form with one or more node devices through a work transmission line and a protection transmission line wherein at the time of normal operation a signal is transmitted with said work transmission line and at the time of failure occurrence in said work transmission line the signal can be transmitted with said protection transmission line in the opposite direction from the direction in which the signal was transmitted before failure occurrence, in order to cause the signal to be received at another node device without instantaneous hitting of the signal at said time of failure occurrence in said work transmission line, the node device comprising:

a first memory section for storing the transmitted signal at the time of normal operation, and a first read control section for reading out said transmitted signal stored before failure occurrence in said work transmission line, from said first memory section and sending out said transmitted signal through said protection transmission line in said opposite direction, at the time of failure occurrence in said work transmission line, wherein said first memory section and said first read control section are respectively provided in the units of some paths of a plurality of paths handled by said ring network and are constructed so as to perform sending of said transmitted signal in the units of said some paths at the time of failure occurrence in said work transmission line said hitless path switching ring network node device further comprising a first path selecting section for selecting a path whose priority order is lower within a previously determined priority order, when sending of said transmitted signal is performed in the unit of said path.

21. In a hitless path switching ring network node device connected in ring form with other one or more node devices through a work transmission line and a protection transmission line wherein at the time of normal operation a signal is transmitted with said work transmission line and at the time of failure occurrence in said work transmission line the signal can be transmitted with said protection transmission line in the same direction as the direction in which the signal was transmitted before failure occurrence in said work transmission line, in order to cause the signal to be received at the other node devices without instantaneous hitting of the signal at the time of failure occurrence in said work transmission line, the node device comprising:

a fourth memory section for storing the signal being transmitted onto said work transmission line at said time of normal operation; and a second read control section for reading out the transmitted signal held from said fourth memory section before failure occurrence in said work transmission line and sending out said transmitted signal through said protection transmission line in said same direction, at the time of failure occurrence in said work transmission line.

22. The hitless path switching ring network node device according to claim 21, wherein said fourth memory section and said second read control section are respectively provided for each of a plurality of paths handled by said ring network and are constructed so as to perform sending of said transmitted signal in the unit of said path at the time of failure occurrence in said work transmission line.

23. The hitless path switching ring network node device according to claim 22, further comprising a second path selecting section for selecting a path whose priority order is lower within a previously determined priority order, when sending of said transmitted signal is performed in the unit of said path.

24. The hitless path switching ring network node device according to claim 21, wherein said fourth memory section and said second read control section are respectively provided in the units of some paths of a plurality of paths handled by said ring network and are constructed so as to perform sending of said transmitted signal in the units of said some paths at the time of failure occurrence in said work transmission line.

25. The hitless path switching ring network node device according to claim 24, further comprising a second path selecting section for selecting a path whose priority order is lower within a previously set priority order, when sending of said transmitted signal is performed in the unit of said path.

26. The hitless path switching ring network node device according to claim 21, further comprising a protection transmission line failure occurrence-time sending control section for sending out said transmitted signal through said protection transmission line in the opposite direction from the direction of said protection transmission line onto which the signal was transmitted before failure occurrence in said protection transmission line, if a failure further occurs in said protection transmission line after failure occurrence in said protection transmission line.

27. The hitless path switching ring network node device according to claim 26, said protection transmission line failure occurrence-time sending control section includes a tenth memory section for storing the signal received after failure occurrence in said work transmission line; and a fourth read control section for reading out the transmitted signal held from said tenth memory section before failure occurrence in said protection transmission line -and sending out said transmitted signal through said protection transmission line in the opposite direction from the direction of said protection transmission line onto which the signal was transmitted before failure occurrence in said protection transmission line, if a failure further occurs in said protection transmission line after failure occurrence in said work transmission line.

28. In a hitless path switching ring network node device connected in ring form with other one or more node devices through a work transmission line and a protection transmission line wherein at the time of normal operation a signal is transmitted with said work transmission line and at the time of failure occurrence in said work transmission line the signal can be transmitted with said protection transmission line in the opposite direction from the direction in which the signal was transmitted before failure occurrence in said work transmission line, in order to receive the signal from said other node device without instantaneous hitting of the signal at the time of failure occurrence in said work transmission line, the node device comprising:

a second memory section for storing the signal received through said work transmission line at said time of normal operation;

a third memory section for storing the signal received through said protection transmission line from said other node device at the time of failure occurrence in said work transmission line; and a first phase adjusting section for matching a time phase of the received signal stored in said second memory section after failure occurrence in said work transmission line with a time phase of the received signal stored in said third memory section before failure occurrence in said work transmission line and outputting said received signal to the outside.

29. The hitless path switching ring network node device according to claim 28, wherein said second memory section, said third memory section, and said first phase adjusting section are provided for each of said plurality of paths and are constructed so as to make a time phase adjustment to said received signal in the unit of said path.

30. The hitless path switching ring network node device according to claim 28, wherein said second memory section, said third memory section, and said first phase adjusting section are provided in the units of said some paths and are constructed so as to make a time phase adjustment to said received signal in the units of said some paths.

31. The hitless path switching ring network node device according to claim 28, further comprising an eleventh memory section for storing the signal received after a failure occurs in said work transmission line;

a twelfth memory section for storing the signal received through said protection transmission line in said opposite direction from said other node device at the time of failure occurrence in said protection transmission line; and a fourth phase adjusting section for matching a time phase of the received signal stored in said eleventh memory section after failure occurrence in said protection transmission line with a time phase of the received signal stored in said twelfth memory section before failure occurrence in said protection transmission line and outputting said received signal to the outside.

32. In a hitless path switching ring network comprising at least two node devices connected in ring form through a work transmission line and a protection transmission line wherein at the time of normal operation a signal is transmitted with said work transmission line and at the time of failure occurrence in said work transmission line the signal can be transmitted with said protection transmission line in the opposite direction from the direction in which the signal was transmitted before failure occurrence in said work transmission line, in order to cause the signal to be received at the other of said node devices without instantaneous hitting of the signal at the time of failure occurrence in said work transmission line, a failure occurrence-time hitless path switching transmission method in the ring network wherein at the time of failure occurrence in said work transmission line, one node device of said node devices, which is transmitting the signal in a direction in which failure occurred, retransmits the signal held before failure occurrence in said work transmission line through said protection transmission line in said opposite direction; and said other node device matches a time phase of the signal received through said work transmission line after failure occurrence in said work transmission line with a time phase of the received signal before failure occurrence in said work transmission line retransmitted through said protection transmission line from said one node device and outputs said received signal to the outside.

33. The failure occurrence-time hitless path switching transmission method according to claim 32, wherein said one node device performs the retransmission in the unit of each of a plurality of paths handled by said ring network; and said other node device makes the time phase adjustment in the unit of said path.

34. The failure occurrence-time hitless path switching transmission method according to claim 32, wherein said one node device performs the retransmission in the unit of some paths of a plurality of paths handled by said ring network; and said other node device makes the time phase adjustment in the units of said some paths.

* * * * *